Oct. 6, 1959   M. J. KELLY   2,907,254
RECORD CARD CONTROLLED ELECTROGRAPHIC PRINTER
Filed Dec. 29, 1955   19 Sheets-Sheet 1

INVENTOR.
MARTIN J. KELLY
BY
J. Tannin Jr.
ATTORNEY

Oct. 6, 1959    M. J. KELLY    2,907,254
RECORD CARD CONTROLLED ELECTROGRAPHIC PRINTER
Filed Dec. 29, 1955    19 Sheets-Sheet 2

FIG_2a_

FIG_2_

FIG_3_

Oct. 6, 1959    M. J. KELLY    2,907,254
RECORD CARD CONTROLLED ELECTROGRAPHIC PRINTER
Filed Dec. 29, 1955    19 Sheets-Sheet 4

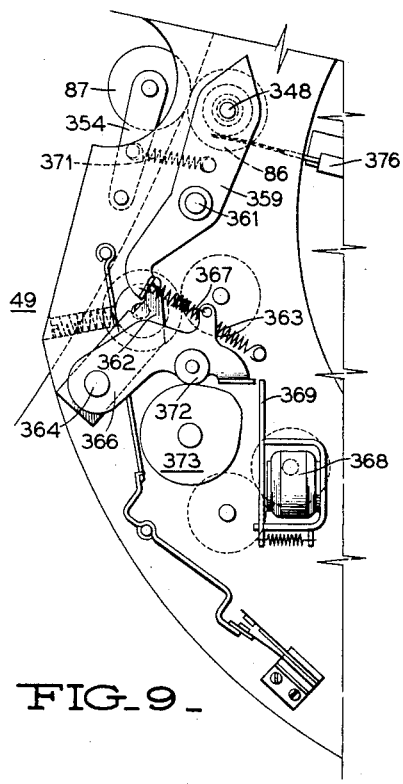
FIG_9_
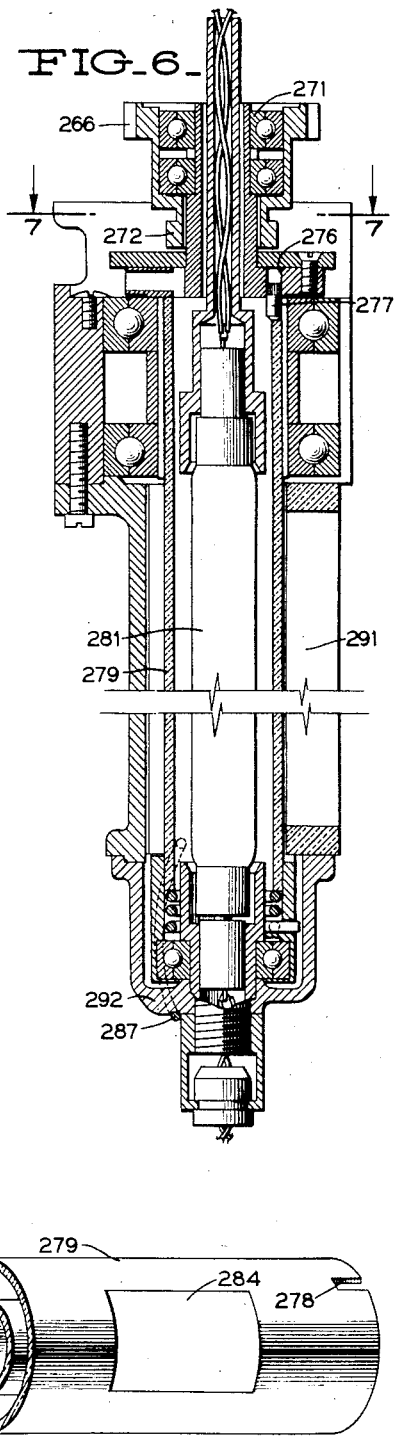
FIG_6_
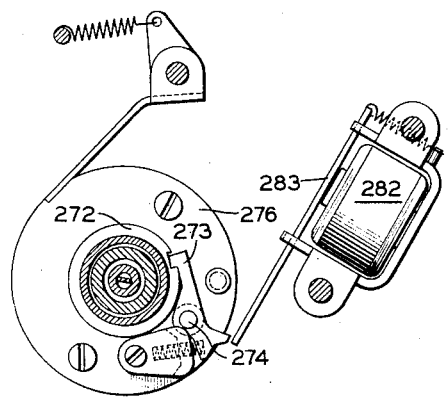
FIG_7_
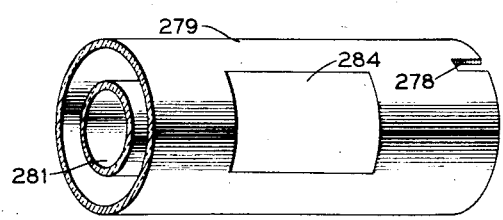
FIG_8_

Oct. 6, 1959    M. J. KELLY    2,907,254
RECORD CARD CONTROLLED ELECTROGRAPHIC PRINTER
Filed Dec. 29, 1955    19 Sheets-Sheet 8

Oct. 6, 1959   M. J. KELLY   2,907,254
RECORD CARD CONTROLLED ELECTROGRAPHIC PRINTER
Filed Dec. 29, 1955   19 Sheets-Sheet 9

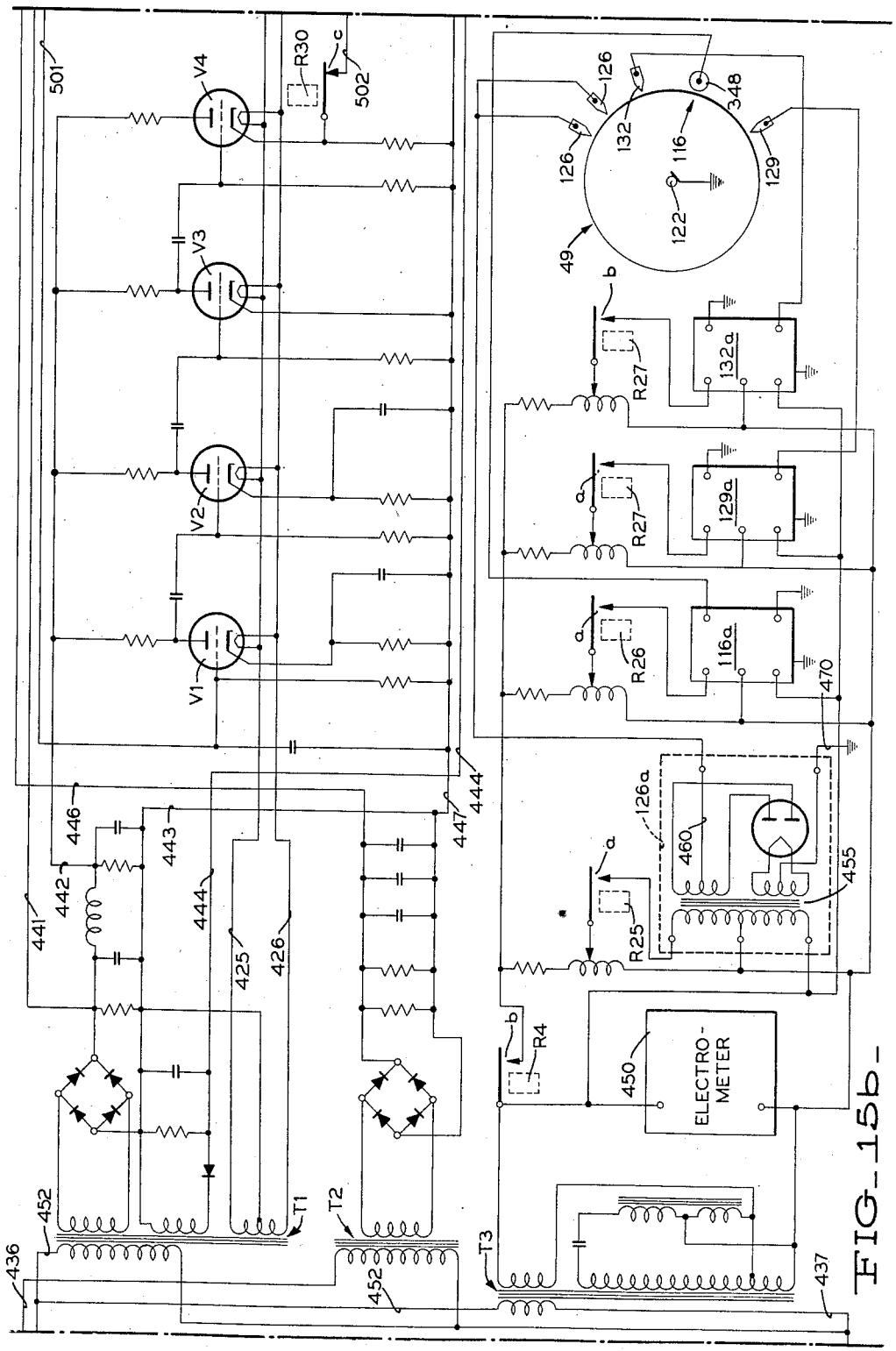
FIG_15b_

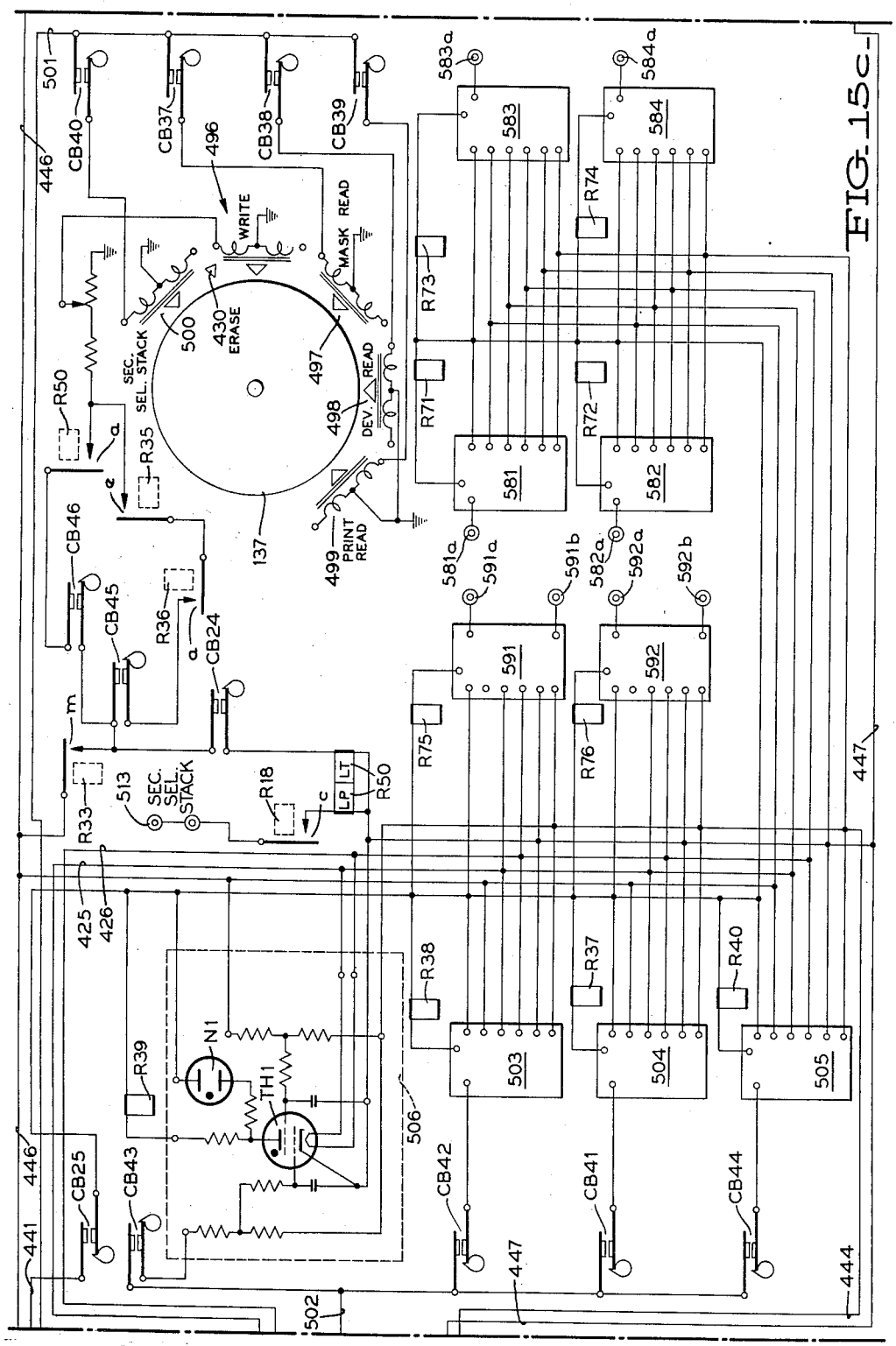

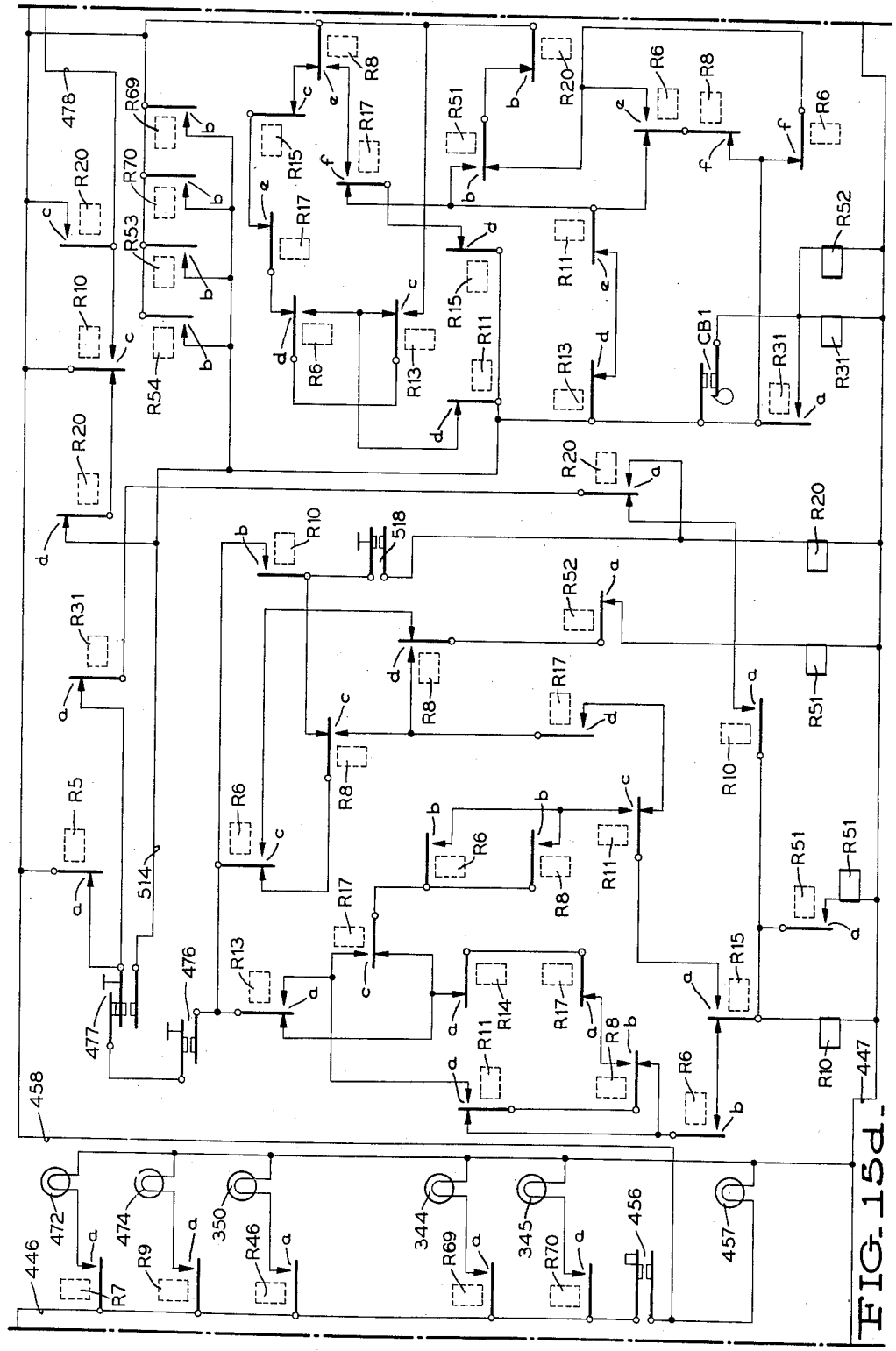

Oct. 6, 1959　　　M. J. KELLY　　　2,907,254
RECORD CARD CONTROLLED ELECTROGRAPHIC PRINTER
Filed Dec. 29, 1955　　　　　　　　　　　　　　19 Sheets-Sheet 13

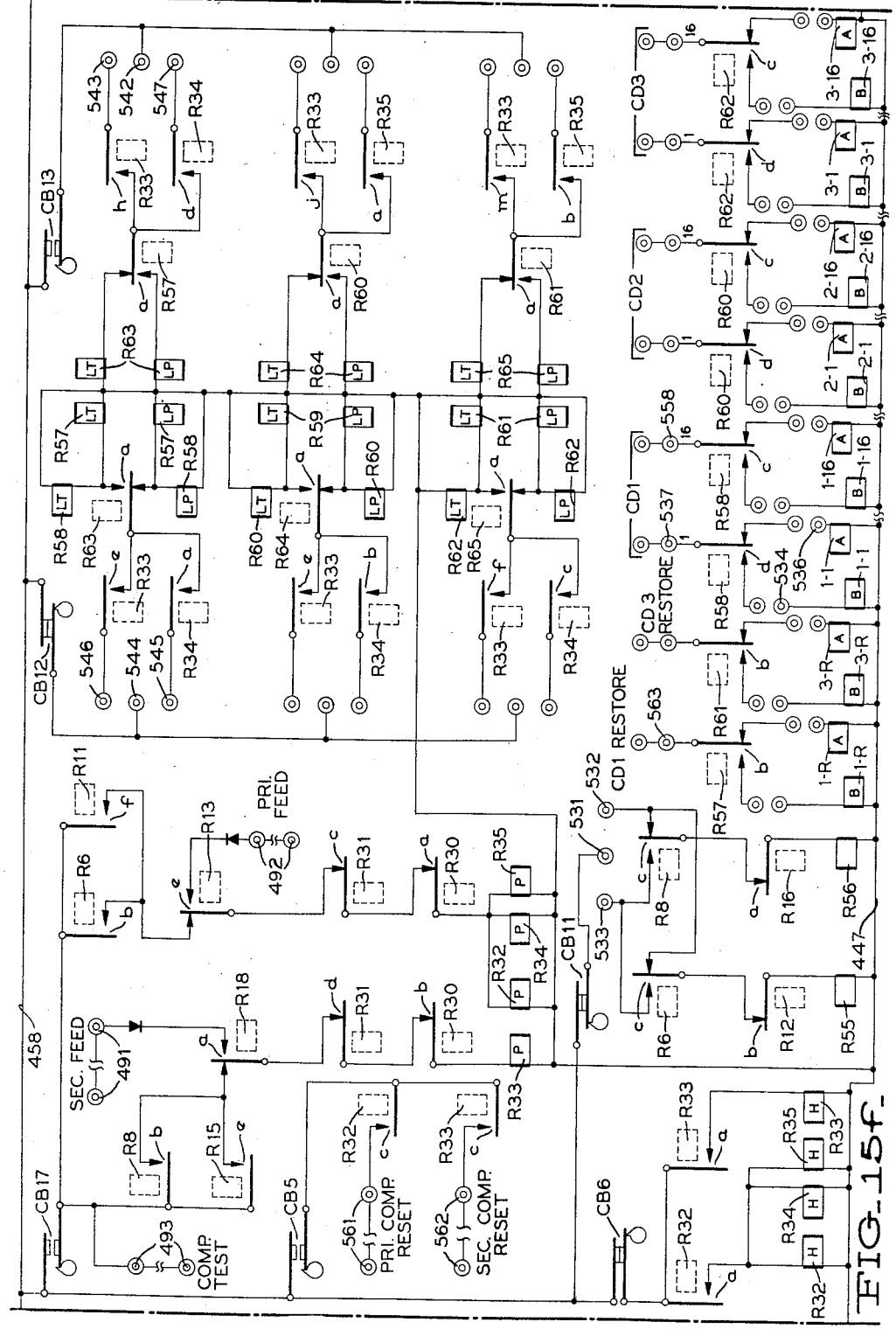

Oct. 6, 1959          M. J. KELLY          2,907,254
RECORD CARD CONTROLLED ELECTROGRAPHIC PRINTER
Filed Dec. 29, 1955          19 Sheets-Sheet 16
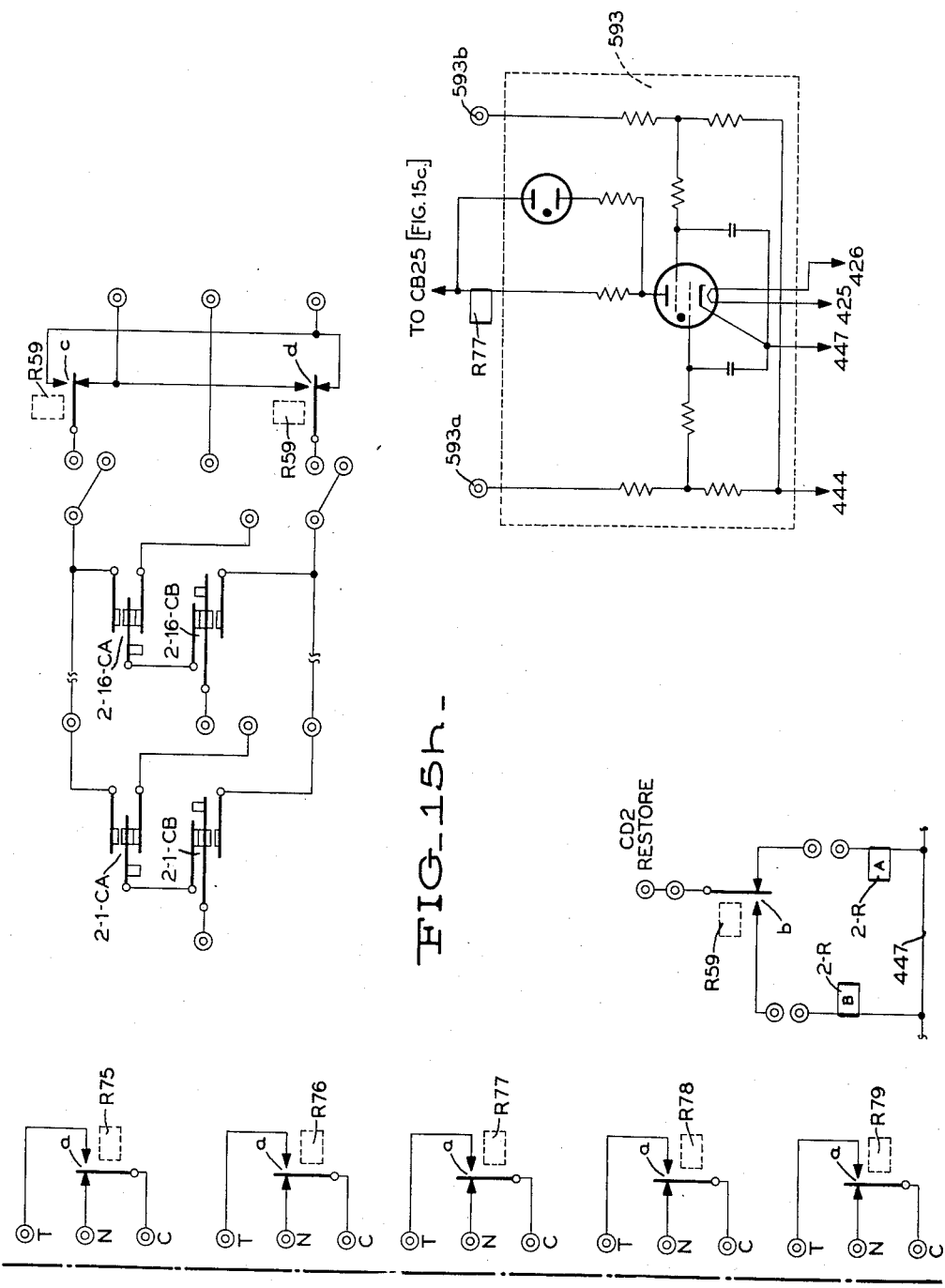
FIG_15h_

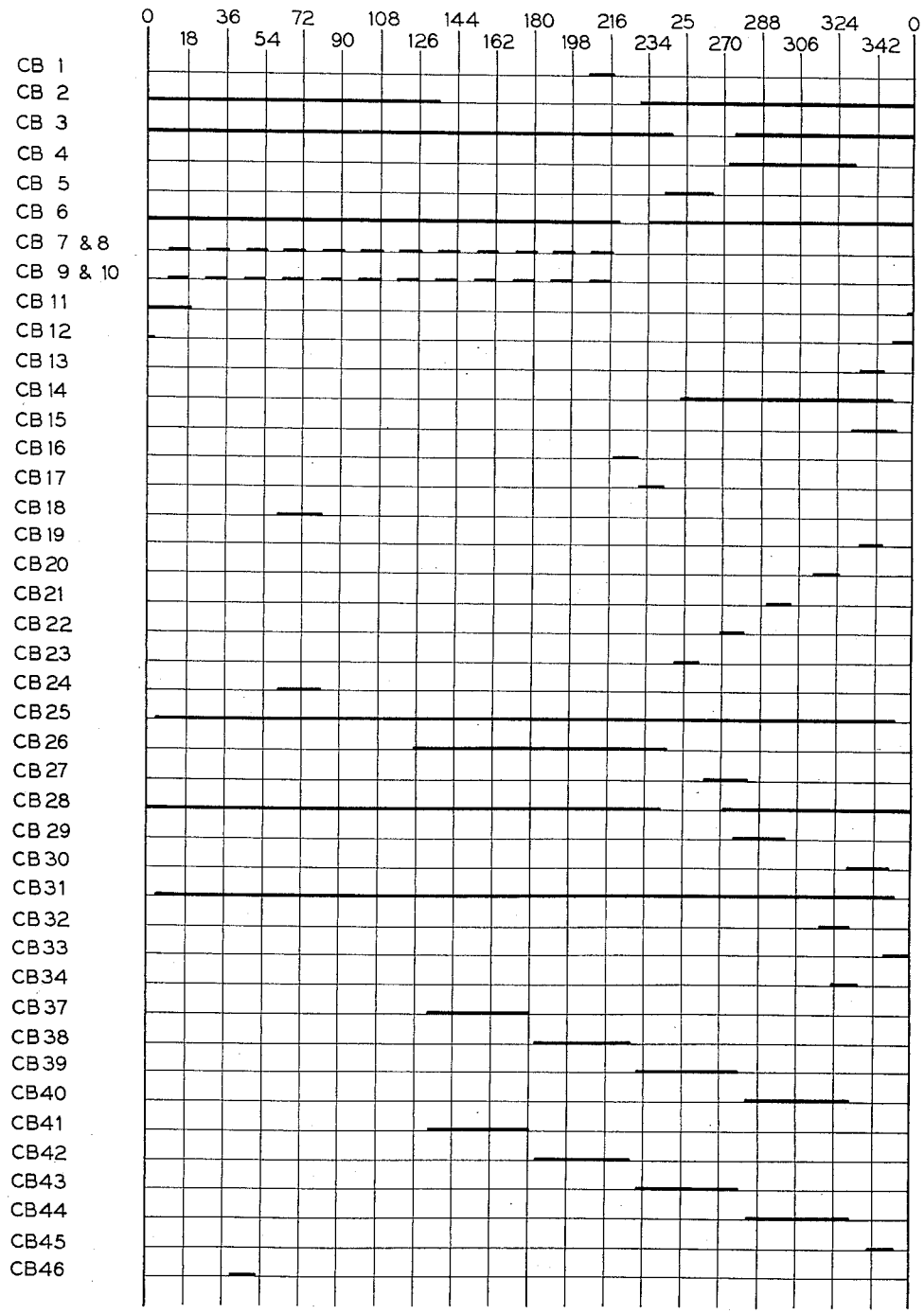
FIG_16_

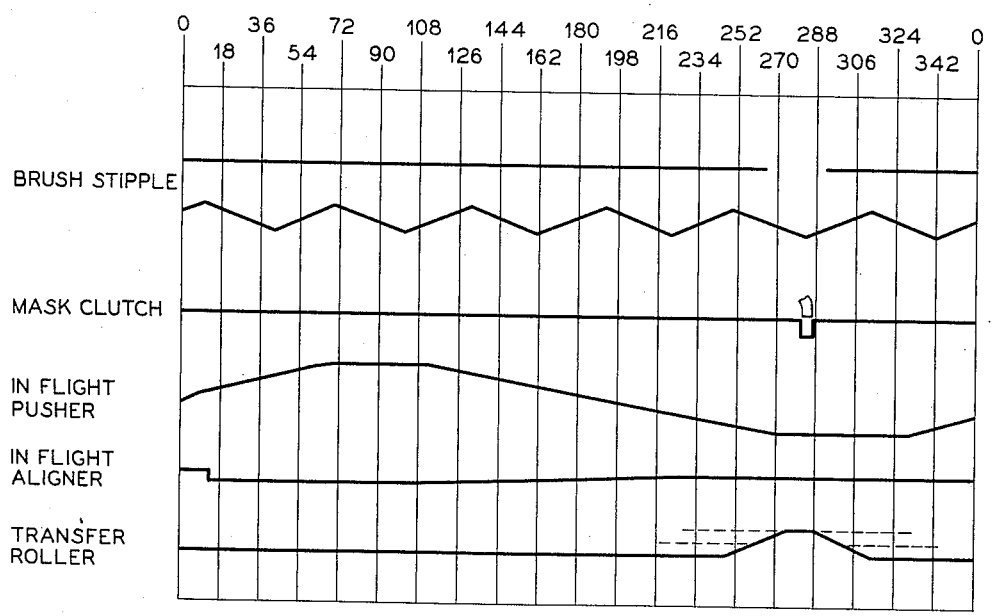
FIG_17_
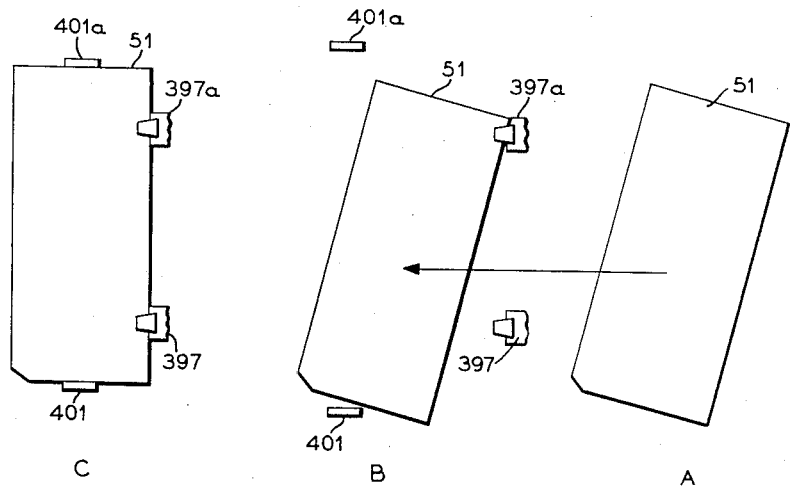
FIG_18_

Oct. 6, 1959     M. J. KELLY     2,907,254
RECORD CARD CONTROLLED ELECTROGRAPHIC PRINTER
Filed Dec. 29, 1955     19 Sheets-Sheet 19
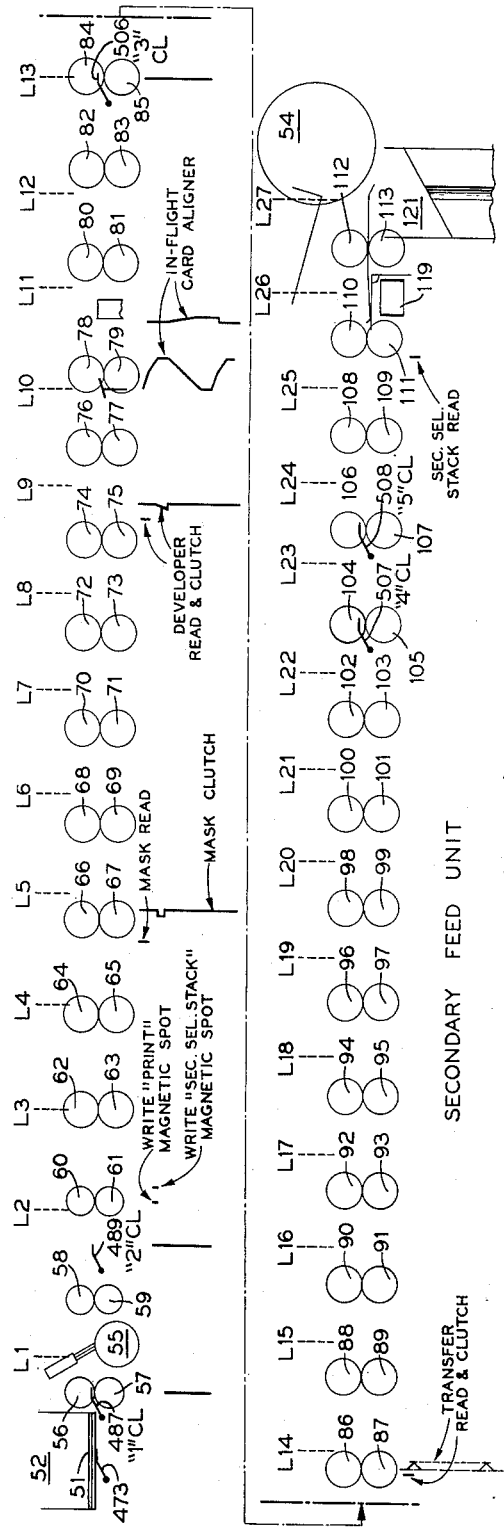
FIG_19_
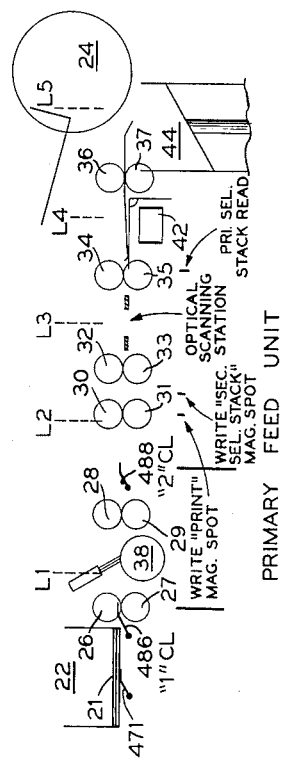
FIG_20_

United States Patent Office 2,907,254
Patented Oct. 6, 1959

2,907,254
RECORD CARD CONTROLLED ELECTROGRAPHIC PRINTER

Martin J. Kelly, Endicott, N.Y., assignor to International Business Machines Corporation, New York, N.Y., a corporation of New York Application December 29, 1955, Serial No. 556,176

3 Claims. (Cl. 95—1.7)

This invention relates in general to a record card controlled printing machine, and in particular to a record card controlled electrographic "card-to-card" printer.

The preferred embodiment of the present invention which is also disclosed in copending U.S. patent application, Serial No. 556,216, filed on December 29, 1955, by I. M. Hix, incorporates a type of electrographic printing commonly referred to as xerographic printing, i.e., so-called "dry" printing. Accordingly, the preferred embodiment of the present invention pertains to a xerographic printing machine capable of producing a facsimile of visible information appearing on source information primary records, such as well-known data processing record cards for example, on other related image information receiving secondary records which might also be record cards. That is, as will be described in detail hereinafter, source information primary cards which may also have machine control data recorded thereon, are fed, one-by-one, past a control data sensing station and a source information optical scanning station. Image information receiving secondary cards which too may have machine control data recorded thereon, are fed, one-by-one, past a control data sensing station, a xerographic toner image transfer station and a toner image fixing station. The optical image of the source information carried by each primary card and produced by apparatus in the afore-mentioned scanning station, is stored in a conventional manner as a latent electrostatic image on the surface of a constantly rotating xerographic drum. Thus, a latent electrostatic image of the source information on each of the primary cards advanced successively past the optical scanning station, will appear in a series formation of such images about the peripheral surface of the xerographic drum. After each of these images is developed, the same is moved to the aforesaid toner image transfer station for transfer onto a clean surface of a related secondary card.

In addition to the foregoing, the preferred embodiment of the present invention includes added features which cooperate to provide a record card controlled card-to-card xerographic printer that can afford a variety of different operations. That is, the primary and secondary card control data that are recorded on the cards and read at their respective sensing stations, can be used to govern various machine operations. For example, by comparing the primary and secondary card control data, the xerographic printer can be controlled to effect a transfer of primary card source information onto only certain secondary cards which are related to the primary cards by the control data recorded thereon. Hence, for example, those xerographic images associated with primary cards which lack corresponding secondary cards, will not be transferred, i.e., printed, onto secondary cards. On the other hand, those secondary cards which lack corresponding primary cards will be advanced through the afore-mentioned transfer station while the apparatus thereof is disabled, so that a transfer or print operation is not effected. It might be well to bring out here that the transfer station apparatus is similar to the shiftable transfer roller apparatus shown and described in copending U.S. patent application, Serial No. 419,314, filed on March 29, 1954, by C. J. Fitch, now Patent No. 2,807,233. Furthermore, in line with the foregoing example, the subject xerographic printer can be governed in accordance with the primary and secondary card control data, to cause the primary cards whose source information has been copied to be stacked in a compartment separate from one for storing the primary cards whose source information has not been copied. Similarly, the aforesaid subject printer can be governed to cause the secondary cards whereon information has been printed, to be stacked in a compartment separate from one for storing blank secondary cards.

Needless to say that the various machine features and operations briefly described hereinabove are simply indicative of the versatility and flexibility of the preferred embodiment of the present invention, and in no way should they be construed as limitations thereof. Other machine features and functions will become clear as the description advances.

A broad object of this invention is to provide an improved xerographic printer which affords efficient and rapid printing operations that may be selectively controlled.

In line with the foregoing, another object of this invention is to provide a highly flexible xerographic printer which can perform a variety of different functions that are ancillary to the printing operation.

Another object of this invention is to provide an improved printing machine for effecting the transfer of source information which appears on source records onto related image receiving records.

Still another object of this invention is to provide an improved printing machine for effecting the transfer of select ones of a plurality of source information images onto related image receiving records.

In keeping with the foregoing, another object of this invention is to provide an improved printing machine for effecting the transfer of select ones of a plurality of source information images onto select ones of corresponding image receiving records.

Another object of this invention is to provide a record card controlled xerographic printer capable of producing a facsimile of source information appearing on primary cards on related image receiving secondary cards.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2a is a diagrammatic view of the secondary card feed clutch mechanism.

Fig. 6 is a cross-sectional view of the masking-erasing unit apparatus.

Fig. 7 is a view taken along line 7—7 of Fig. 6.

Fig. 8 is a schematic view of the masking-erasing cylinder.

Fig. 9 depicts the xerographic image transfer roller operating mechanism.

Figs. 15a to 15h, inclusive, are a wiring diagram of the electrical control apparatus for governing the operation of the subject card-to-card printer.

Fig. 16 is an electrical timing chart.

Fig. 17 is a mechanical timing chart.

Fig. 18 schematically depicts the action of the secondary card feed unit in-flight card aligning mechanism.

Fig. 19 is a schematic view of the secondary card feed unit.

Fig. 20 is a schematic view of the primary card feed unit.

GENERAL DESCRIPTION

Figure 1:
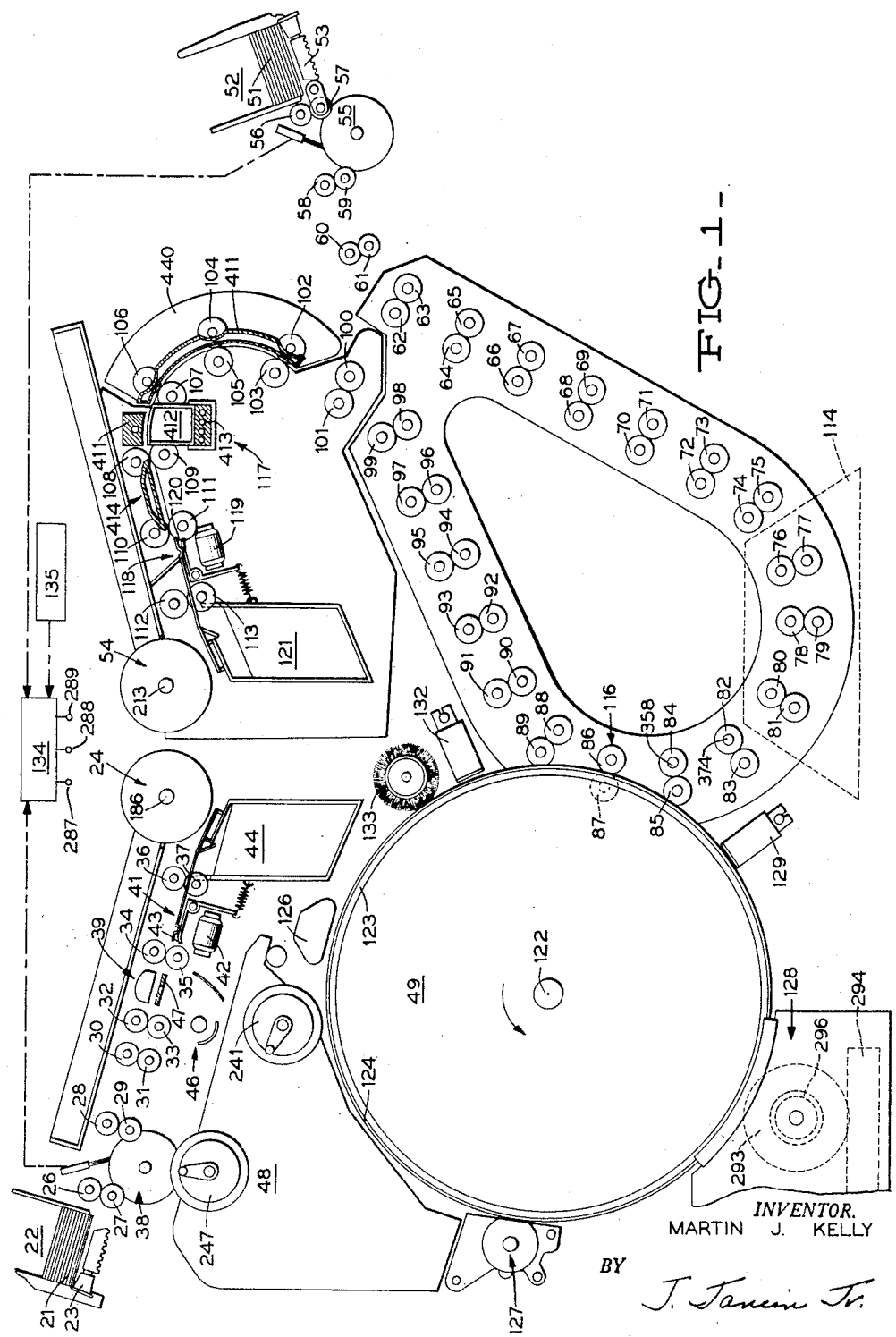
Fig. 1 is a somewhat diagrammatic view of a record card controlled xerographic card-to-card printer.

*Primary record card feed unit.*—Referring to Fig. 1, primary record cards 21 to be operated on are stacked in a hopper 22, and are fed, one-by-one, each primary card feed cycle by a conventional card picker mechanism 23 towards a drum type card stacker 24. Successive pairs of feed rolls 26—37 cause a primary card to be advanced during successive card feed cycles past a punched hole indicia brush reading station 38, an optical scanning station 39, and a record card distributing station 41. As will be brought out in detail hereinafter, so long as the distributing station control magnet 42 is de-energized, primary cards will be advanced from hopper 22 directly to the drum type stacker 24. Consequent upon the energization of magnet 42, however, by means to be described, the movable end of chute blade 43 will be raised above the primary card feed line, to thereby direct the primary cards into drop type stacker 44. Hence, it is to be observed then that primary cards 21 may be stacked selectively in any predetermined fashion in either of the primary feed stackers 24 or 44.

Associated with the optical scanning station 39 is a light ray projector apparatus 46 for directing a band of light rays upon the constricted center of an aperture 227 (see also Fig. 3) in member 47, to thereby effect a conventional light scanning operation of a record card whereby the image of the optically visible printed information carried by the primary cards is transferred by the optical projecting apparatus 48 (Fig. 1) to the surface of the electrophotographic or xerographic drum 49. Inasmuch as the printing process performed by the preferred embodiment of the present invention is the xerographic process, the printer structure such as the electrophotographic drum 49, for example, shall hereinafter be referred to as xerographic structure, i.e., as the xerographic drum.

*Secondary record card feed unit.*—Still referring to Fig. 1, secondary record cards 51 to be operated on are stacked in a secondary hopper 52, and are fed, one-by-one, each secondary card feed cycle out of hopper 52 via a somewhat circuitous route towards the secondary card drum type stacker 54. These secondary cards are fed from hopper 52 by a conventional card picker mechanism 53 which is similar to the primary card picker mechanism 23. Successive pairs of feed rolls 56—113 cause each secondary card to be advanced during the successive secondary card feed cycles past a punched hole indicia brush reading station 55, an in-flight card aligner mechanism identified by the reference numeral 114, a xerographic image transfer station 116, a xerographic image fixing station 117, and a secondary card distributing station 118. Magnet 119 within station 118 can be controlled to direct secondary cards to either the drum type stacker 54, or when energized so as to raise the movable end of chute blade 120 above the secondary card feed line, to the drop stacker 121.

*Relationship between primary and secondary card feed units.*—The drive mechanism for the card-to-card printer will be described hereinafter in connection with Fig. 2. However, it would be well to mention but briefly at this time the relationship between the primary and secondary card feed units, in order to provide in at least a general fashion some explanation as to what is done to keep these card feed units in step.

Referring to Figs. 1, 19 and 20, the primary card picker mechanism 23 and the first two sets of feed rolls 26—29, are clutch controlled to operate only when the primary clutch (not shown) is operated, whereas the remaining sets of feed rolls 30—37 are continuously operating. That is, the clutch controlled mechanism is rendered operated to advance primary cards from hopper 22 into the primary card feed unit only in response to the operation of the primary card feed clutch. Thus, should the primary card feed clutch be disabled for one or more card feed cycles, its associated card picker mechanism 23 and the feed rolls 26—29 will be caused to stop operating, whereas the continuously operating feed rolls 30—37 will continue to operate so as to clear out any remaining primary cards in the neighborhood of the optical scanning station 39 and the record card distributing station 41.

In a similar fashion, the secondary card feed picker mechanism 53 and the first two sets of secondary card feed rollers 56—59 are under control of a secondary card feed clutch (see also Fig. 2a). The remaining sets of secondary card feed rollers 60—113 are arranged to be continuously operating so as to clear out any secondary cards from the secondary feed unit which are positioned beyond the feed rollers 58—59 when the secondary card feed clutch is disabled. The electrical tie-in between the primary and secondary card feed units will be described in detail hereinafter to show the manner in which primary record card information can be transferred onto a specific secondary card which is related to the aforesaid primary card.

*Xerographic apparatus.*—The xerographic drum 49 is mounted on an electrically grounded shaft 122 and is driven in a counterclockwise direction by the drive means (see also Fig. 2) to be described in detail shortly. This drum includes an electrically conductive cylinder 123 and a light sensitive photoconductive insulating layer 124 referred to at times as an electrophotoplate. With the feeding of primary cards from hopper 22 to card stacker 24 or 44, the xerographic drum 49 is caused to rotate in a counterclockwise direction at a speed which is correlated to the lineal speed of feeding primary cards through optical scanning station 39.

As successive incremental areas of the light sensitive photoconductive insulating layer 124, such as amorphous selenium for example, are moved past an ion-producing charging unit 126, the aforesaid insulating layer is electrically charged positive. Carlson Patent No. 2,588,699 which issued on March 11, 1952, may be referred to for a complete showing and description of the afore-mentioned ion-producing charging unit 126. As a result of the layer 124 being charged, there is a latent electrostatic image formed consequent upon the exposure of the surface of insulating layer 124 to the optical image of the information carried by a primary card 21, which optical image is projected onto the surface of insulating layer 124 by the optical projecting apparatus 48. This latent image is formed on the photoconductive insulating layer 124 for the reason that those electrically charged incremental areas of the insulating layer onto which light rays are directed, are discharged, and those areas not illuminated by light rays remain charged. This, of course, is due to the fact that the insulating layer 124 is a photoconductive material which is in intimate electrical contact with the conductive backing cylinder 123 which, in turn, is electrically connected to the electrically grounded drum shaft 122. Hence, after the photoconductive insulating layer 124 is exposed to an optical image, a latent electrostatic image which corresponds to this optical image will remain, this latent electrostatic image being one wherein the "dark" characters defining information on a primary card retain an electrical charge, and the "light" image background areas thereof corresponding to the portions of the primary card surface which has no printed information thereon, are no longer charged.

Continued rotation of xerographic drum 49 in a counterclockwise direction causes the surface areas of insulating layer 124 whereon the latent electrostatic images are formed and stored, to be moved past a so-called masking-erasing station 127. As will be described hereinafter, this station includes a light source and optical means for normally directing a band of light rays onto the surface of photoconductive insulating layer 124. This station 127 includes in addition to the afore-mentioned elements, a rotatable masking cylinder for preventing the impingement of light rays from the said source onto predetermined surface area portions of photoconductive insulating layer 124. The arrangement of these elements is such that normally every portion of the surface of insulating layer 124 is subjected to the band of light rays transmitted from the light source within masking-erasing station 127, which, of course, would have the effect of removing any and all latent electrostatic images of primary card information stored on the surface of the xerographic drum moved past the station 127. To prevent the removal of certain select latent electrostatic images stored on the surface of drum 49, the afore-mentioned masking cylinder in station 127 is rotated so as to mask out certain areas of the insulating layer 124. This causes the removal and erasure of all parts of the latent electrostatic images but those parts of the image it is desired to transfer onto select secondary cards. As stated previously, this masking-erasing structure will be described in detail hereinafter in connection with Figs. 6-8.

Continued rotation of the xerographic drum 49 in a counterclockwise direction causes the remaining latent electrostatic images, i.e., those not removed through the action of the apparatus in masking-erasing station 127, to be moved into an image developing chamber 128. This could be an apparatus similar to the one shown and described in Schaffert Patent No. 2,576,047 which issued on November 20, 1951, although the preferred embodiment of the present invention employs a brush developer apparatus whereby xerographic toner is brushed onto the surface of the photoconductive insulating layer 124 by a soft fur brush. This apparatus is shown and described in copending U.S. patent application, Serial No. 554,515, filed on December 21, 1955, by W. D. Bolton et al. Thus, a developed toner image which visibly defines the latent electrostatic image stored on the surface of xerographic drum 49, is formed thereon. Any surplus or residual toner which does not adhere to the drum surface area corresponding to the stored latent electrostatic image, is captured and accumulated by a suitable toner receiving receptacle within station 128. The xerographic toner used may be of the type described in Copley Patent No. 2,659,670 which issued on November 17, 1953. Such toner is a pigmented, resinous powder having a triboelectric relationship with the fur brush such that the xerographic toner is caused to be triboelectrically charged negative. This is desirable, of course, inasmuch as all latent electrostatic images formed on the surface of the xerographic drum 49 are electrically positive charges.

A further rotation of the xerographic drum 49 causes the developed toner image appearing on the surface of layer 124 to be moved out of developing station 128, past a negative ion-producing unit 129 similar to previously described corona unit 126, and into a transfer or printing station 116 having a conductive transfer roller 348 (Fig. 10) thereat. This transfer apparatus is substantially similar to that which is shown and described in copending U.S. patent application Serial No. 419,314, filed on March 29, 1954, by C. J. Fitch, now U.S. Patent No. 2,807,233. Therefore, reference may be had to this copending patent application for a detailed description of the aforesaid apparatus and operation thereof. Suffice it to state for the present, however, that the operation of the apparatus at transfer station 116 (Fig. 1) is such as to effect a transfer of developed toner images appearing on the surface of the xerographic drum 49, to select secondary cards 51.

In order to remove any residual xerographic toner which remains on the surface of insulating layer 124 prior to the incremental areas thereof becoming charged once again by positive ion-producing unit 126, a similar but negative ion-producing unit 132 as well as a rotating brush roller 133 are provided. This roller is positioned within a suitable housing (not shown) for retaining the residual toner removed from the xerographic drum surface by the counterclockwise rotating action of the roller. A vacuum cleaner unit (not shown) may also be positioned within the aforesaid housing associated with the roller 133, in order to remove the residual toner so accumulated.

Figure 11A:
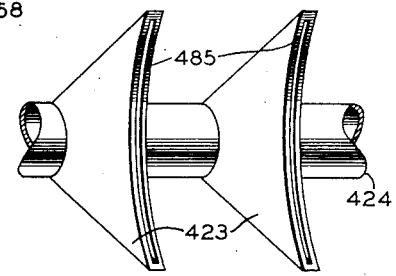
Figs. 11 and 11a are somewhat diagrammatic isometric views of the latent electrostatic image developing apparatus.
Figure 11:
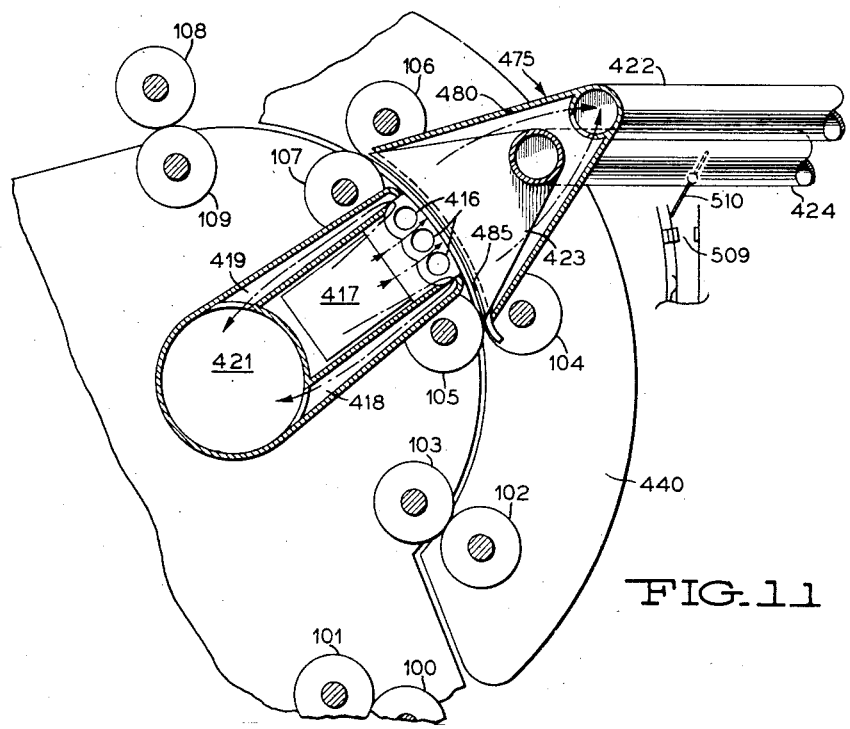

The xerographic toner image transferred from the surface of xerographic drum 49 onto the surface of a select secondary card must, of course, be permanently affixed thereto. This is usually performed in any one of several ways, such as by subjecting the xerographic toner image bearing sheet or record to heat, pressure or chemical solvent for example. The preferred embodiment of the present invention is designed to make use of either a heat fixing unit such as shown in Fig. 11 or a chemical solvent fixing unit such as shown in Fig. 1. The heat fixing unit is actually preferred for use in the present printer in view of its inherent simplicity, although the chemical solvent fixing method does provide a more permanent image on the printed copy in view of the fact that the xerographic toner depicting the information transferred permeates the fibers of the supporting sheet more thoroughly than can be accomplished by any other fixing process.

*Machine control and magnetic drum storage.*—The selective printing operation as effected by the present invention, is governed by a data compare apparatus identified in Fig. 1 by reference numeral 134. In general, the cross-field comparing operation performed by this apparatus is such that as each primary card 21 is fed past its reading station 38, the punched hole indicia in a select control field of the card is compared with select control field indicia carried in secondary cards 51 and analyzed by the secondary card feeding station. In addition, sequence comparing may also be accomplished by a so-called data tumbling scheme disclosed in copending U.S. patent application, Serial No. 554,254, filed on December 20, 1955, by I. M. Sarley et al. An unmatched, or unequal, data comparison condition during any machine cycle will cause an electrical impulse to be directed to a magnetic drum recording or write head 496 (Fig. 15c), to thereby record a magnetic bit or spot upon the magnetizable surface of the magnetic drum 137. This drum is mechanically connected to the xerographic drum so as to be synchronized with the movement of the xerographic drum in order that the two said drums rotate in step with each other. Thus, when the recorded magnetic spot appearing on the surface of magnetic drum 137 is detected by the several magnetic drum reading heads 497—500 (see also Fig. 15c) to be described in detail hereinafter, suitable signals are applied to apparatus within the masking-erasing station 127 (Fig. 1) to prevent the erasure of a stored latent electrostatic image, to apparatus within the developing station 128 to cause the toner development of a particular latent electrostatic image, to apparatus within the transfer station 116 to cause the transfer roller thereat to be shifted radially towards the surface of xerographic drum 49 so as to cause a developed image transfer to take place, and to apparatus within secondary card distributing station 118. As the description advances, the electrical apparatus whereby the afore-mentioned functions are caused to take place, will be described in detail.

As is normal in magnetic drum operations, an erase head 430 (Fig. 15c) is provided so as to remove all magnetic spots applied to the surface of the magnetic drum by recording head 136, after these spots have been detected by the afore-mentioned reading heads.

It must be pointed out at this time that the selective printing operation does not necessarily need to be one wherein printing is suppressed consequent upon the detection of an unmatched data condition. As is well known to persons familiar with the record card controlled machine art, such selective printing operations may be effected as a result of the detection of any one of a plurality of predetermined relationships between separate groups of data. Furthermore, it should be clear that the data comparison need not necessarily be one involving primary and secondary cards, but instead may be one wherein the primary card indicia are compared with a designated standard data which is directed to the data comparing unit by a suitable emitter represented in Fig. 1 by block 135. This type of operation is described in detail in copending U.S. patent application Serial No. 419,392, filed on March 29, 1954, by I. M. Hix et al., now Patent No. 2,859,673. For this reason, the latter operation will not be described in detail herein but will be referred to only briefly hereinafter through the use of apparatus representing blocks.

MACHINE DRIVE MECHANISM

Figure 2:
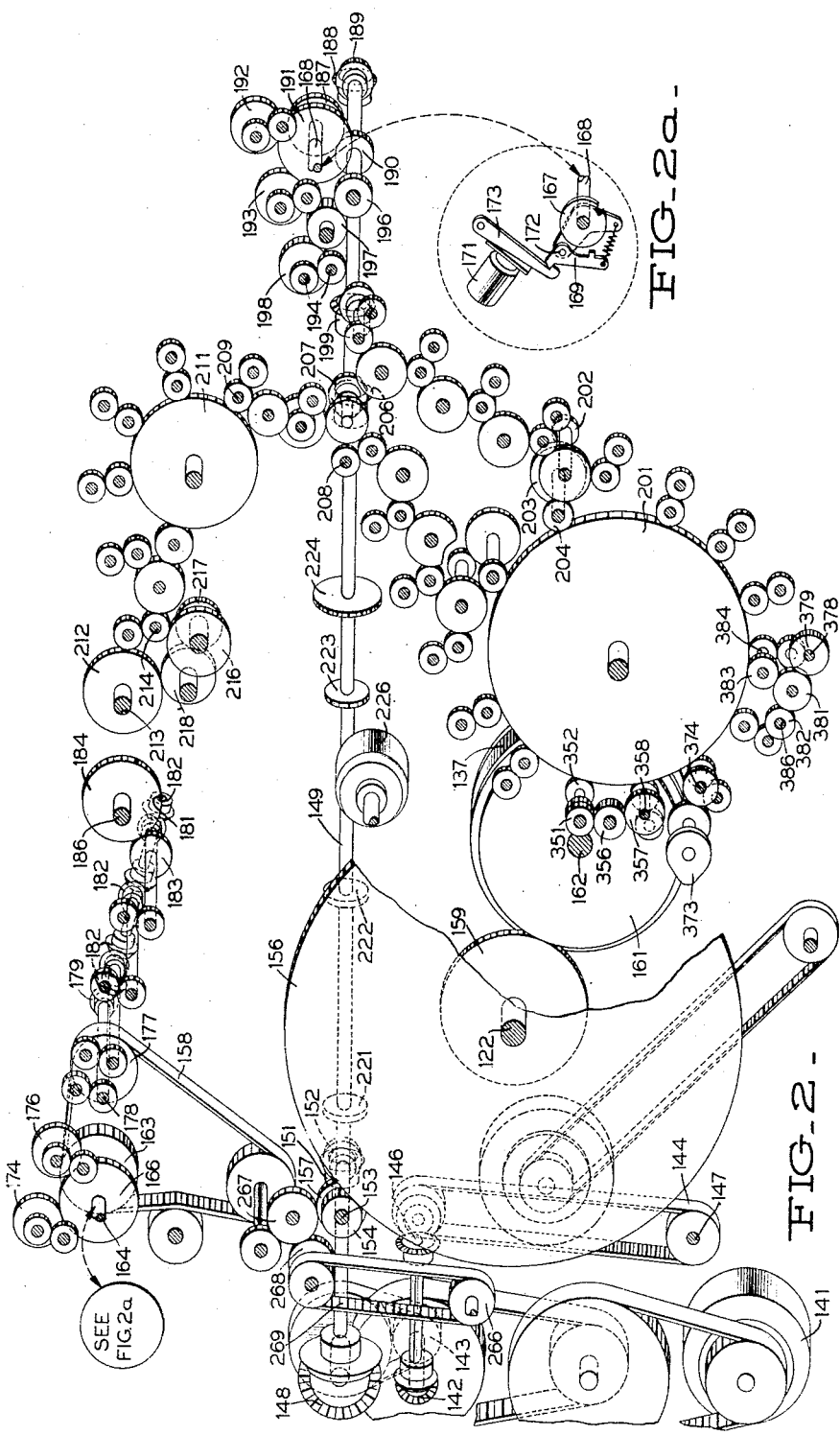
Fig. 2 is a somewhat diagrammatic view of the drive mechanism for the aforesaid card-to-card printer.

As stated previously, the drive mechanism for the subject card-to-card xerographic printer is shown in Fig. 2. A conventional timing belt arrangement is employed to operatively connect the electrical main drive motor 141 (Fig. 2) to a short shaft to which a bevel gear 142 is connected at one end and a spur gear 143 is connected to the other end. The bevel gear 142 transmits its power to the timing belt arrangement 144 via the gears associated with shaft 146, so as to continuously rotate the xerographic image developer station 128 (Fig. 1) drive shaft 147 (see also Fig. 12).

The afore-mentioned spur gear 143 (Fig. 2) directs its power to a bevel gear 148 via the belt and pulley arrangement shown, so as to continuously operate shaft 149 so long as motor 141 operates. This shaft 149 has a bevel gear 151 secured thereto for rotation therewith, which gear 151 engages another bevel gear 152 that is secured to shaft 153. This latter-mentioned shaft has fastened thereon a gear 154 for driving the so-called bull gear 156, and a gear 157 for operating the timing belt arrangement 158 via the plurality of conventionally positioned gears shown. The large bull gear 156 is attached to shaft 122 (see also Fig. 1) to which the xerographic drum 49 is also attached. Drive gear 159 (Fig. 2) is also connected to shaft 122 for rotation therewith, and engages gear 161 which is secured to shaft 162. The afore-mentioned magnetic drum 137 (see also Fig. 15c) is also fastened to shaft 162 (Fig. 2) for movement therewith. It is by way of the mechanism just described that the magnetic drum is kept in step with, i.e., is synchronized to the xerographic drum.

The continuously operating timing belt arrangement 158 effects the continuous operation of the pulley 163. This pulley is freely mounted on a shaft 164 to which a dog mechanism (not shown) and a driven gear 166 are secured. Furthermore, pulley 163 has secured thereto for rotation therewith a single tooth disc (not shown). The primary feed clutch mechanism just referred to but not shown, is similar to the clutch mechanism for the secondary card feed shown in Fig. 2a. Accordingly, the primary clutch mechanism can be described with reference to Fig. 2a. That is, a continuously rotating single tooth disc 167 (similar to the one referred to hereinabove as being secured to the face of pulley 163) is freely mounted on the driven shaft 168 (similar to shaft 164) to which the dog mechanism 169 is secured. In response to the energization of the clutch magnet 171 (there being another clutch magnet for the primary clutch), the spring-biased dog 169 is released for movement in a counter-clockwise direction about stud 172. As a result, the tooth on dog 169 will ride on the surface of, and then drop into the notch of, disc 167, whereupon the entire dog mechanism as well as the driven shaft 168 to which this mechanism is fastened will be caused to rotate with the drive disc 167. Should the magnet 171 be de-energized prior to the completion of a single revolution by disc 167, the upper extended latch end of dog 169 will engage the notched portion of now released armature 173, to thereby disable the clutch mechanism.

Hence, pulley 163 (Fig. 2) is caused to rotate continuously so long as drive motor 141 operates, whereas driven gear 166 is caused to rotate only in response to the energization of the primary clutch magnet (not shown) corresponding to magnet 171 (Fig. 2a). Accordingly, the first two sets of primary feed rolls 26—29 (see also Fig. 1) and the primary card picker mechanism 23 are caused to operate only when the afore-mentioned primary clutch is operated so as to effect the operation of the driven gear 166 (Fig. 2). It may be seen in Fig. 2 that the shaft to which the afore-mentioned first two sets of feed rollers are attached, are driven via gears 174 and 176, each of which is engaged to the aforesaid gear 166. The drive for the conventional primary card picker feed mechanism 23 (Fig. 1) is not shown in Fig. 2, although the same would be taken in a conventional way from a gear (not shown) secured to shaft 164.

Continuously rotating pulley 177 (Fig. 2) is connected to a shaft 178 in order to continuously operate the third set of feed rolls 30—31 (see also Fig. 1). The said shaft 178 has a bevel gear 179 secured thereto for rotation therewith. The gear 179 engages another gear (not shown) which is connected to shaft 181. This latter-mentioned shaft has a plurality of bevel gears 182 secured thereto for operating the feed roller shafts associated with the feed rollers 32—37 (Fig. 1). In addition, a spur gear 183 (Fig. 2) is connected to the shaft for operating feed roller 37 (Fig. 1), which spur gear engages the primary card drum type stacker driven gear 184 (Fig. 2) that is connected to shaft 186 (see also Fig. 1).

Continuously operating shaft 149 imparts a continuous rotating motion to driven gear 187 via gears 188—190. As described previously, motion is imparted to driven shaft 168 and driven gears 191—193 only when the secondary feed unit clutch magnet 171 (Fig. 2a) is energized to permit engagement of the dog 169 with the single tooth disc 167. This disc is secured to drive gear 187 (Fig. 2) for rotation therewith. The gears 192 and 193 are connected to the shafts associated with the first two sets of secondary card feed rollers 56—59 (Fig. 1). Accordingly, the first two sets of feed rolls as well as the secondary card feed picker mechanism 53 are caused to operate only when the secondary feed clutch is operated. The drive mechanism for the picker mechanism 53 is not shown in Fig. 2, although the drive therefor would be imparted via a gear connected to shaft 168.

The shafts 194 corresponding to the third set of feed rolls 60—61 (Fig. 1) are driven continuously via gears 196 (Fig. 2), 197 and 198. The fourth to the eighth sets of feed rolls 62—71 (Fig. 1) are driven continuously via the train of gears shown in Fig. 2 to be driven from the bevel gear 199 that is connected to shaft 149. It will be observed that bull gear 201 is also driven via this latter-mentioned train of gears as well as by the gears 202—204. The ninth to the eighteenth sets of feed rollers 72—91 (Fig. 1) are driven via the bull gear 201 (Fig. 2).

The nineteenth to the twenty-second sets of feed rollers 92—99 (Fig. 1) are continuously operated via a train of gears including gear 208 (Fig. 2) caused to be driven by bull gear 201. Bevel gear 206 engages another bevel gear 207 which is connected to shaft 149, in order to drive a gear train including the gear on shaft 209. The feed roller shaft 209 to which feed roller 103 (Fig. 1) is attached, drives the spur gear shown to thereby drive another bull gear 211. This latter-mentioned bull gear is used to operate the last four sets of secondary card feed rollers 104—113 (Fig. 1) as well as the secondary card drum stacker drive gear 212 (Fig. 2). Gear 212 is secured to shaft 213 (see also Fig. 1) and is driven via gears 216—218 from shaft 214 to which feed roller 113 is secured.

The three continuously rotating spur gears 221—223 secured to shaft 149, are used to drive the mechanism included in the data comparing apparatus employed in the present printer, which apparatus is similar to that shown and described in F. M. Carroll et al. Patent No. 2,442,970 that issued on June 8, 1948. The gear 224 also secured to shaft 149 for rotation therewith, is used to operate the various timing cam contact circuit breaker cams (not shown). The cam contact timings are shown in Fig. 16.

The cleaning brush 133 (Fig. 1) for removing any residual xerographic toner that might remain on the surface of the photoconductive insulating layer 124 after the incremental surface areas thereof have been moved beyond the transfer station 116, is operated by its own electric motor 226. This, of course, is done merely for convenience, inasmuch as the cleaning brush could be driven in any conventional manner by the main drive motor 141.

OPTICAL IMAGE PROJECTING UNIT

Figure 3:
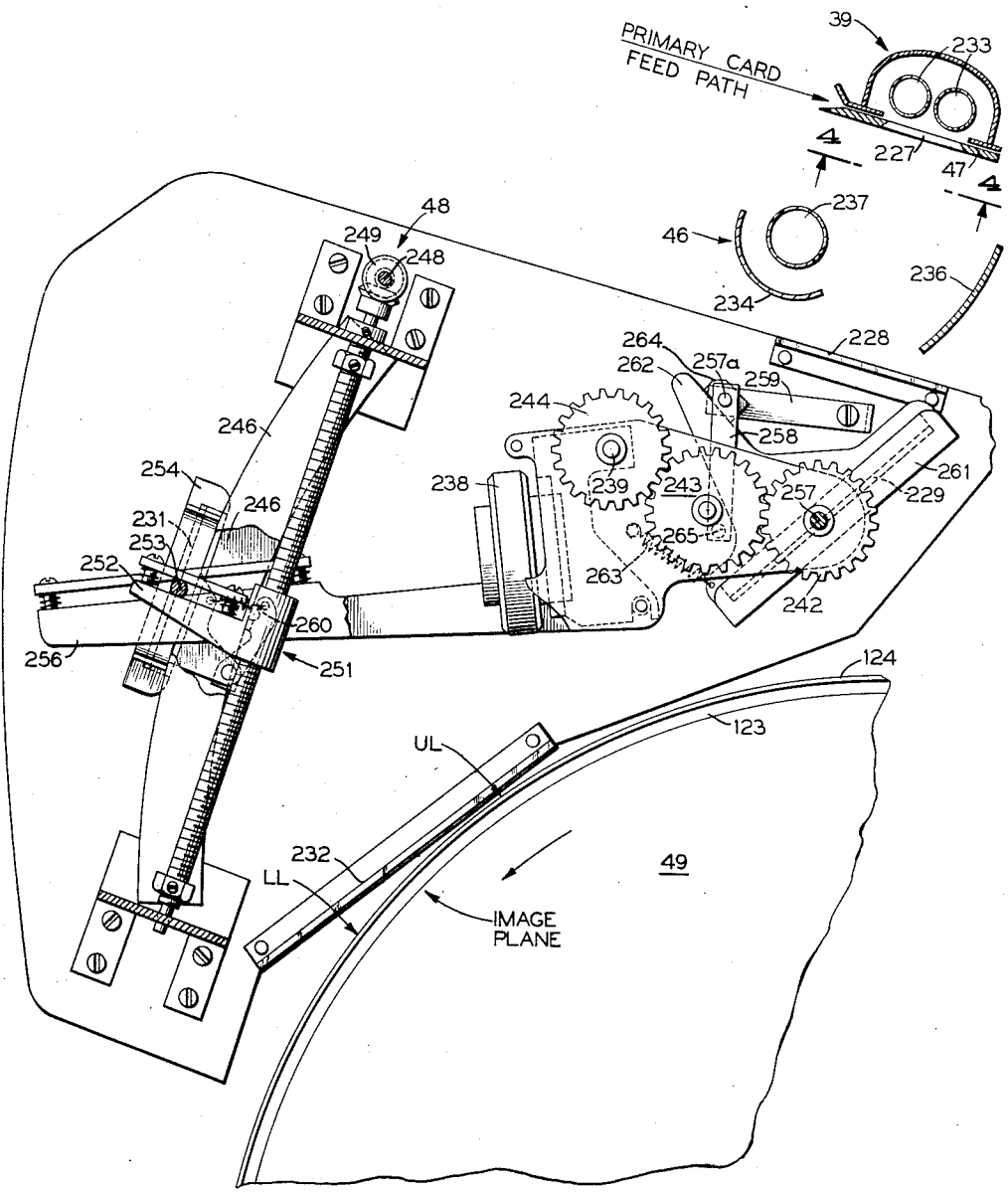
Fig. 3 is a somewhat diagrammatic view of the optical scanning station unit for projecting light images of primary card source information onto the surface of a xerographic drum.
Figures 4, 5:
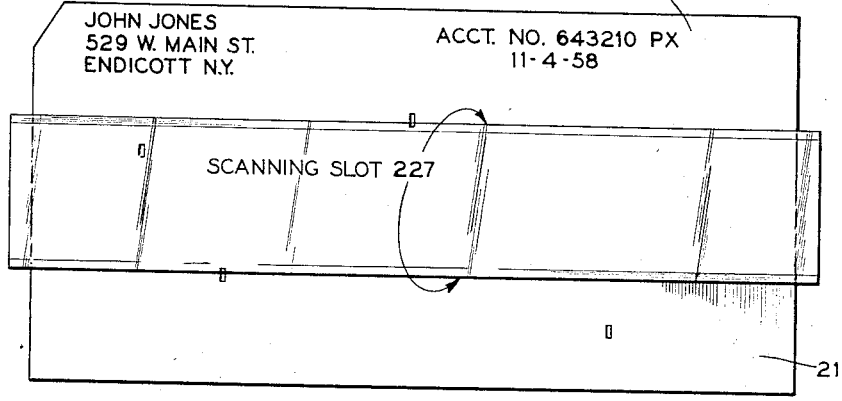
Fig. 4 shows a primary source information card relative the optical scanning station scanning slot member.
Fig. 5 shows a secondary image receiving card with respect to the xerographic drum at the developed image transfer station.

Referring to Fig. 1, it will be recalled that incremental areas of the photoconductive insulating layer 124 are electrically charged positive by the ion-producing unit 126, and then are moved past the optical image projecting station apparatus 48. As each primary card 21 having printed information thereon (see also Fig. 4) is advanced past the scanning station 39 (see also Fig. 3), the optical image thereof is projected from scanning slot 227 through a glass member 228, a pair of mirrors 229 and 231, and another glass member 232, onto the already electrically charged surface of the photoconductive insulating layer 124. Reference might be made at this time to Fig. 4 for a schematic showing of a punched primary card 21 having printed information thereon, in a position relative to the member 47 having the scanning slot 227. It is to be observed that the view shown in Fig. 4 is taken along the line 4—4 of Fig. 3. The scanning station 39 (Fig. 3) includes a light source 233 within a suitable chamber for preventing images of the punched holes found in the primary card from forming. The light source 233 concentrates the light energy produced on the back side of the primary cards at station 39 to illuminate the punched holes and thereby prevents images of these holes from being formed and projected onto the surface of xerographic drum 49. The single light ray projector 46 includes a pair of elliptical trough reflectors 234 and 236 whose center sections are each covered with a diffuse reflecting material, whereas the remaining area sections are each covered with a specular material. As a result, the irradiance across the image plane on the surface of the xerographic drum as defined for all practical purposes by the length of scanning slot 227 (see also Fig. 4), is uniform. This uniform irradiance is, of course, highly desirable in order that the latent electrostatic image formed on the surface of insulating layer 124 across the entire width of the xerographic drum 49, is of constant charge intensity, to thereby provide uniform density printing.

The primary cards 21 (Fig. 4) bearing the information to be transferred onto corresponding secondary cards 51 (see also Fig. 1), may be wider than the xerographic drum 49. In fact, if the well-known eighty column IBM record cards are used with the preferred embodiment of the present invention, the width of these cards will exceed the width of the xerographic drum 49 by approximately two inches. Thus, to avoid losing any of the primary card information image, a suitable lens apparatus is required to accept the image of the information on the primary card wherever it may be, and to then direct it onto any portion of the surface of the xerographic drum 49. It should be clear that this also adds a great deal of flexibility to the present machine. The lens apparatus for shifting the image of the primary card information along the width of the xerographic drum 49 is identified in Fig. 3 by reference numeral 238. This lens 238 can be moved by a worm drive associated with shaft 239 in a direction perpendicular to the view shown in Fig. 3, by a manually operable crank 241 (see also Fig. 1) which is rotated so as to cause a gear 242 (Fig. 3) to rotate. Gear 242 is directly connected to crank 241. As may readily be seen in Fig. 3, shaft 239 is also caused to rotate via gears 242—244 when the crank is operated. A worm drive (not shown) for lens 238 is associated with driven shaft 239 so as to move the lens in a direction normal to the view shown in Fig. 3. Whether this movement is forward or reverse depends upon the direction of rotation of crank 241 (see also Fig. 1). As a result of the lens movement, the image of the information on the primary record card projected onto mirror 229, is caused to be shifted in a direction across the width of the xerographic drum 49 by lens 238. This horizontally-shiftable image is directed onto mirror 231 and is then projected onto the surface of the xerographic drum as afore-described. Accordingly, it is by this lens moving mechanism that primary card information taken from any portion of the primary card may be shifted in a horizontal direction so as to appear in a non-corresponding region of the secondary card. In other words, the name and address information appearing on the primary card 21 in Fig. 4 in the left-hand corner, may be shifted so that the printed image thereof will appear on the right-hand side of a corresponding secondary card.

It is not only desirable to be able to shift the image of the information being transferred in a single direction along one axis, i.e., the so-called horizontal direction, but it is equally desirable to have means provided whereby the image can be shifted in another direction, i.e., the so-called vertical direction. This is acomplished in the present machine by in effect either advancing or retarding the position of the image circumferentially relative the peripheral surface of the xerographic drum 49. Referring to the optical projecting station apparatus 48 (Fig. 3), mirror 231 can be moved along its pair of spaced guide members 246, there being one such guide member located on either end of the mirror frame 254. Mirror 231 is caused to move when manually operable crank 247 (Fig. 1) is rotated. The crank 247 is operatively connected to shaft 248 (Fig. 3). Bevel gear 249 is secured to shaft 248 in order that any rotational movement imparted to crank 247 will effect the operation of the worm drive indicated by reference numeral 251. It would be well to mention here that there is another worm drive similar to drive 251, on the other side of frame 254. However, for the sake of simplicity, only the drive and associated mechanism on the side of frame 254 shown in Fig. 3, will be described. Thus, should the worm drive 251 impart a movement to its L-shaped member 252 in an upward direction, for example, a similar movement will be imparted to mirror 231 via the stud 253. This connecting stud is attached to the mirror frame 254, and is connected to the L-shaped member 252 by a pin and slot arrangement in order that the mirror frame 254 is always free to slide on its pair of guide members 246. The mirror frame 254 is maintained in direct contact with the curved surface of each guide member 246 by a conventional spring biasing arrangement shown in Fig. 3 to include spring 260. Intermediate each L-shaped member 252 (there being one on each side of frame 254) and the mirror frame 254, there is positioned fairly long pivotally mounted arms 256 and 256a. Each of the arms 256 and 256a is pivotable about shaft 257. This arm 256 is connected by a pin and slot arrangement to the afore-mentioned stud 253, so that the lens 238 which is supported, in part, by the arms 256 and 256a, is always aligned with the mirrors 231 and 229. As a result, the optical image projected from mirror 229 through lens 238 is always beamed towards mirror 231.

In concurrence with the "vertical" movement of mirror 231 along the curved surfaces of guide members 246, it is necessary to have a corresponding rotational movement imparted to mirror 229 in a proper direction in order to keep the aforesaid mirrors 229 and 231 in optical alignment. To provide optical alignment of mirror 229 with all positions of mirror 231, the angular change of mirror 229 must be half the angular change of arms 256 and 256a about their shaft 257. Briefly, this is done by an angle divider arrangement consisting of the links 258 and 259, a guide 262 which is fixed to the mirror frame 261, a sliding block 264, and the pin 257a which is secured to block 264. The movement of mirror 229 is brought about as a result of a movement imparted to stud 257a. This is accomplished whenever the arms 256 and 256a are moved about their shafts 257 and 257a in view of the fact that the lower end of link 258 is connected directly to arm 256a via a pin 265, as well as the fact that the right side end of link 259 is connected to the main side frame. The left side end of link 259 and the upper end of link 258 are pivotally connected to stud 257a. The mirror frame 261 which is pivotally mounted on shaft 257, has a guide 262 extending therefrom. This extension is biased by spring 263 so as to maintain constant contact with the side of a block 264 secured to stud 257a. Thus, should the arm 256a be moved in a clockwise direction about its shaft 257 by the worm drive, a so-called scissors type action will occur with respect to links 258 and 259, whereby block 264 will be moved in an upward direction. This is in view of the fact that the lower end of link 258 is directly connected to arm 256a and the right side end of link 259 is connected to the main side frame. Thus, as stated hereinabove, this scissors action will cause stud 257a and its block 264 to be re-located with respect to its position prior to the time that a clockwise movement was imparted to arm 256a, whereupon the mirror frame 261 will also be moved a proper amount in a clockwise direction about shaft 257 due to the bias action imparted thereto by spring 263. Accordingly, the mirrors 229 and 231 are kept in optical alignment with the lens 238.

It is by the optical projecting apparatus described hereinabove that the image of primary card information may be shifted in either one or both directions of a plane coordinate system, and thereby be directed to different areas of the photoconductive insulating layer 124 on xerographic drum 49. As a result, information to be found anywhere on the face of a primary card may be transferred to similar or a different location on a corresponding secondary card within limits defined by the width of the xerographic drum, as aforesaid. As stated previously, this can be accomplished by operating the cranks 241 (Fig. 1) and 247. With only these simple manual controls to effect a shift of the optical image appearing on the curved surface of xerographic drum 49 (Fig. 3), it should be clear that provision must be made to keep the optical images projected onto the curved xerographic drum surface in focus wherever they may be applied. This is accomplished in the present device by moving the mirror 231 along the curved surfaces of guide members 246, which curved surfaces define a portion of an elipse that keeps constant the optical distance measured from scanning slot 227 to any point on the surface of xerographic drum 49. This optical distance is measured from scanning slot 227 to mirror 229, then to mirror 231, and finally to the photoconductive insulating layer 124. Furthermore, this distance must be the same whether the image is projected along the line LL (lower limit) or the line UL (upper limit), in order to keep the image applied to the drum surface in focus.

The guide members 246 are positioned so that they define a portion of an elipse which has as its two foci the center of the xerographic drum 49 and the shaft 257. This is done because the optical distance from scanning slot 227 to mirror 229 and the radial distance from the surface of xerographic drum 49 to the center of the said drum, are each always of constant value. Since, by geometric law, the sum of the straight line distances from any point on an ellipse to the two foci is a constant, the sum of the two distances measured from the axis surface of mirror 231 on the elipse to the axis 257 and to the xerographic drum surface, is always constant. Thus, as stated previously, in view of the fact that the radius of drum 49 is a constant, and since the distance from the scanning slot 227 to the center of shaft 257, is a constant, the optical path from the primary card 21 being scanned to the drum surface 124 must always be a constant notwithstanding the position of the mirrors.

In summation, the image of printed information on a primary card 21 (see also Fig. 4) can be projected onto the surface of the xerographic drum along the line UL, the line LL, or anywhere therebetween simply by operating crank 247 (see also Fig. 1) in order to move mirror 231 (Fig. 3) a suitable amount via the worm drive 251. To keep the optical image so projected in constant focus, the mirror 231 is caused to follow an elliptical path as defined by the curved surfaces of guide members 246. Of course, the lens 238 and the mirror 229 move in corresponding relationship with mirror 231 so that all three elements always remain in optical alignment. A so-called horizontal shift of the image projected onto the surface of xerographic drum 49 may be had by moving lens 238 in a direction normal to the view shown in Fig. 3.

MASKING-ERASING APPARATUS

As brought out previously with reference to Fig. 1, the incremental areas of insulating layer 124 whereon the latent electrostatic images of the primary card information are formed and stored, are moved past the so-called masking-erasing station 127. This station includes a light source 281 (Fig. 8) which is positioned within a transparent cylinder 279 that is rotatable. The cylinder supports an opaque mask 284 that is secured to its outer surface. This mask, of course, cuts off a correspondingly shaped area of light energy projected from source 281 in the direction of the xerographic drum surface. Furthermore, this cylinder 279 which is adjacent the xerographic drum 49 (see also Fig. 1) can be rotated when a clutch associated therewith is operated. Normally, however, the cylinder is positioned so that when the aforesaid clutch is not operated and the cylinder is stationary the mask is not interposed between the light 281 and the xerographic drum 49.

It should be clear then that if the cylinder 279 is not rotated, all of the latent electrostatic images stored in incremental areas of the xerographic drum and passing station 127, will be erased. If, however, the cylinder is caused to rotate in a timed relation with the movement of xerographic drum 49, all but a select predetermined portion of the latent electrostatic images will be erased. That image which remains corresponds to the masked area 284 as well as the image to be printed. Accordingly, there is had a selective latent electrostatic image erasing means.

Referring to Fig. 6, pulley 266 (see also Fig. 2) is rotated continuously via the drive mechanism including gears 157, 267 and 268, and the timing belt arrangement 269. As is shown in Fig. 6, pulley 266 is caused to rotate about a bearing 271. Furthermore, the one tooth disc 272 (see also Fig. 7) is an integral part of pulley 266. The spring-biased dog 273 (Fig. 7) is pivotally mounted on a stud 274 which is affixed at one end thereof to a circular member 276 (see also Fig. 6) which, in turn, has secured thereto a pin 277 for movement therewith by conventional means. This pin projects into a suitable aligning slot 278 (see also Fig. 8) to be found in the masking cylinder 279. As the description advances, it will become clear that the pin slot arrangement is used to not only align the masking cylinder 279 timewise with the printer in general, but to also impart the necessary driving motion to the said cylinder.

As stated previously, an elongated light source 281 is arranged inside of cylinder 279, and is supported at either end thereof by conventional light tube sockets and holders for both supporting the light tube and for providing proper electrical connections thereto. During those periods that the afore-mentioned dog 273 (Fig. 7) is not engaged with the single notch in disc 272, the cylinder 279 (Fig. 6) is stationary. Furthermore, this masking cylinder is in a position whereby light energy may be transmitted from the light source tube 281 through the transparent cylinder 279 and a suitable light collimating means 291, onto the surface of the photoconductive insulating layer 124 (see also Fig. 1). As might be expected, the collimator 291 is used to keep the light rays which are transmitted from source 281, parallel to each other.

When the masking-erasing station clutch magnet 282 (Fig. 7) is energized via a circuit to be described in detail hereinafter, the armature 283 thereof is caused to unlatch the spring-biased dog 273 which, in turn, is caused to engage the continuously rotating one tooth disc 272. In view of the fact that the disc 272 (see also Fig. 6) is continuously rotating, and inasmuch as dog 273 is mounted on a stud 274 which is fixed at one end thereof to member 276, masking cylinder 279 is caused to rotate along with member 276 when magnet 282 is energized via the connection afforded by pin 277 and slot 278 (see also Fig. 8).

As stated hereinabove, transparent masking cylinder 279 has an opaque mask 284 on the outer surface thereof for preventing light energy from source 281 to impinge onto an area of the photoconductive insulating layer, which area corresponds to the configuration of mask 284. Thus, should it be desired to transfer only the name and address information in the upper left-hand section of the primary card 21 (Fig. 4); i.e., not other information, such as the account number 643210PX for example, opaque mask 284 (see also Fig. 8) would be shaped to mask out only the name and address portion of the latent xerographic image so as to prevent light energy from source 281 to impinge the surface of the xerographic drum whereat the name and address latent electrostatic image is stored. Of course, the size of this mask 284 would be limited to only the xerographic drum surface area whereat the name and address latent electrostatic image is stored. Accordingly, other latent electrostatic image information on the xerographic drum, such as that corresponding to the account number for example, would be erased.

Thus, the masking-erasing station 127 (see also Fig. 1) affords a very flexible and convenient means not only for erasing whatever information is not to be transferred, but also for preventing the erasure of that information which it is desired to have transferred. The machine operator can have any number of cylinders 279 on hand, each such cylinder having a differently shaped mask 284 thereon each for a specific purpose. One masking cylinder 279 can be inserted in place of another such cylinder simply by removing the end 292 (Fig. 6), which end is held in place by a conventional jar cover type spring 287. Once the end 292 is removed, the cylinder 279 may simply be pulled out and another put in its place. The printing machine operator is assured that the new masking cylinder is in general alignment with the printing machine when the slot 278 is alingned with the drive pin 277.

The collimator 291 is necessary, of course, to keep the light rays from spreading instead of remaining substantially normal to the surface of the xerographic drum. Thus, as the mask 284 (Fig. 8) is moved relative the drum surface, an area thereof corresponding to the area of mask 284 is masked from light energy produced by tube 281.

Referring to Fig. 17, it can be seen that the masking-erasing apparatus clutch engages at approximately 281° of a machine cycle only when the clutch is operated. This arrangement permits a timing relationship between the masking cylinder and the xerographic drum, whereby the cylinder completes a single rotation for each partial rotational movement of xerographic drum 49 that represents a single primary card. Hence, when the masking-erasing cylinder is not rotated for a single machine cycle, the latent electrostatic image of a primary record card moved past station 127 (Fig. 1) at that time, is completely erased. On the other hand, when the said cylinder is rotated for a given single machine cycle, all but the "masked" portion of the latent electrostatic image of a primary card, is erased.

DEVELOPER UNIT APPARATUS

It should be clear at this time that whenever the masking cylinder 279 (Fig. 8) within the masking-erasing station 127 (Fig. 1) is caused to complete one revolution, a latent electrostatic image of the primary card information to be transferred onto a secondary card will remain on the photoconductive insulating layer 124. It is necessary to develop, or visibly define, these remaining latent electrostatic images which appear on photoconductive insulating layer 124 after the incremental surface areas thereof are moved past station 127. This is accomplished in the preferred embodiment of the present invention by the apparatus in developing station 128.

A so-called brush developer appartus similar to that shown and described in copending W. D. Bolton et al., U.S. patent application Serial No. 554,515, filed on December 21, 1955, is employed in order to apply the xerographic toner to the surface of insulating layer 124 whereon latent electrostatic images are formed. A soft fur brush 293 (Fig. 12) is used in brush development to impart the necessary triboelectric charge to the xerographic toner particles transferred to the drum surface. It is by the somewhat vigorous agitation of the fur brush hairs relative the xerographic toner particles that a negative triboelectric charge is imparted to the toner particles, and a positive triboelectric charge is imparted to the brush hairs. As is evident, the brush 293 is also used to convey the xerographic toner from a suitable source of toner supply 294 (see also Fig. 1) to the surface of the insulating layer 124 whereon the latent electrostatic images are stored.

The principle of brush development as it is now known in its simplest form may be explained quite easily. A brush 293 of either beaver or red fox skin, for example, is secured to a rotatable drum or cylinder 296 which, in turn, is so positioned that the brush hairs 293 thereof move through a mass of xerographic toner in a source reservoir 294 (see also Fig. 1), and also in physical contact with the surface of the insulating layer 124. The physical contact between the brush hairs and the toner particles causes a triboelectric charge to be imparted to the toner particles so acted upon. The use of a fur skin such as the beaver or the red fox referred to hereinabove, as well as the use of xerographic toner described previously, causes a negative triboelectric charge to be imparted to the toner particles and a positive triboelectric charge to be imparted to the brush hairs. Thus, as incremental areas of the insulating layer 124 having positively charged latent electrostatic images thereon, are subjected to the negatively charged toner particles, the said particles are caused to adhere to the positively charged surface areas of the insulating layer 124. As a result, the latent electrostatic images are developed as the drum surface areas move through developing station 128.

In addition to rotating the fur brush 293 in a clockwise direction at a rate such that the peripheral speed of the brush exceeds the peripheral speed of the xerographic drum 49 so that a brush wiping action results, the developing brush is stippled relative the surface of the insulating layer 124. Stippling is accomplished by moving, i.e., oscillating, the brush 293 towards and away from the photoconductive insulating layer 124 (see also Fig. 1) so that the hairs of the brush are caused to produce a "patting" action relative the insulating layer surface. It has been found through actual practice that good results can be had by moving the developing brush from one limit whereat the brush hair ends are barely in contact with the surface of the insulating layer 124 to another limit whereat the brush has been moved radially a distance of approximately ⅜ of an inch towards the xerographic drum 49 along a straight, radial line pretty much defined by the brush and xerographic drum centers. Furthermore, for example, it has been found that if the xerographic drum 49 is rotated at a rate whereby a lineal surface speed of 700 inches per minute is realized, good brush developing results may be had by rotating the developing brush 293 at a rate whereby a brush surface speed of 1700 inches per minute is had, and by stippling the said brush at a rate of 1200 per minute. In connection with the foregoing, it should be pointed out that the action which actually takes place is not too clear at this time. Accordingly, the figures as stated are not to be taken as limitations but rather as examples. Needless to say that the entire subject of brush development will be understood more clearly as the chemical and physical properties of natural and synthetic brushes, as well as electroscopic toners, are understood.

It has already been explained in connection with the description of the machine drive mechanism shown in Fig. 2, that shaft 147 is continuously rotating so long as the drive motor 141 is operating. This means of course that the drive portion of the spring clutch 297 (Fig. 12) is continuously operating. In response to the energization of clutch magnet 298 by circuit means to be made clear, the spring clutch 297 is caused to operate. Thus, the driven shaft 299 is caused to operate along with the gears 300—302 which are secured to this said shaft 299. The gears 300 and 302 are each engaged with gears 304 and 305, respectively, both of the latter-mentioned gears being secured to a common shaft (not shown). Gear 305, in turn, engages gear 306 which has secured thereto for movement therewith a pulley 307. Thus, by the belt and pulley arrangement shown in Fig. 12, the power directed to pulley 307 is transmitted to another pulley 308 which is secured to a shaft 309. The developing brush 293 is fastened to this very same shaft 309. Hence, whenever clutch magnet 298 is energized, a rotary motion is imparted to brush 293 via shaft 299, gears 302, 305 and 306, and pulleys 307—308.

The requisite stippling action is imparted to developing brush 293 whenever the driven shaft 299 is caused to operate. This is by way of a link 311 which is eccentrically mounted at its upper end on shaft 299. Thus, as shaft 299 is caused to rotate, arm 311 is caused to reciprocate and arm 312 is caused to rock relative the center of its shaft 313 to which arm 312 is secured. The brush shaft supporting link 314 is also secured to shaft 313 for movement therewith. As a result, the link 314 is caused to rock about the center of shaft 313 whenever arm 312 is caused to rock, and thereby developing brush 293 is caused to rock.

Figure 12:
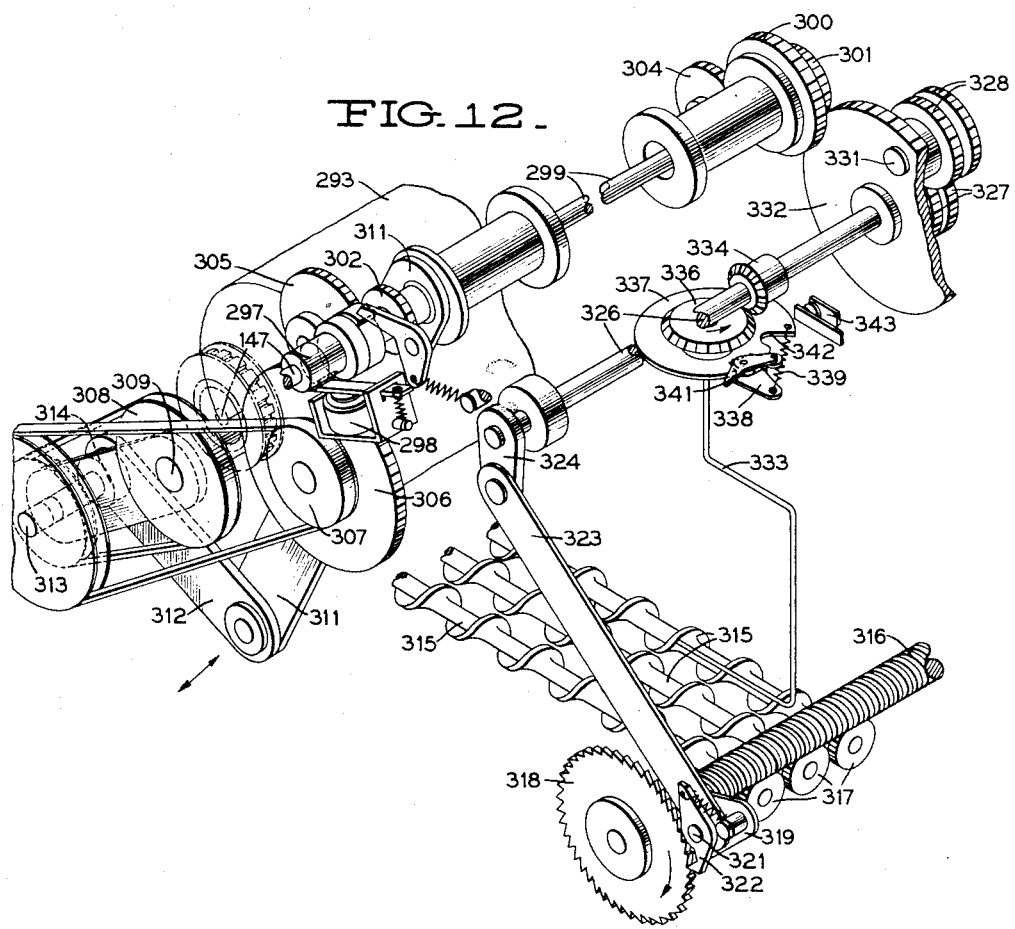
Fig. 12 is an isometric view of the brush-type developer apparatus.

The toner reservoir 294 (Fig. 1) per se is not shown in Fig. 12 so as to provide a clear showing of the brush developer apparatus. However, it should be understood that normally there is a sufficient quantity of xerographic toner within this reservoir so as to completely cover the fluted toner feeding members 315. The structural arrangement is such that whenever threaded shaft 316 is caused to rotate, the afore-mentioned fluted members 315 are also caused to rotate via their respective gears 317. As these fluted members rotate, their respective flutes move or push a quantity of xerographic toner in the direction of brush 293 for use by the brush. This action then makes certain the fact that a quantity of xerographic toner will always be available at brush 293. As is shown in Fig. 12, threaded shaft 316 is attached to notched disc 318. A dog carrying member 319 is freely mounted on shaft 316, and has projecting therefrom a stud 321 whereon a spring-biased dog 322 is freely mounted. There is arranged intermediate this dog and member 319, a connecting link 323 which is connected by way of another link 324 to shaft 326. This shaft 326 has connected thereto for movement therewith a pair of driven gears 327 which are in mesh with the so-called planetary drive gears 328. The latter-mentioned gears are supported by a stud shaft 331 that projects outwardly from gear 332 which is engaged with gear 301. This latter-mentioned gear, as will be recalled, is secured to shaft 299. Thus, whenever clutch magnet 298 is energized so as to permit the spring clutch 297 to engage, whereby shaft 299 and gear 301 are caused to rotate, motion is imparted to gears 327 via gears 332 and 328. Of course, due to the particular gear arrangement used, gears 327 and their corresponding shaft 326 are not caused to rotate one complete revolution for each complete revolution effected by gear 301. The reason for doing this is that the amount of xerographic toner that is needed to be pushed or fed to brush 293, is of a limited quantity. Hence, as shaft 326 is caused to rotate, the link 324 attached thereto is also caused to rotate therewith, whereby link 323 is caused to reciprocate. Hence, as link 323 is moved in a generally upward direction, the dog 322 simply rides over the teeth appearing on notched disc 318. However, as the link 323 is moved in a generally downward direction, the dog 322 engages a tooth on ratchet 318 whereupon the ratchet and its associated threaded shaft 316 is caused to move a given amount. It might be pointed out here that a manually settable shroud (not shown) could be placed over ratchet 318 so that by its setting it would be possible to determine which tooth engages dog 322. That is, the dog would ride on the shroud until it dropped off the same to engage the first tooth presented.

Figure 12A:
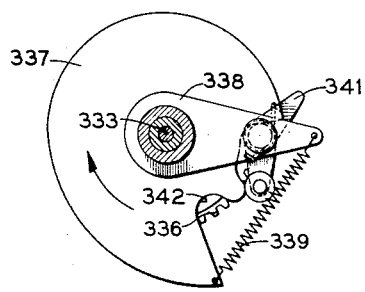
Fig. 12a is a view of the operating mechanism for the toner measuring device.

It should be apparent that it would be undesirable to have occur the condition whereby the amount of xerographic toner in the toner reservoir 294 (Fig. 1) would be completely depleted. To avoid such a situation, the toner checking apparatus including stir rod 333 (Fig. 12) is provided. Thus, as shaft 326 is caused to move in the manner described hereinbefore, the bevel gear 334 attached thereto imparts a rotary movement to its associated bevel gear 336. Notched disc 337 is connected to bevel gear 336 (see also Fig. 12a) for rotation therewith. Furthermore, a member 338 is loosely positioned with respect to disc 337 but is fixedly attached to stir rod 333. This said member 338 is biased by a spring 339 in a direction such that the contact operating element 341 is caused to be drawn toward the notched disc land 342. When the contact operating element 341 is caused to be up against land 342, the tail of this element 341 extends from without the outer circumference of disc 337 in order to operate upon the contact strap 343. As will be described in detail hereinafter, should the contact strap 343 be operated upon so that the contacts thereof are caused to close, there will appear a signal indicating a lack of xerographic toner in the toner reservoir. However, so long as there is a sufficient quantity of xerographic toner in the toner reservoir, the batch of toner per se will present a sufficient obstacle to the movement of the stir rod 333 so as to keep the contact operating element 341 away from land 342 and into the position shown in Fig. 12. That is, the contact operating element 341 will be maintained in the position shown in Fig. 12 against the action of biasing spring 339, however. With the contact operating element 341 in the position shown, the contact operating tail thereof is in such a position as to pass the contact strap 343 without operating the same. In summation, with a quantity of toner in the toner reservoir, the stir rod 333 and its arm 338 along with the associated apparatus, will be maintained in a position whereby contact operating element 341 will not engage the contact strap 343. As soon as the quantity of toner has reached a dangerous minimum, the biasing spring 339 will overcome the barrier force exerted upon the stir rod by the xerographic toner, to position the operating element 341 against land 342. This will permit the element 341 to operate the strap 343.

TRANSFER UNIT

As mentioned previously, the xerographic image transfer apparatus employed within transfer station 116 (Fig. 1) in the preferred embodiment of the present invention, is similar to the transfer apparatus shown and described in detail in copending U.S. patent application Serial No. 419,314, filed by C. J. Fitch on March 29, 1954. As a result, this apparatus will be described but briefly herein. The transfer roller 348 (see also Fig. 10) for effecting the transfer of the xerographic image appearing on the surface of the insulating layer 124 (Fig. 1) of drum 49 onto the surface of a secondary card, comprises in general an inner metallic conductive portion 346 (Fig. 10) and an outer portion 347 of very resilient or yielding material having a high electrical resistance of at least $10^6$ ohms per cubic centimeter. For example, this could be a layer of soft conducting rubber. To transfer the developed xerographic drum images onto select secondary cards, the transfer roller 348 which is spring-biased in the direction of the xerographic drum 49, is moved during print time so as to sandwich the secondary card between the photoconductive insulating layer 124 and the transfer roller 348. In addition, a positive potential must be applied to the transfer roller by way of a brush 376 (see also Fig. 9) so as to cause the xerographic toner image particles to migrate from the surface of the xerographic drum 49 to the surface of the secondary card at the transfer station.

Figure 10:
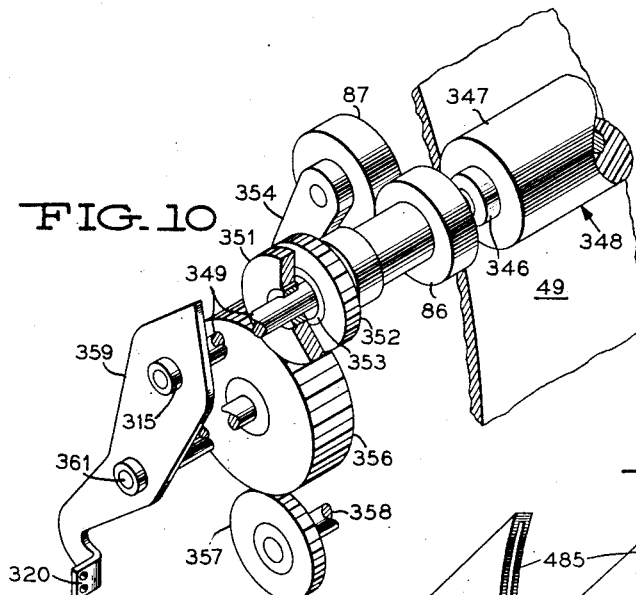
Fig. 10 is an isometric view of the transfer roller and associated mechanism.

Referring to Fig. 10, transfer roller 348 is secured to shaft 349 for rotation therewith. This is the same shaft to which driven gear 351 (see also Fig. 2) is attached. Gear 352, on the other hand, is secured to a cylinder 353 which, in turn, supports the secondary card feed roller 86 (see also Fig. 1). A radial movement of gear 352 (Fig. 10), cylinder 353 and feed roller 86, is prevented by a suitable machine frame member (not shown); that is, the latter-mentioned mechanism is mounted for rotational movement only. Feed roller 87 is supported by a pivotally mounted arm 354 (see also Fig. 9) which is spring-biased as shown. As is shown in Fig. 10, gears 351 and 352 are each driven by a large spur gear 356 (see also Fig. 2) which, in turn, is driven by a smaller spur gear 357. This latter-mentioned gear is mounted on the same shaft 358 to which feed roller 84 (Fig. 1) is secured. Hence, inasmuch as feed roller 84 is caused to rotate continuously as described previously, the feed rollers 86 (Fig. 10) and 87 as well as the transfer roller 348 must also be caused to rotate continuously.

Member 359 (Figs. 9 and 10) is pivotally mounted with respect to shaft 361 to which gear 356 is secured. This member 359 also has a bushing 315 at one end thereof for freely supporting shaft 349 to which the transfer roller 348 is connected. The lower, turned-over end 320 of member 359 is maintained in physical contact with another member 362 (Fig. 9) by the action of a biasing spring 363. The member 362, in turn, is secured to a shaft 364 which is freely mounted in the machine frame. Furthermore, this shaft 364 has secured thereto for movement therewith a cam follower arm 366. A second biasing spring 367 maintains the turned-over portion 320 of member 359 in contact with the upper end of member 362. When the transfer roller control magnet 368 is de-energized by means to be described, the armature 369 thereof latches the cam follower member 366 at its upper limit whereby arm 359 is caused to be pivoted about shaft 361 in its most clockwise limit. Since the cylinder 353 (Fig. 10) has an internal diameter which is considerably larger than the outer diameter of shaft 349, the said shaft 349 along with the gear 351 and the transfer roller 348 attached thereto, will be shifted away from the surface of xerographic drum 49. The amount of shifting movement needed and provided is simply that which is enough to remove the transfer roller 348 completely away from the surface of the xerographic drum 49. It is to be observed that although the shaft 349 and its aforementioned integral parts 351 and 348 are shifted, gear 352 for operating its feed roller 86 is not moved. Feed roller 87 is, of course, maintained in constant contact with the feed roller 86 due to the ever constant biasing action of spring 371 (Fig. 9).

Consequent upon the energization of magnet 368, the armature 369 thereof is caused to unlatch the cam follower arm 366 so that the cam follower roller 372 thereof is permitted to ride on the periphery of cam 373. As is shown in Fig. 2, cam 373 is caused to operate continuously via the gear train that includes those gears secured to shaft 374, in fact the same shaft to which feed roller 82 (Fig. 1) is secured. Thus, with the unlatching of cam follower arm 366 (Fig. 9), arm 359 is permitted to move to its most counterclockwise limit. Thereupon, the transfer roller 348 is moved radially to a position whereby it can ride upon the outer surface of the xerographic drum 49 (see also Fig. 17). As stated previously, the requisite positive potential needed to transfer the developed xerographic images from the surface of the xerographic drum onto select secondary cards, is provided via the brush 376 which is connected at its outer end to the transfer roller 348.

In summation, while magnet 368 (Fig. 9) is de-energized, the transfer roller 348 will be positioned so that a clearance exists between the outer surfaces of the transfer roller 348 and the xerographic drum 49. A secondary card being advanced through the transfer station at this time will be guided by the feed rollers 86—87 (see also Fig. 10) out of contact with the transfer roller 348. As a result, there will be no developed image transfer. On the other hand, with magnet 368 energized, the transfer roller will be moved into contact with the surface of xerographic drum 49. A secondary card that is advanced through the transfer station at this time will still be guided by the feed rollers 86—87, but will have a developed image transferred thereto due to the effect of the transfer roller which is in contact with the card.

CARD ALIGNER UNIT

An examination of Fig. 1 will show that the primary card feed unit is quite short as compared with the secondary card feed unit which, in fact, defines a long, winding card path. This, of course, means that there is always a possibility that the secondary card 51 will be moved slightly out of registration or alignment with respect to the developed xerographic images that appear on the surface of xerographic drum 49. Needless to say, this would be very undesirable particularly should misalignment occur prior to the time the secondary cards are passed through transfer station 116. To make certain that all of the secondary cards are in proper alignment as each passes through the transfer station 116, a so-called in-flight card aligner is provided. This aligner is represented in Fig. 1 by reference numeral 114. The operation of the card aligner mechanism is such as to avoid any secondary card lost time insofar as the feeding of secondary cards is concerned, as well as to re-align all secondary cards while each is moving through the card aligner station.

Figure 14:
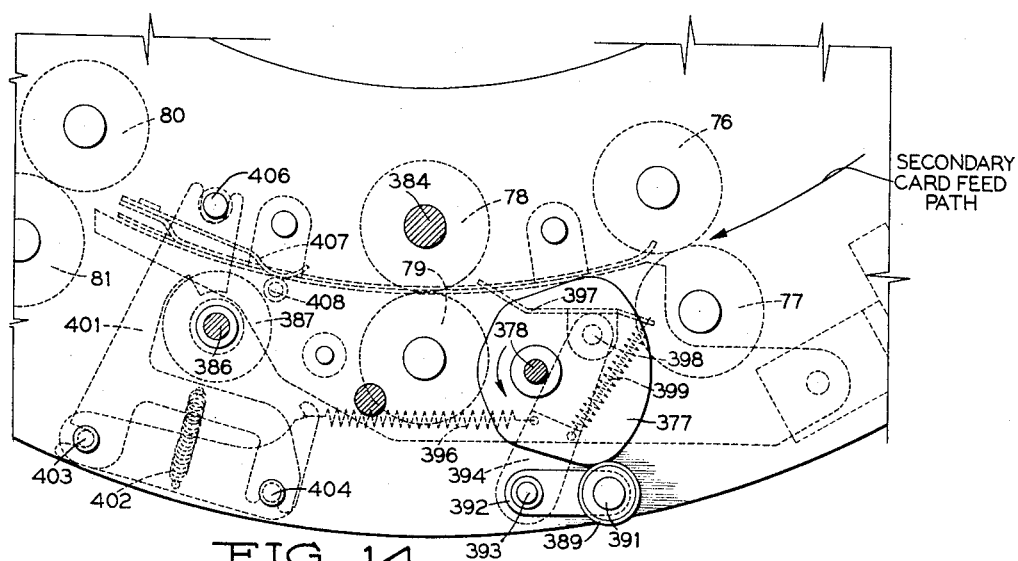
Fig. 14 is an elevation of the secondary card feed unit in-flight card aligning mechanism.

Referring to Fig. 14, the secondary card feed path shown therein is in general that within block 114 of Fig. 1 so as to cause the secondary cards to be moved in a generally leftward direction. The position of most of the feed rollers in the secondary feed unit including rollers 76—79 (Fig. 14), is such that the leading edge of a moving secondary card is moved into the bite of a next following set of feed rollers prior to the time that the trailing edge of the said moving secondary card is advanced out of the bite of the feed rolls preceding the aforesaid next following set. This, however, is not the case insofar as feed rollers 78—81 are concerned. That is, the distance between the bite of feed rollers 78—79 and the bite of feed rollers 80—81, exceeds the width of a secondary card. Hence, it should be clear that some additional card advancing means is necessary to move a secondary card into the bite of feed rollers 80—81.

Continuously rotating cam 377 is secured to a shaft 378 (see also Fig. 2) which has another gear 379 secured thereto. The gear 379 is driven by a gear 381 which, in turn, drives the gear 382, and gear 381 is driven by a gear 383 connected to the same shaft 384 to which feed roller 78 (Fig. 14) is connected. Gear 382 (Fig. 2) is connected to a shaft 386 (Fig. 14) to which a pair of so-called barrel-type cams 387 (Fig. 13) and 388 are connected.

Referring to Fig. 14, cam follower roller 389 is rotatably mounted on a stud shaft 391 which is fixed to a link 392. This link is secured to another shaft 393 to which a pair of spaced pusher arms 394 (see also Fig. 13) and 394a are fastened. Each pusher arm is biased in a counterclockwise direction about the shaft 393 by a respective spring 396 which also maintains the cam follower roller 389 in contact with the surface of constantly rotating cam 377.

Each card pusher 397 and 397a is freely mounted on a rspective pin 398 and 398a which is inserted in a respective pusher arm 394 and 394a. The pushers 397 and 397a are each biased in a clockwise direction about their respective pins 398 and 398a by a pair of springs 399 and 399a. As is shown in Fig. 13, the pusher 397a which is similar to the pusher 397, is provided so that the advancing secondary card can be operated upon at two spaced points of its trailing edge.

Figure 13:
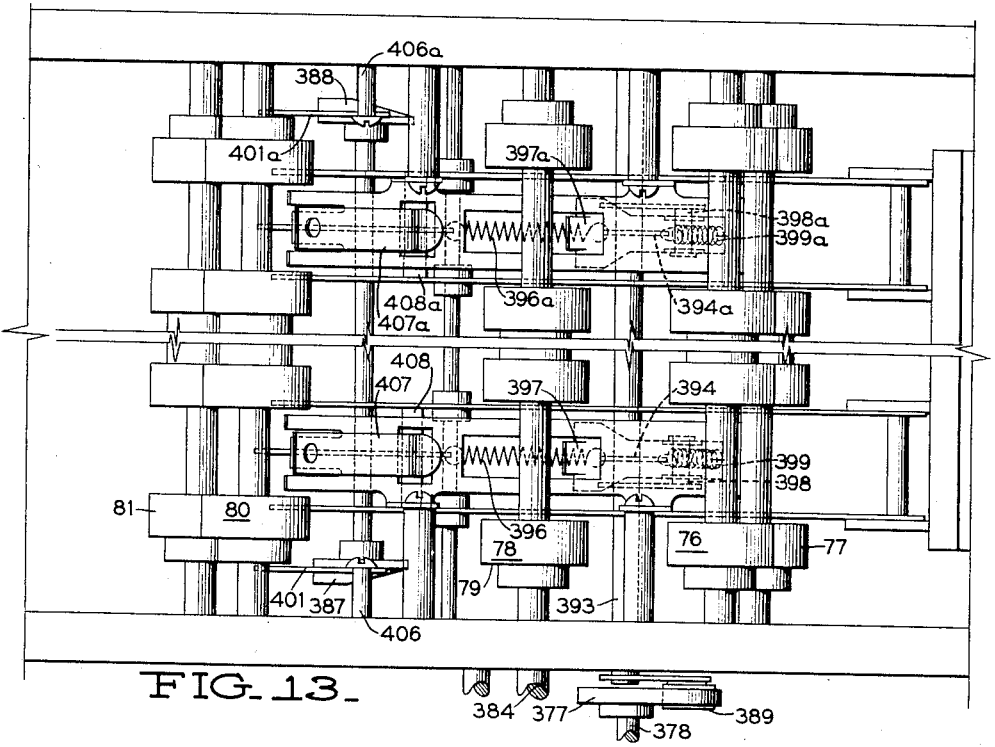
Fig. 13 is a plan view of the secondary card feed unit in-flight card aligning mechanism.

Referring to Figs. 13 and 14, a pair of card side aligners 401 and 401a are each arranged to follow their respective barrel cams 387 and 388. Each of these side aligners is pivotally fixed at its lower end to the rods 403 and 404 by placing the said aligners in undercut slots in the rods. Furthermore, each aligner is biased in a direction toward its respective barrel cam 387 or 388 by a suitable spring, such as the spring 402 which is associated with the side aligner 401 for example. This arrangement will be described in greater detail with reference to Fig. 14. As stated previously, the side aligner 401 is positioned within an undercut groove in each of the rods 403 and 404, and the spring 402 urges the aligner 401 along guiding rod 406 to follow its barrel cam 387. Thus, the upper end of side aligner 401 is oscillated in a direction substantially normal to view shown in Fig. 14 as the cam 387 is caused to rotate. This is also the case with side aligner 401a (Fig. 13). A pair of friction springs 407 and 407a which normally ride on fixed rollers 408 and 408a positioned below the secondary card feed line, is provided to prevent a secondary card from being advanced into the bite of feed rollers 80—81 by the momentum of the moving card. The friction provided springs 407—407a and rollers 408—408a can be overcome, of course, by the action of card pushers 397 and 397a on the trailing edge of each secondary card.

Thus, as a secondary card is advanced past rollers 76—77 (Fig. 14), the leading edge thereof will encounter the upper surfaces of the pushers 397 and 397a (see also Fig. 13), and will cause these spring-biased pushers to be moved in a counterclockwise direction about their respective pins 398 and 398a. Immediately thereafter, the leading edge of this secondary card is acted upon by feed rollers 78—79, whereupon the advancing secondary card is moved to a position such that it is between the springs 407—407a and rollers 408—408a. As the card moves beyond the end of the pushers 397 and 397a, these pushers are released and caused to move in a clockwise direction about their respective pins 398—398a under the urging of their respective springs 399 and 399a. The mechanical timing provided (see also Fig. 17) is such that the pushers will at this time begin to follow the still advancing secondary card which as yet is being advanced by the feed rollers 78—79. However, as soon as the card has been moved beyond these latter-mentioned feed rollers, i.e., out of the bite of these rollers, the pushers 397 and 397a will engage the trailing edge of the secondary card. This will then advance the card into the bite provided by feed rollers 80—81. At this same time, the card side aligners 401 and 401a will be caused to move inwardly to engage the sides of the advancing secondary card. Thus, any misalignment of a secondary card will at this time be corrected by the pushers 397 and 397a at the trailing edge of the card and the aligners 401 and 401a at the sides thereof. Accordingly, when the leading edge of the secondary card is advanced into the bite provided by feed rolls 80—81, the card will be in perfect alignment. This is shown diagrammatically in Fig. 18. When the card is fed into the bite of these latter-mentioned feed rollers, the pushers and their respective mechanisms are caused to move away from the direction of normal secondary card feeding. This, as is clearly shown in Fig. 14, is provided by the action of cam 377 upon the cam roller 389. In addition, during the time that the pushers are moved back to a starting point, the card side aligners 401 and 401a are moved outwardly; i.e., away from their positions whereat they engage the sides of a secondary card.

The in-flight aligner correction provided by the subject in-flight card aligner mechanism, is shown in somewhat exaggerated form in Fig. 18. The secondary card 51 as shown in position "A" thereof is being advanced by feed rollers 78—79 (Fig. 14) while in a considerably misaligned position. When shown in position "B," the pushers 397 and 397a are behind the trailing edge of the secondary card and the side aligners 401 and 401a are at their most outward position away from the card edges. The card 51 is shown in position "C" to be completely realigned as aforedescribed by the action of the pushers and the side aligners, just prior to being advanced into the bite provided by feed rolls 80—81 (see also Figs. 13 and 14).

XEROGRAPHIC IMAGE FIXER UNITS

As stated previously, there are a number of known ways and means whereby xerographic images can be permanently affixed to their record sheets. Structure defining the units for accomplishing toner image fixing by two well-known methods, i.e., by toner solvent vapor fixing and by heat fixing, is shown in the drawings of the preferred embodiment of the present invention, and will now be described.

*Solvent vapor fixing units.*—The solvent vapor method of permanently affixing the xerographic toner image, is to expose the unfixed toner image to the vapor of a compound which is actually a solvent for at least one constituent part of the xerographic toner. This serves to dissolve enough of the xerographic toner so that the resulting solution thereof penetrates into the fibers of the toner image supporting record sheet, i.e., a secondary record card in the present case, and fixes the image indelibly in the card. This plan has the advantage that it neither changes the dimensions of the record card, nor materially affects the moisture content thereof. This, in turn, prevents warping or curling of the record card. As is disclosed in U.S. Patent No. 2,726,166, issued to R. W. Greaves on December 6, 1955, the vapor per se of the solvent does not appear to be effective to secure the desired results. To get such desired results, it seems necessary that some small portion at least of the vapor be condensed on or in the immediate vicinity of the toner particles to be fixed. In order to effect this result, it is necessary that heat be extracted from the secondary record card at about the time it is exposed to the solvent vapor or immediately in advance of this time, so that the temperature of the record card, when exposed to the solvent vapor, will be somewhat less than the boiling point of the solvent used at the ambient pressure. A preferred solvent that is eminently suitable for the present purpose, is trichloromonofluoro-methane ($CCl_3F$) which has a boiling point at atmospheric pressure of about 74.7° F.

In the embodiment shown in Fig. 1, the secondary record cards are each cooled by a heat abstraction means 411 prior to their entry into the fixing chamber 412, i.e., the aforesaid solvent vapor zone. It is contemplated that any type of cooling means effective to cool each secondary card immediately in advance of the exposure thereof to the solvent vapor, will be effective to carry out the present method. The liquid solvent within chamber 412 is vaporized by a heater 413 at the bottom thereof, so that as each secondary card carrying the unfixed xerographic image thereon passes into and through chamber 412, the solvent vapor is caused to cover the card and the xerographic image thereon. Inasmuch as the secondary card has been cooled as afore-described, the solvent vapor is condensed to a small but necessary extent in the immediate vicinity of the xerographic toner forming the image. This condensed vapor which is so small in amount that droplets thereof cannot even be seen by the naked eye, is yet in a liquid state and is sufficient in amount to effect the solution of some one or more constituents of the toner. Hence, the solution so formed may run into the fibers of the secondary card itself, between the fibers thereof and create a permanent image indelibly carried by the secondary card. After passing beyond the solvent chamber 412, each secondary card with a fixed image thereon is caused to move past a suitable heating means 414 for driving off any excess solvent vapor that is being carried by the secondary cards.

*Heat fixing unit.*—A suitable heat fixing apparatus for use in the preferred embodiment of the present invention, is shown in Fig. 11. This unit can be used in place of the aforedescribed solvent vapor fixing apparatus. In this connection, it is to be observed that the heat fixing apparatus shown in Fig. 11 may be correlated with the aparatus shown in Fig. 1 by way of the feed rollers 100—109 shown in both drawings.

Figure 15A:
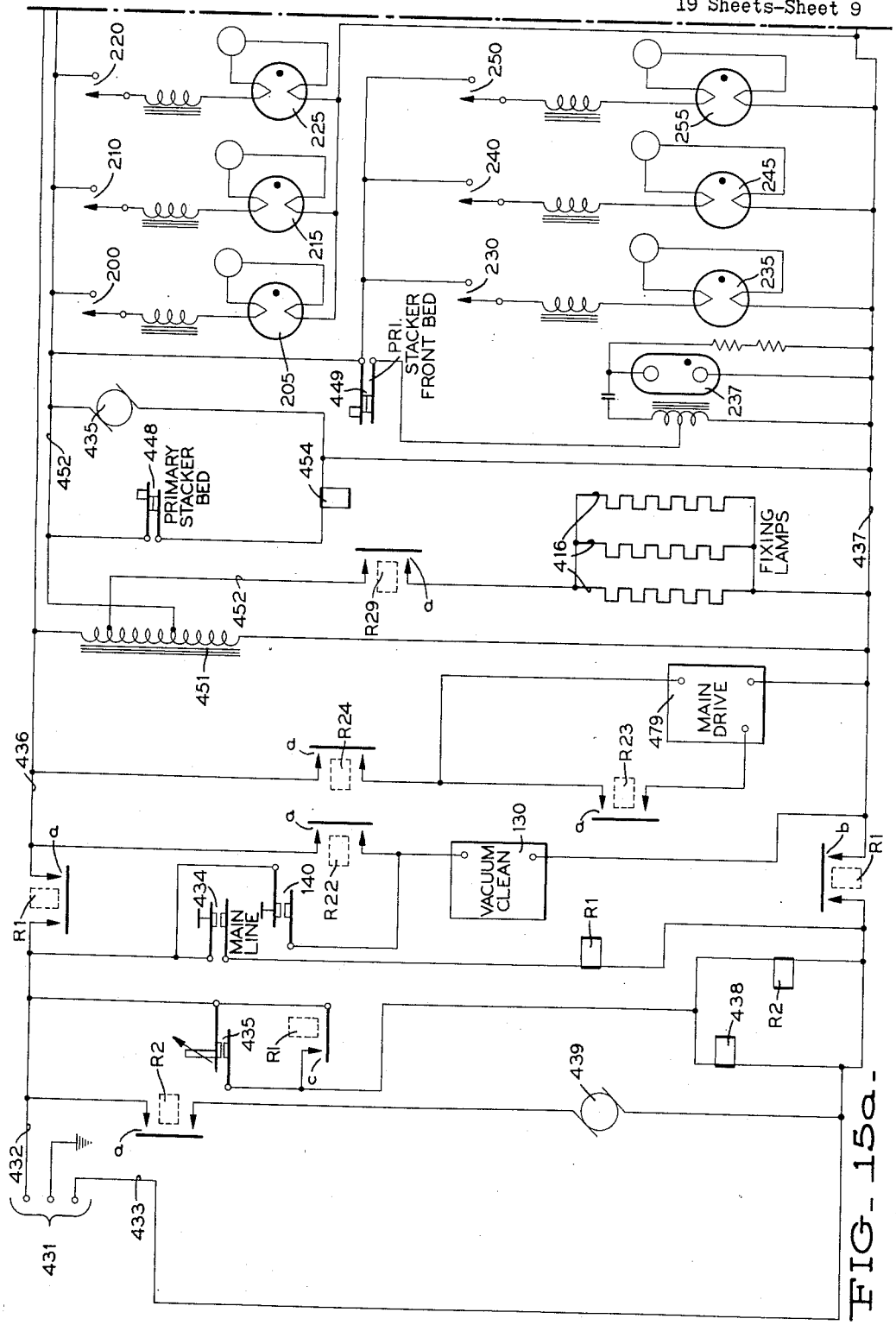

The heat fixing apparatus shown in Fig. 11 includes a plurality of infrared heating lamps 416 which are so constructed as to span the full width of a secondary card. These lamps are energized via circuits to be described and which are shown in Fig. 15a, so that the temperature provided at the surface of each lamp is in the range of +2000° F. As a result, special heat extracting or cooling means are provided in order to avoid heating the secondary cards per se to an extent whereby the same would become warped. These aforesaid heat extracting means include a blower (not shown) operated by motor 439 (Fig. 15a) for withdrawing a stream of air from an air intake opening 417 (Fig. 11) through various passages depicted by the arrows shown around the heat lamps 416, the passages 418 and 419, to the air exhaust opening 421. The same blower is connected to the air flow tube 422 to aid in the withdrawing of heated air from around the fins 423 (see also Fig. 11a) at the heat fixer station.

The structure identified in Fig. 11 by reference numeral 475 includes an inverted V-shaped trough housing 480 within which there is located a hollow tube 424 having spaced fins 423 extending therefrom. This housing is completely enclosed except for the side facing the lamps 416. The air flow tube 422 opens into one end of housing 480 so as to withdraw the heated air from the heat fixer station in general as is depicted by the arrows shown flowing into the said tube.

It should be clear that with a temperature of +2000° F., should an advancing secondary card be brought into physical contact with the surface of any of the heating lamps 416, the said card would be scorched at best and more than likely be caused to burn. Since the heating lamps 416 are located a very small distance away from the secondary card feed line, e.g., 1/32 inch, it is necessary to provide some means to assure that a moving secondary card will not be caused to contact the heating lamps 416. This is done by having a plurality of hollow fins 423 (see also Fig. 11a) which are spaced along a distance equal to the width of a record card. As stated previously, these fins 423 extend from a hollow tube 424 which is connected to a suitable air withdrawing unit (not shown). Since the hollow slit-like apertures within each of the fins 423 is connected to the hollow chamber in tube 424, an air flow results from the openings in fins 423 into the tube 424 as is shown by the arrows in Fig. 11. Hence, as each secondary card is advanced along the secondary card line between feed rolls 104—106 in the direction of feed rollers 108—109, the card is held against the bottommost portion 485 of the hollow fins 423 by th air "sucking" action as a result of the air movement created via the fins and tube 424. It would be well to point out here that this action not only prevents the secondary cards from touching the heating lamps 416, but also keeps each secondary card at a substantially fixed predetermined distance from the heating lamps so as to fix this parameter as a constant value. The fins 424 actually keep each secondary card right on the secondary card feed line. Hence, in view of the fact that the secondary cards move past the heat fixer station at a lineal speed of 11⅔ inches per second, and since the distance from the heat lamps 416 to the face of each secondary card is approximately 1/32 inch, the temperature of the toner is approximately 350° F. Due to the fact that the surface of a secondary card reflects most of the heat energy projected thereto by the lamps 416, the temperature of the card is substantially less than 350° F.

CIRCUIT DESCRIPTION

*General.*—Referring to Fig. 15a, a suitable source 431 of alternating current (A.C.) power, such as for providing 230 volts for example, is connected to lines 432 and 433. Thus, when the main line switch 434 is closed, a circuit is completed to relay R1, whereupon the lines 436 and 437 are connected to lines 432 and 433, respectively, via their respective relay governed contacts R1a and R1b. As a result of the operation of contacts R1c, a circuit is completed to the parallel connected manifold lock magnet 438 whose purpose will be brought out as the description advances, and relay R2. In turn, contacts R2a close to apply power to the motor 439 for operating a blower associated with heat fixing apparatus shown in Fig. 11 for removing the heated air in the vicinity of the said apparatus. Another motor 435 for the optical station blower, is also energized.

With power applied to lines 436 (Fig. 15a) and 437, the transformers T1 (Fig. 15b), T2 and T3 are electrified in view of the fact that their respective primary windings are connected across lines 452 and 437. The electrometer 450 (Fig. 15b) is of conventional design and is used to measure the various electrostatic charges.

Conventional rectifier arrangements as shown are used to provide suitable direct current (D.C.) power, as for example, +115 volts on line 441, +115 volts along line 442, zero volts along line 443, −42 volts along line 444, +42 volts along line 446, and zero volts along line 447. Furthermore, as is shown in Fig. 15a, an autotransformer 451 is provided to direct a voltage upon line 452, e.g., 115 volts, and another voltage along line 453, e.g., 200 volts.

Referring to Fig. 1, the primary card feed unit aforedescribed is so arranged that the upper bed mechanism thereof including feed rollers 26, 28, 30, etc., to 36, may be manually removed by means not shown, from the lower bed including the lower feed rollers 27, 29, etc., to 37. In the approximate vicinity of feed rollers 26 and 27, there are located two primary stacker bed contacts 448 (Fig. 15a) and 449. These primary stacker bed contacts 448 and 449 are caused to be closed when the primary bed (see also Fig. 1) is in place for primary card feeding. Thus, with the operation of the main line switch 434 (Fig. 15a) to cause a voltage to be applied to lines 436 and 437, and with the primary card feed unit in condition for feeding cards, the mercury arc lamp 237 (see also Fig. 3) is energized via primary stacker bed contacts 449. At the same time, a commercially available timer of any conventional design is energized to initiate a waiting period, for example 10 minutes duration. That is, ten minutes after the timer apparatus 454 is first energized, the timer delay contacts 456 (Fig. 15d) are caused to close, to thereby effect the energization of a so-called "machine-ready-to-operate" signal lamp 457, as well as to apply a voltage to line 458 by connecting the latter to line 446. In addition to lamp 237 (Fig. 15a), there is shown a plurality of other lamps which are employed for various purposes to become clear as the description advances. These lamps 205, 215, etc., to 255 are energized when their respective switches 200, 210, etc., to 250 are closed.

In order to remove the xerographic drum 49 (Fig. 1) whenever necessary from the machine, the preferred embodiment of the present invention has been so designed that a portion of the secondary card feed unit as well as the developer brush station apparatus 128 (see also Fig. 1), may be dropped away from the drum 49. Thus, to assure that the afore-mentioned equipment is in place, a set of so-called secondary feed and developer contacts 459 (Fig. 15g) is provided. This set of contacts is closed whenever the said equipment is in operating position. In addition to contacts 459, there is also provided drum contacts 461. The arrangement with respect to these contacts is such that the same are closed when the xerographic drum is in its proper place and ready for operation. Thus, after the afore-mentioned timer delay contacts 456 (Fig. 15d) close to apply a voltage to line 458, relay R3 (Fig. 15g) will be energized via contacts 461 and 459. The energization of relay R3 will cause contacts R3a to close, so that if the plurality of co-called safety contacts 463—468 connected in series circuit therewith are closed, a circuit will be completed to energize relay R4. These safety contacts 463—468 are provided to assure that all of the machine covers are in place as well as that certain machine mechanism is ready for operation. Suitable legends are provided in Fig. 15g, each of which explains the purpose of each such pair of contacts. The energization of relay R4 causes its contacts R4a to open so as to prevent a circuit to be completed via contacts R4a, to an immediate stop latchpick relay R5.

With the placing of primary cards 21 (Fig. 1) in primary hopper 22, a pair of primary hopper contacts 471 (see also Fig. 15e) is closed to effect the energization of relay R6. Thereupon, the contacts R6a are caused to open so as to de-energize relay R7, to thereby cause the separation of contacts R7a (Fig. 15d) so as to de-energize primary feed signal light 472. With light 472 extinguished, the machine operator is signaled that the primary card feed unit is ready for operation.

With the insertion of secondary cards 51 (Fig. 1) in secondary hopper 52, a pair of secondary hopper contacts 473 (Fig. 15e) is caused to close so as to energize relay R8. The R8a contacts are caused to open so as to bring about the de-energization of relay R9, whereupon the R9a (Fig. 15d) contacts are caused to open so as to extinguish secondary feed signal light 474. Hence, the machine operator is signaled that the secondary card feed unit is ready for operation.

*Manifold lock.*—Referring to Fig. 15a, the manifold lock magnet 438 operates a latching interposer (not shown) for manifold 440 (see also Figs. 1 and 11). This manifold is pivotally mounted at its lower end so that it may be swung away from the machine. The afore-mentioned magnet 438 and its latching interposer are positioned in the upper end of manifold 440. When magnet 438 is energized, the latching interposer (not shown) is operated so as to lock the manifold 440 in place as shown in Fig. 1. On the other hand, when the magnet is de-energized, the manifold is unlocked for freedom of movement away from the machine. As is shown in Fig. 15a, magnet 438 is energized when the main line switch 434 is depressed to cause the energization of relay R1. In addition thereto, the magnet can be energized via the bi-metal temperature responsive contacts 445 which are caused to close so long as the temperature in the vicinity of the heat fixing lamps 416 (Fig. 11) exceeds a predetermined limit.

*Run-In start circuit.*—With the depression of start key 476 (Fig. 15d) after the energization of primary and secondary hopper relays R6 and R8, respectively, a circuit will be completed to start relay R10 from line 458 through contacts R5a, the stop key contacts 477, start key contacts 476, contacts R13a normally closed (n/c), R14a, R17a, R8b normally open (n/o), R11a n/c, R6b and R15a n/c, and relay R10 to the other side of the line. A hold circuit for start relay R10 is immediately formed via contacts R5a, R31a, R20a n/c, and R10a.

With the transfer of contacts R10c (Fig. 15d), the voltage along line 458 is applied to line 478 (see also Fig. 15e), and to relay R21 via contacts R5b n/c and R4a. This, in turn, will cause relay R22 to become energized via contacts R21c. At the same time, relays R23 and R24 will be de-energized and energized, respectively, via their respective contacts R21a and R21b, and contacts R5c. Inasmuch as relay R3 has already been picked, a circuit parallel to relay R24 is formed via contacts R3a to energize relays R25—R27. In view of the energization of these aforementioned relays, the vacuum cleaner mechanism 130 (Fig. 15a) associated with the rotating plush cleaning roller 133 (see also Fig. 1) is energized via contacts R22a. At the same time, contacts R24a (Fig. 15a) close to energize the drive motor 141 (see also Fig. 2) represented in Fig. 15a to be within block 479. Contacts R23a are caused to open at this time in order to release a drive motor brake (not shown), but understood to be a part of the mechanism associated with drive motor 141 within block 479. The operation of relays R25—R27 causes their respective a and b contacts shown in Fig. 15b, to energize the various high voltage supplies 126a, 129a, 132a and 116a employed to render their respective corona units 126 (see also Fig. 1), 129 and 132 operative, as well as the apparatus within xerographic toner image transfer station 116.

Referring to Fig. 15b, the corona unit power supply 126a is shown to include a transformer 455 for operating a full wave rectifier arrangement whereby a positive voltage appears along line 460 and a negative voltage appears along line 470. The power supplies 126a, 129a and 132a are adjusted to supply about six to eight kilovolts (kv.), whereas the power supply 116a is adjusted to supply about one kv.

The closing of contacts R25b (Fig. 15g) completes a circuit via contacts R28a to relay R29 in order to provide a circuit via the contacts R29a (Fig. 15a) to the xerographic image heat fixing lamps 416 (see also Fig. 11).

*Primary and secondary card feed clutch magnets.*—With the energization of relay R21 (Fig. 15e), the circuit to relay R30 will be opened when contacts R21d separate. However, for the brief interval of time required for condenser 481 to discharge through relay R30, the said relay will be maintained in a picked status. It will be recalled that relay R21 was energized when start relay R10 (Fig. 15d) was picked in response to the operation of start switch 476. In response to the discharge of this condenser 481 (Fig. 15e), relay R30 will drop out, whereupon circuits will be completed to the secondary feed clutch magnet relay R33 (Fig. 15f), and the primary feed clutch magnet relays R32 and R34—R35. The circuit to relay R33 is completed at approximately 230° from line 458 through contacts CB17, R8b, R18a, n/c, R31d and R30b, and relay R33 to line 447. The primary clutch magnet relays R32 and R34—R35 are energized at the same time by way of a circuit from line 458 through contacts CB17, R6b, R13e n/c, R31c and R30a. It would be well to bring out at this point that the various CB contacts employed in this machine are caused to operate whenever the drive motor 141 (Fig. 2), also represented to be within the block 479 (Fig. 15a), is operated. The CB cams (not shown) are driven by gear 224 shown in Fig. 2. As stated previously, the timings for the electrical circuit breakers are shown on the timing chart in Fig. 16.

*First card feed cycle.*—Consequent upon the operation of the relays R32 (Fig. 15f) and R33, the primary and secondary feed clutch magnets 482 (Fig. 15e) and 483, respectively, are energized via their respective contacts R32b and R33b, as well as the contacts CB4 connected to line 458. These magnets control mechanism such as is shown in Fig. 2a, and are each similar to magnet 171 shown therein.

Figure 15E:
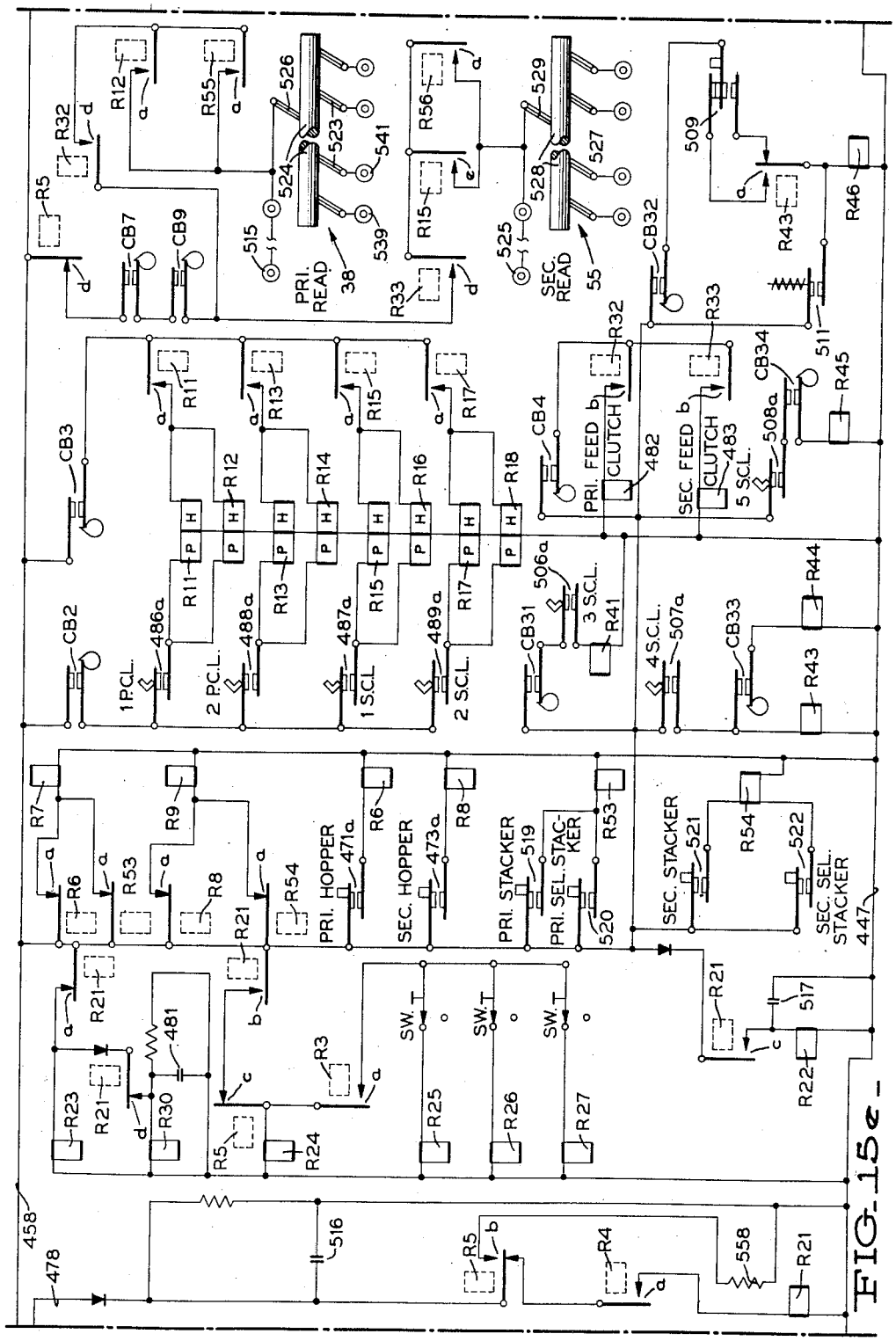

As a result of the first primary and secondary card feed cycles, whereby the first primary and secondary cards are advanced by their respective feed rolls 26—27 (Figs. 1 and 20) and 56—57 (Figs. 1 and 19) to a point just ahead of the card sensing stations 38 and 55, respectively, the primary card will operate a primary card lever 486 (Fig. 20) so as to close the associated contacts 486a (Fig. 15e). Hence, relays R11 and R12 will be energized. These relays remain picked due to the hold coils thereof being energized via contacts CB3 and R11a. Similarly, as the first secondary card is advanced during the first card feed cycle, a secondary card lever 487 (Fig. 19) is operated to close contacts 487a (Fig. 15e), whereupon relays R15 and R16 are energized. These relays remain picked due to the hold coils thereof being energized via contacts CB3 and R15a.

*Second card feed cycle.*—As a result of the relays R32 (Fig. 15f)—R35 having been energized via the circuits afore-described, the first primary and secondary card feed cycles are immediately and automatically followed by second primary and secondary card feed cycles. It is to be observed that the relay contacts R11f and R15e are also closed during the second card feed cycles so as to parallel the contacts R6b and R8b, respectively, for energizing these relays R32—R35. During the second primary and secondary card feed cycles, a second primary card lever 488 (Fig. 20) and a second secondary card lever 489 (Fig. 19) are each operated to cause their respective contacts 488a (Fig. 15e) and 489a to close, to thereby cause the energization of relays R13—R14 and R17—R18. These relays remain picked due to their respective hold coils being energized via contacts CB3 and R13a as well as R17a. As a result, contacts R18a (Fig. 15f) are transferred as are contacts R13e, whereupon the card magnet relays R32—R33 are operatively connected to their respective secondary and primary feed hubs 491 and 492. It should be clear that from this point on, i.e., after the second primary and secondary card feed cycles, the energization of these relays R32—R35 will be brought about only if card feed signal impulses are directed from some external source to the secondary and primary feed hubs 491 and 492. As the description advances, this feature including selective card feed control will be brought out in detail. For present purposes of explanation, however, it will be assumed that the hubs 493 (Fig. 15f) are electrically connected via plug wires to the secondary feed hub 491 and the primary feed hub 492. Hence, each machine cycle a voltage impulse will be directed to the secondary and primary feed hubs via contacts CB17, so as to cause simultaneous secondary and primary card feed cycles until the printer is conditioned to stop. This will be explained in detail as the description advances.

Figure 15G:
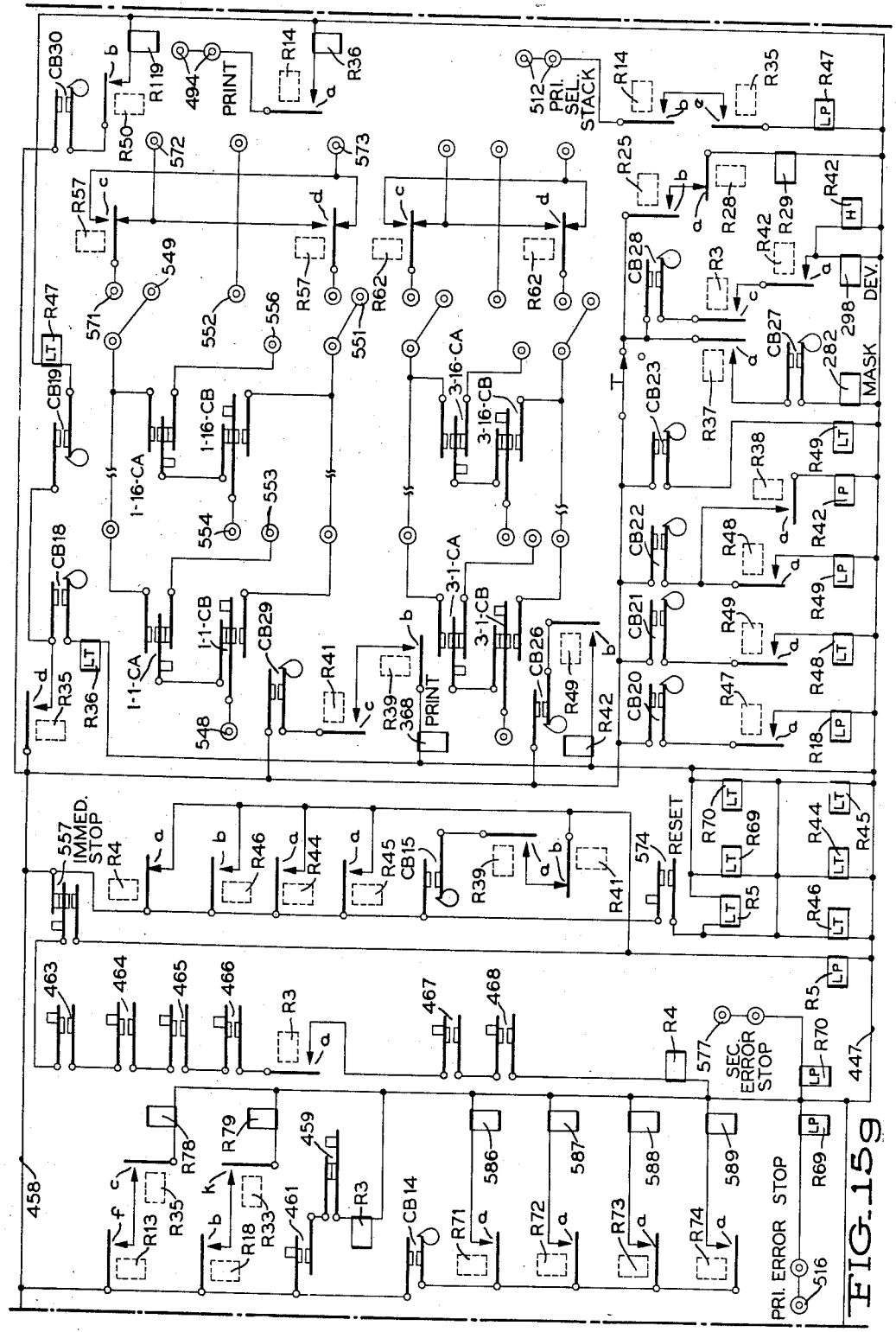

*Print control.*—Let it be assumed for the time being that the comparing test hub 493 (Fig. 15f) is also connected by plug wire to the so-called print hub 494 (Fig. 15g). Hence, during the third machine card feed cycle when contacts CB17 close at approximately 230°, latch pick relay R36 will be energized via contacts R14a; it will be recalled that the second card lever contact relay R14 (Fig. 15e) was picked during the second card feed cycle. Thus, at approximately 340° of the third card feed cycle, the magnetic drum write head 496 (Fig. 15c) will be energized by a circuit from line 446 through contacts R33m, CB45, R36a and R35e in order to record a magnetized bit or spot on the drum. The magnetic spot so caused to be formed on the surface of magnetic drum 137 (see also Fig. 2) during the third cycle, is associated with the first primary and secondary cards. It will become clear shortly that this recorded magnetic spot will be read at a later time so as to cause a xerographic image of the information on the first primary card which is formed on the xerographic drum in the manner described hereinbefore, to be transferred onto the first secondary card.

*Magnetic drum reading circuits.*—Associated with the magnetic drum 137 (Fig. 15c) are four reading heads 497—500. These heads, in turn, are respectively associated with the masking-erasing apparatus 127 (see also Fig. 1), the xerographic image developing apparatus 128, the transfer station apparatus 116, and the secondary card distributing apparatus 118. Each of these read heads 497—500 has associated therewith a respective set of cam contacts CB37—CB40 (Fig. 15c) and CB41—CB44. Furthermore, all of the aforementioned magnetic drum read heads are associated via the aforementioned CB contacts 37—44 with a single electronic amplifier circuit shown in Fig. 15b to include vacuum tubes V1—V4. It might be well to mention at this time that a single read head amplifier as shown in Fig. 15b is used in conjunction with the four magnetic drum read heads 497 (see also Fig. 15c)—500, because each of the circuits associated with the various read heads is rendered operative at separate times by their respective differently timed contacts CB37—CB44 (see also Fig. 16). In addition to the aforementioned magnetic reading and writing heads, there is provided a permanent magnet erasing head 430 (Fig. 15c) for removing all recorded magnetic spots prior to the advancement of incremental surface areas of magnetic drum 137 past the write head 496.

If it is assumed that the "print" read head 499, i.e., the one associated with transfer station apparatus 116 (see also Fig. 1), detects a magnetic spot on the surface of drum 137 at approximately 234° of a machine cycle, a suitable pulse will be directed from this read head 499 through contacts CB39 and via line 501 (see also Fig.

15b), to the control grid of vacuum tube V1, preferably one-half of a type 12AY7 tube. The electrical arrangement is such that a negative-going pulse is caused to be applied to this first control grid, so that a positive-going pulse is applied to the control grid of vacuum tube V2. Hence, an amplified negative-going pulse is applied to the control grid of vacuum tube V3, and still another amplified positive-going pulse to the control grid of vacuum tube V4. As a result, a positive-going pulse appears at the output of the cathode follower tube V4, which said pulse is directed via contacts R30c, line 502 (see also Fig. 15c), and contacts CB43, to the control grid of a thyratron tube TH1, preferably a type 2D21 tube. It would be well at this time to make it clear that the circuit arrangements within those blocks identified by the reference numerals 503—505, are similar to those shown in detail within broken line 506.

Hence, with a positive-going pulse applied to the control grid of tube TH1, the said tube is fired and a print read magnet R39 is energized via a circuit including cam contacts CB25. A neon indicator tube N1 is also used as shown so as to provide a visual signal of tube operation for use in conjunction with the thyratron tube TH1. That is, whenever tube TH1 is caused to conduct, its associated neon tube N1 is also caused to conduct so that its resulting glow appears as a visual signal to indicate that the said tube TH1 is fired.

In view of the fact that the circuits 503—505 are each similar to the circuit 506 shown in detail, and since the relationship between the circuits 503—505 to their respective read heads 498, 497 and 500 is similar to the relationship of circuit 506 to its associated read head 499, the magnetic drum head arrangement should be clear and should need no further explanation. It is to be observed, however, that circuit 503 governs the operation of the brush developer read magnet R38, whereas the circuits 504 and 505 govern the operation of their respective masking-erasing read magnet R37, and the secondary card feed selector stacker read magnet R40.

*Masking-erasing apparatus clutch magnet.*—This clutch magnet 282 (Fig. 7) may be selectively energized to cause operation masking-erasing apparatus described hereinbefore in connection with Figs. 6–8. The same magnet 282 is shown in Fig. 15g to be energized when mask read relay R37 (see also Fig. 15c) is energized due to the detection of a magnetic spot by read head 497, from line 458 (Fig. 15g) through contacts R37a and CB27, and clutch magnet 282 to line 447.

*Brush developer apparatus clutch magnet.*—The brush developer apparatus has been described in detail hereinbefore with reference to Fig. 12, wherein the apparatus governing clutch magnet 298 is shown. This magnet is also shown in Fig. 15g, and is caused to be energized when the brush developer read head relay R38 (see also Fig. 15c) is energized. That is, when relay R38 is operated, a circuit is formed to relay R42 (Fig. 15g) from line 458 through contacts CB22 and R38a. The energization of relay R42 at approximately 269° causes contacts R42a to close, whereupon at approximately 270° of the same machine cycle, a circuit is completed via contacts CB28, R3c and R42a to the brush developer magnet 298. It will be recalled that relay R3 is continuously energized via the safety contacts 459 and 461.

*Transfer roller apparatus clutch magnet.*—As described previously in connection with Figs. 9 and 10, the operation of transfer roller 348 is governed by magnet 368. The circuit whereby this magnet may be energized is shown in Fig. 15g to include contacts CB29, R41c and R39b. Contacts R39b are closed when the transfer roller read head relay R39 (see also Fig. 15c) is energized. Contacts R41c (Fig. 15g), on the other hand, are caused to close when the latch pick relay R41 (Fig. 15e) is energized by the operation of a third secondary feed card lever 506 (see also Fig. 19) which causes contacts 506a (Fig. 15e) to close. As is shown, the circuit to relay R41LP includes contacts CB31 and 506a.

The afore-mentioned third secondary card feed lever 506 (Fig. 19) is provided as a safeguard against the possibility that the transfer roller 348 (Fig. 10) would be caused to contact the surface of the xerographic drum 49 directly should there not be a secondary card at the transfer station 116 (Fig. 1). Thus, should the transfer roller read head relay R39 (Fig. 15c) be energized in response to the detection of a magnetic spot on the surface of drum 137 by magnetic drum read head 499, and should a secondary card fail to operate the third secondary card feed lever 506 (Fig. 19) at this time, the immediate stop governing relay R5 (Fig. 15g) would be energized by a circuit from line 458 through contacts CB15, R39a and R41b. The immediate stop action which takes place after relay R5 is energized, will be described in detail hereinafter.

*Secondary stacker record card distributor magnet.*— It has already been brought out that when magnet 119 (Fig. 1) is energized, secondary cards are directed to the drop stacker 121. Normally, when this magnet is in a de-energized status, the secondary cards are advanced, one-by-one, to the drum-type stacker 54. The secondary record card distributor magnet 119 is energized when the read head relay R40 (Fig. 15c) is energized as a result of its associated read head 500 detecting the presence of a magnetic spot on the surface of magnetic drum 137. Thus, in response to the operation of relay R40, a circuit is completed to the aforesaid magnet 119 (Fig. 15g) via contacts CB30 and R40a.

*Secondary card feed levers 4 and 5 and associated circuits.*—The fourth secondary card feed lever 507 (Fig. 19) and the fifth secondary card feed lever 508 are each used primarily as precautionary measures in connection with the toner image heat fixing apparatus shown in Fig. 11. Card lever 507 when acted upon by a secondary card in the proximity of feed rollers 104—105, causes contacts 507a (see also Fig. 15e) to close so as to bring about the energization of relay R43. The timing arrangement as between the operation of card lever 507 and the closing of contacts CB33, is such that under normal operations, contacts CB33 close at 345° (see also Fig. 16) when the card lever contacts 507a are separated, and remain closed ordinarily while these latter-mentioned contacts are separated. Hence, under normal operations the relay R44LP (Fig. 15e) is not energized. However, should there occur a secondary card feed jam or the like whereby contacts 507a are caused to remain closed at a time when cam contacts CB33 close, relay R44LP will become energized and its associated contacts R44a (Fig. 15g), will be closed to complete a circuit to the afore-mentioned immediate stop relay R5. In a similar fashion, the fifth card lever contacts 508a (Fig. 15e) are normally caused to open during the time that contacts CB34 are closed. However, should the card lever contacts 508a be operated closed due to a secondary card jam, for example, the latch pick relay R45LP will be energized. This, in turn, will cause contacts R45a (Fig. 15g) to close so as to complete a circuit to the immediate stop relay R5.

*Heat fixer device vacuum failure circuits.*—As described previously in connection with Figs. 11 and 11a, the subject xerographic printer utilizes an arrangement in the vicinity of the toner image heat fixer device which acts upon each succeeding secondary card to keep the same at a given safe distance from the heat fixing lamps 416. It will be recalled that this is accomplished by applying a low vacuum type pressure to the slit-like openings in the fins 423. This particular pressure results from an air-sucking action within the passages of fins 423 and hollow chamber 424, which is effected by a suitable blower as afore-described. So long as there is no obstruction relative the slit-like openings in fins 423, there is sufficient air movement to operate butterfly vane 510 so as to operate contacts 509. On the other hand, when the slit-like openings in fins 423 are blocked off as by a card, for example, the air movement within hollow chamber 424 is insufficient to operate vane 510. Accordingly, contacts 509 are returned to normal status. It should be clear at this time that if this low vacuum type pressure were not present, there would be no assurance that the secondary cards would not physically contact the toner image fixing lamps 416 which operate at a surface temperature of more than 2000° F. To safeguard against such an undesirable occurrence whereby the secondary cards would be burned and ruined, a vacuum switch 509 (Fig. 15e) is provided. This switch is arranged in such a fashion that the normally open points thereof are caused to be closed when a sufficient low vacuum type pressure is present at the fins 423. Thus, should the fourth secondary card lever relay R43 (Fig. 15e) be energized at a time when there is an insufficient low vacuum type pressure at fins 423 to keep the secondary cards away from the fixing lamps 416 and up against the fins per se, a circuit will be completed to latch pick relay R46LP via contacts CB32, 509 n/c and R43a. It is to be observed that the energization of relay R43 is effected each time card lever contacts 507a are closed.

The energization of relay R46LP will cause its contacts R46b (see also Fig. 15g) to complete a circuit to immediate stop relay R5.

On the other hand, it is to be observed that should some obstruction appear relative the slit-like openings in fins 423 as described by vacuum switch 509 (see Figs. 11 and 15e) at a time when the fourth secondary card lever contacts 507a are not closed so as to indicate the absence of a secondary card between feed rollers 104 (Fig. 11)—105 and 106—107, a circuit will be completed to relay R46 via contacts CB32, 509 n/o and R43a n/c. This obstruction might be caused by record card dust or the like, for example, and would impede the air movement within hollow chamber 424, to thereby permit vane 510 and contacts 509 to return to normal status.

As is shown in Fig. 15e, an "over-temperature" thermostat 511 is also provided so as to effect the energization of relay R46LP should the temperature in the vicinity of the heat fixer device rise to an unsafe and therefore undesirable limit. This might be caused by the failure of the air blower mechanism for circulating air in the vicinity of the heat fixer station, as afore-described.

*Primary feed record card distributing magnet.*—As described previously in connection with Fig. 1, the primary cards are normally advanced to the drum-type stacker 24. However, when the primary record card distributing magnet 42 is energized, the primary cards are directed into the drop stacker 44. In order to effect the energization of magnet 42, a suitable signal must be applied to a primary select stacker hub 512 (Fig. 15g), whereupon during a primary card feed cycle which occurs after the second primary card lever contacts 488a (see also Fig. 15e) have been closed to effect the energization of relay R14, latch pick relay R47LP will be energized. The afore-mentioned suitable signal to energize the relay R47LP can be obtained via cam contacts CB17 (see also Fig. 15f) and hubs 493 and 512 (Fig. 15g). During the same card feed cycle at approximately 335°, the latch trip coil of relay R47LT will be energized via cam contacts CB19 and relay contacts R35d. However, before relay R47 is caused to drop out, latch pick relay R48 is energized via contacts CB20 and R47a. Thereafter, during the next following primary card feed cycle when cam contacts CB22 close at approximately 249°, latch pick relay R49 will be energized via contacts R48a. Shortly thereafter and during the same aforesaid next following primary card feed cycle, the latch trip coil of relay R48LT will be energized via contacts CB21 and R49a to cause the dropout of this relay. Finally, during a succeeding primary card feed cycle which follows the aforesaid next following cycle during which relay R49LP is energized, contacts CB26 and R49b complete a circuit to effect the energization of the primary record card distributing magnet 42 (see also Fig. 1). During this very same primary card feed cycle, relay R49LT is energized via contacts CB23. As a result, the primary card which at this time is just ahead of the movable end of chute blade 43 (Fig. 1) will be directed into the drop stacker 44.

*Secondary feed record card distributing magnet.*—As stated previously, the secondary feed record card distributing apparatus is similar to the distributing apparatus for the primary feed. That is, when magnet 119 (Fig. 1) is operated, the secondary cards are directed to the drop stacker 121 instead of the drum-type stacker 54. To energize magnet 119, a signal at approximately 230° is directed to hub 513 (Fig. 15c) so as to cause the energization of latch pick relay R50LP. Contacts R18c are closed when the second secondary card lever contacts 489a (see also Fig. 15e) are closed. With relay R50 (Fig. 15c) operated, contacts R50a will be closed to permit a voltage pulse during the next following secondary card feed cycle to be directed via contacts CB46 as well as R50a, to the magnetic drum write head 496. The magnetic spot thus recorded on the surface of drum 137 will be read twenty-five card cycles later by the secondary selective stacker read head 500, so as to cause the energization of read head relay R40. As described hereinbefore, the energization of relay R40 causes the resulting operation of contacts R40a (Fig. 15g) which, in turn, causes the operation of magnet 119 (see also Fig. 1). As is shown in Fig. 15c, relay R50LT is energized each secondary card feed cycle via contacts R33m and CB24.

*Normal machine stop operation.*—Should the stop switch 477 (Fig. 15d) be operated at any time while the printer is running, a circuit will be completed to relay R31 from line 458 through contacts R5a and 477, line 514, and contacts CB1. Thereupon, contacts R31a will immediately separate to open the hold circuit to aforedescribed start relay R10. As soon as this occurs, a hold circuit to relay R31 will be formed via contacts R10c n/c, R20d and R31a.

With the energization of relay R31, contacts R31c (Fig. 15f) and R31d will be caused to separate so as to open the circuits to the primary and secondary card feed clutch magnet relays R32—R35. As a result, the circuits to the primary and secondary card feed clutches 482 (Fig. 15e) and 483, respectively, will open and cards will no longer be advanced from the primary and secondary feed hoppers 22 (see also Fig. 1) and 52, respectively.

When contacts R10c (Fig. 15d) return to their normal status, line 478 is disconnected from line 458 so that the circuit to relay R21 (Fig. 15e) is opened. However, capacitor 516, preferably of a size of approximately 8000 microfarads, has a sufficient charge stored therein at this time to cause relay R21 to remain energized for a period of approximately thirty additional card feed cycles. That is, condenser 516 discharges through contacts R5b n/c and R4a after the voltage is removed from line 478 as afore-described. Of course, after the discharge of condenser 516, relay R21 will drop out. As a result, relay R24 will drop out when contacts R21b separate, and relay R23 will become energized via contacts R21a. Contacts R24a (Fig. 15a) will open the circuit to the drive motor 141 (see also Fig. 2) within apparatus 479 (Fig. 15a) whereas contacts R23a will close to effectively brake the aforesaid drive motor for an immediate stop. In addition, contacts R21c (Fig. 15e) will open the circuit to relay R22 whose contacts R22a (see also Fig. 15a) are used to control the operation of the vacuum cleaner mechanism 130 associated with the cleaning roller 133 (see also Fig. 1). However, relay R22 will not drop out immediately in response to the separation of contacts R21c, in view of the fact that condenser 517 has a sufficient charge stored therein to keep relay R22 picked for a period of time. This is to assure a thorough cleaning of cleaning brush 133 after the machine printing operation has been stopped. Of course, when condenser 517 has discharged sufficiently, relay R22 will drop out and vacuum cleaner unit 130 will be stopped. It is to be observed that the apparatus 130 may be operated at will by depressing switch 140.

Referring to Fig. 15e, when contacts R21b separate, the circuit to parallel connected relays R25—R27 is opened. As a result, the power supplies 116a (Fig. 15b), 126a, 129a and 132a (see also Fig. 1), are de-energized. Furthermore, when relay R25 is dropped out, its contacts R25b (Fig. 15g) cause the de-energization of relay R29 whose contacts R29a (Fig. 15a), in turn, open the circuit to fixing lamps 416 (see also Fig. 11).

It is to be observed that when contacts R21a (Fig. 15e) closed due to the dropout of relay R21, relay R30 is energized via contacts R21a and R21d, and a rectifier therebetween. In addition, condenser 481 is connected across voltage lines 458 and 447 so as to cause a charge to be stored therein which charge, it will be recalled, is used to maintain relay R30 energized for a short period after the start key has been operated. The contacts R30a (Fig. 15f) and R30b are thereby caused to remain open for a short period of time after the start key has been depressed in order to prevent the immediate energization of the primary and secondary card feed magnet relays R32—R35.

*Hopper card runout.*—Assuming that machine operations are initiated with primary and secondary cards in each of their respective hoppers 22 (Fig. 1) and 52, relay R51 (Fig. 15d) will not be energized due to the arrangement of primary hopper contacts R6c and secondary hopper contacts R8c and R8d. Should either hopper run out of cards at any time during machine operation, stop relays R31 and R52 will be energized via one of the following parallel circuits:

(a) From line 458 through contacts R20b, R51b n/c, R6e n/o, and R8f (due to the secondary hopper being out of cards), or (b) From line 458 through contacts R20b, R51b n/c and R6f (due to the primary hopper being out of cards).

Along with the simultaneous energization of relays R31 and R52 consequent upon either hopper running out of cards, relay R51 will be conditioned for energization via contacts R6c n/o and R8d n/c, or R6c n/c and R8c n/o, and R8d n/o. Relay R51 cannot be picked as yet because contacts R52a are separated.

Assuming that it is the primary cards which have run out of the primary hopper, primary hopper contacts 471 (Fig. 15e) will cause the dropout of relay R6. As described hereinabove, this will cause the operation of stop relays R31 and R52. Should it be desired to continue machine operations without adding any more primary cards to the primary hopper, the depression of the start key 476 (Fig. 15d) and the runout key 518 after the machine has stopped will complete a circuit to start relay R10 from line 458 through contacts R5a, 477 and 476, R13a n/o, R17c n/o, R8b, R11c n/o and R15a n/o. A hold circuit for relay R10 will form immediately via contacts R5a, R31a, R20a n/c and R10a. However, at the same time a circuit is completed to relay R20 via contacts R10b, whereby the hold circuit to relay R10 is opened when contacts R20a transfer. Furthermore, the hold circuit to relays R31 and R52 will be opened when contacts R10c are shifted to an operated status. Thus, the circuit to relay R51P conditioned for conduction as afore-described will be completed via contacts R6c n/c, R8c n/o, R8d n/o and R52a now closed. The energization of relay R51 during machine operation indicates that the machine has been started at a time when only one hopper contained cards. As a result, the machine will continue to operate until either the feed unit whose hopper initially lacked cards completely runs out of cards, or until cards run out of the hopper that originally contained cards.

In connection with the preceding assumption that the machine has been restarted when there were no cards in the primary hopper, assuming first that the primary feed unit runs out of cards completely, contacts R11e and R13d (Fig. 15d) governed by relays associated with the first and second primary card lever contacts 486a (see also Fig. 15e) and 488a, respectively, cause a circuit to be completed to the stop relays R31 and R52 from line 458 through contacts R20b, R51b n/o, R11e, R13d and CB1.

On the other hand, assuming that the secondary cards are run out of the secondary hopper before all of the primary cards have been fed out of the primary feed unit, relay R8 (Fig. 15e) will drop out when secondary hopper contacts 473a open. As a result, stop relays R31 and R52 will be energized via contacts R20b, R51b n/o, R6e n/c, R8f and CB1.

*Runout circuits.*—In keeping with the foregoing description, when both of the primary and the secondary hoppers run out of cards, stop relays R31 (Fig. 15d) and R52 will be energized as afore-described. To thereafter run out the cards remaining in the primary and secondary feed units, it is necessary to depress the start and runout switches 476 and 518, respectively, simultaneously. By doing this, a circuit is completed to runout relay R20 from line 458 through contacts R5a, 477, 476, R6c n/c, R8c n/c, and 518. In response to the energization of relay R20, there is a hold circuit formed for the said relay via contacts R20a n/o. Furthermore, contacts R20b will be caused to separate, whereas contacts R20c will close. It is to be observed that the closing of contacts R20c parallels the action of contacts R10c n/o, so that a voltage is applied to line 478 from line 458 to parallel the action which results when start relay R10 is picked and contacts R10c are operated. The machine will operate until both the primary and the secondary feeds have run out of cards, whereupon a circuit is completed from line 458 through contacts R8e n/c, R15c, R17e, R6d n/c, R13c n/c, R11d and CB1, to relays R31 and R52. Relays R31 and R52 will thereupon be energized to stop the machine as described previously. With the energization of relay R31, contacts R31a will separate to open the hold circuit to relay R20.

Should there at any time be a simultaneous operation of the start and runout switches 476 and 518, respectively, when cards are present in either of the hoppers 22 (see also Fig. 1) and 52, relay R20 will be energized from line 458 through contacts R5a, 477, 476, R10b and 518, only after start relay R10 is energized in the manner already described.

The circuit arrangement associated with stop relays R31 and R52 is such that primary and/or secondary card misfeeds at various points throughout their respective card feed units, will cause the energization of these stop relays. Inasmuch as these circuit arrangements per se are not a part of the present invention, they will not be described in detail herein. It is desired to bring out at this time that should any of the four card stackers 24 (Fig. 1), 44, 54 and 121 have fed therein a predetermined number of cards, a respective set of contacts 519—522 (Fig. 15e) will be operated to cause the energization of an associated relay R53 and R54. This will cause contacts R53b (Fig. 15d) and R54d to close so as to complete a circuit to the stop relays R31 and R52.

*Primary and secondary card reading stations.*—Referring to Fig. 1, the primary and secondary card reading stations 38 and 55, respectively, are arranged adjacent their respective card hoppers 22 and 52, so as to sense the punched hole data appearing in each card that is advanced from its respective hopper. The primary card reading station 38 (Fig. 15e) is shown to include 80 sensing brushes 523, one for each column appearing in the preferred record card. Thus, as a primary card is advanced between the brushes 523 and their common contact roll 524, punched card indicia impulses appear at the hubs associated with the brushes 523 by way of a circuit completed from line 458 through contacts R5d, CB7 or CB8, CB9 or CB10, R32d, R12a or R55a, the common brush 526, contact roll 524, punched holes in the primary card, and those primary station brushes 523 aligned with the afore-mentioned punched holes. It might be brought out here that first primary card lever relay contacts R12a are closed so long as a primary card is detected in the vicinity of feed rolls 26 (see also Fig. 20) and 27. As will be explained shortly, contacts R55a are closed only during primary card runout time, so as to direct so-called "hot 9's" to the primary sensing brush hubs.

Punched card indicia impulses are caused to appear at the hubs associated with the secondary card reading station brushes 527 when a circuit is completed from line 458 through contacts R5d, CB7 or CB8, CB9 or CB10, R33d, and R15e or R56a, common brush 529, contact roll 528, punched holes in the secondary card, and those primary station brushes 527 aligned with the afore-mentioned secondary card punched holes. The first secondary card lever relay contacts R15e are closed so long as a secondary card is detected in the vicinity of feed rolls 56 and 57 (see also Fig. 19). Contacts R56a are closed only during secondary card runout so as to direct "hot 9" impulses to the hubs associated with secondary brushes 527. It would be well at this time to point out that card index point pulses appear at hubs 515 (Fig. 15e) and 525 whenever the associated card feed is operated.

*Primary and secondary "hot 9" circuits.*—When the last card in a hopper, such as primary card 21 (Fig. 20) in hopper 22 for example, is fed out of the hopper in the direction of primary card reading station 38, the primary hopper card lever 471 is released to cause contacts 471a (see also Fig. 15e) to separate. Thereupon, primary hopper relay R6 is de-energized. During the next following primary card feed cycle, this last primary card will be advanced beyond the primary card reading station 38, at which time the first primary card lever 486 will be released to permit the separation of its contacts 486a (see also Fig. 15e). Accordingly, relays R11 and R12 are caused to drop out at approximately 245° when contacts CB3 open. Thus, with hub 531 (Fig. 15f) connected to hub 532, primary "hot 9" relay R55 will be energized during the next primary card feed cycle via a circuit from line 458 through contacts CB11, the plug wire connecting hubs 531 and 532, contacts R6c n/c and R12b. Inasmuch as contacts CB11 close at 9-time (see also Fig. 16), contacts R55a (Fig. 15e) will also close at 9-time to permit these hot 9 pulses to appear at the hubs associated with primary brushes 523.

By the same token, when the last secondary card is moved out of the secondary hopper, hopper card lever 473 (Fig. 20) is released to permit contacts 473a (Fig. 15e) to separate, whereupon relay R8 is de-energized. During the next following secondary card feed cycle, the first secondary card lever 487 (Fig. 20) is released to cause the separation of contacts 487a (Fig. 15e). As a result, relays R15 and R16 will drop out at approximately 345° of this card cycle when contacts CB3 separate. During the next secondary card feed cycle, a circuit will be completed to secondary station "hot 9" relay R56 via a circuit from line 458 through contacts CB11, the plug wire connecting hubs 531 and 532, contacts R8c n/c and R16a. Contacts R56a (Fig. 15e) will close at 9-time along with CB11 (see also Fig. 15f) to cause hot 9 pulses to appear at the hubs associated with the secondary reading station brushes 527.

It should be mentioned at this time that hub 531 (Fig. 15f) may be connected to hub 533 so as to cause the primary and secondary "hot 9" relays R55 and R56, respectively, to become energized during primary and secondary card run-in times. This will become clear as the description advances, and as the data comparing features of the present machine are described in detail.

*Comparing mechanism and circuits.*—There are provided three data storing and comparing devices each of which is similar to the comparing apparatus of the paper feeding device shown and described in Patent No. 2,442,970 that issued to F. M. Carroll et al. on June 8, 1948. In view of the fact that the comparing device is not a part of this invention per se, and since the same is described in detail in the afore-mentioned Carroll et al. patent, only a brief and general description thereof will be provided herein. The mechanism (not shown) of each comparing device is driven by a respective gear 221 (Fig. 2), 222 and 223. Furthermore, each of these devices is capable of comparing a plurality of orders of data, e.g., sixteen orders of two data expressions, such as primary and secondary data expressions for example. Considering a single data order for the sake of simplicity, there is a primary card datum magnet, such as magnet 1 in Fig. 26 of the aforementioned Carroll et al. patent, and a homologous secondary card datum magnet, such as the lower magnet 1 in the said Carroll et al. patent. These magnets govern the operation of a couple of associated sectors (not shown) which, in turn, conjointly via a pin and slot mechanical arrangement operate a pair of opposing transfer contacts similar to contacts 743 and 744 in Fig. 26 of the Carroll et al. patent. When the primary and secondary datum magnets are energized by impulses representing the same value, the comparing device mechanism operates to cause the normally closed points of the aforementioned transfer contacts to remain closed and the normally open points of these contacts to remain open, i.e., to remain in normal status. Should the primary datum magnet, on the other hand, be energized by an impulse representing a value greater than that represented by the impulse directed to the secondary datum magnet, the transfer contacts associated with the primary datum magnet will be transferred so that the normally closed points thereof will be opened and the normally open points thereof will be closed while the other transfer contacts associated with the secondary datum magnet remain in their normal status at this time. On the other hand, should the secondary datum magnet receive an impulse indicative of a value higher than the value represented by the impulse applied to the primary datum magnet, the set of transfer contacts associated with the secondary magnet will be operated whereas those associated with the primary datum magnet will remain in normal status. That is, the aforesaid secondary magnet transfer contacts will now have their normally closed points open and their normally open points closed. In this fashion, the comparing device establishes one of three circuit connections via the transfer contacts according to whether the primary and secondary data expressions are equal, whether the primary expression is greater than the secondary expression, or whether the primary expression is smaller than the secondary expressions.

After each setup operation, the mechanism (not shown) associated with the primary data magnets within a single comparing device may be restored to a home or reset position when a restoration magnet is energized. Similarly, there is provided a restoration magnet for the secondary data side. Of course, so long as a given restoration magnet is not energized, the data stored in the corresponding section of the comparing device will remain stored. A primary reset signal appears at hub 561 (Fig. 15f) each primary card feed cycle via contacts CB5 and R32c, whereas a secondary reset signal appears at hub 562 each secondary card feed cycle via contacts CB5 and R33c.

Referring to Fig. 15f, there is shown the circuitry for the three comparing devices CD1—CD3 used in the present machine. Each of the comparing devices includes sixteen order comparing positions, only two order positions per comparing device being shown for the sake of simplicity. The first comparing device CD1 is shown to include sixteen "A" magnets each corresponding to the upper magnets shown in Fig. 26 of the Carroll et al. patent, and sixteen "B" magnets each corresponding to the lower magnets in Fig. 26 of this patent. As mentioned previously, only two positions are shown, namely the first and sixteenth order positions including magnets 1–1A, 1–1B, 1–16A and 1–16B. In a similar fashion, the second and third comparing devices each include sixteen data order comparing positions as represented by the magnets 2–1A, 2–1B, 2–16A, 2–16B, 3–1A, 3–1B, 3–16A, and 3–16B. In addition, there are shown restore magnets 1–RA, 1–RB, 2–RA (Fig. 15h), 2–RB, 3–RA (Fig. 15f) and 3–RB for the comparing devices CD1 to CD3. As will be brought out in more detail hereinafter, these restore magnets are energized by way of voltage signals transmitted from hubs 561 and 562. The transfer contacts operated by the first comparing device CD1 first order position magnets 1–1A and 1–1B, are transfer contacts 1–1–CA (see also Fig. 15g) and 1–1–CB. The sixteen order position magnets of this comparing device CD1, govern the operation of transfer contacts 1–16–CA and 1–16–CB. Similarly, the transfer contacts 2–1–CA (Fig. 15h), 2–1–CB, 2–16–CA, 2–16–CB, 3–1–CA (Fig. 15g), 3–1–CB, 3–16–CA, and 3–16–CB, are governed by their respective corresponding order position magnets 2–1A, 2–1B through 3–16A and 3–16B.

In general, the operation of these comparing devices is accomplished by connecting the comparing device hubs, such as 534 and 536 for example, to suitable reading station brush hubs, such as those associated with primary and secondary card read brushes 523 (Fig. 15e) and 527, respectively. This would be done for a cross-compare operation. If data representing signals indicative of the same value are applied to hubs 534 and 536 concurrently, the homologous position magnets 1–1A and 1–1B will be energized simultaneously. As a result, the transfer contacts 1–1–CA (Fig. 15g) and 1–1–CB governed by these magnets as well as their associated comparing device mechanism (not shown), will remain in a normal status. On the other hand, should the signal applied to hub 536 (Fig. 15f) represent a higher value than the impulse applied to hub 534, the operation of the comparing device first order position will be such to cause the transfer contacts 1–1–CA (Fig. 15g) to transfer whereupon the normally open points thereof will be closed and the normally closed points will be opened. Furthermore, should the impulse applied to hub 534 (Fig. 15f) represent a higher value than the impulse applied to hub 536, the transfer contacts 1–1–CB (Fig. 15g) will be operated to cause the normally closed points to open and the normally open points to close.

*Sequence comparison—data tumbling.*—As is shown in Fig. 1, each of the record card feed units includes only a single card reading station. As a result, in order to sequence compare the data punched in a single set of cards, e.g., the primary cards, it is necessary to store the data read from a primary card for at least one primary card feed cycle so as to compare this data with that sensed during a next following primary card feed cycle from the next following primary card. This is accomplished in the preferred embodiment of the present invention by a process referred herein as data tumbling, which process is disclosed in copending U.S. patent application, Serial No. 554,254, filed on December 20, 1955, by J. Sarley et al.

Let is be assumed that the first comparing device CD1 (Fig. 15f), hubs 537 and 538 are plug wire connected to primary reading brush station hubs 539 (see also Fig. 15e) and 541. During a first primary card feed cycle, the punched hole data read by the primary brushes 523 associated with hubs 539 and 541 will be directed to hubs 537 (Fig. 15f) and 538, to thereby energize the upper comparing device magnets 1–1A and 1–16A via their respective contacts R58d n/c and R58c n/c. Contacts R58c and R58d will be in a normal status at this time because relay R58 is de-energized. This may be explained as follows: In view of the fact that the first comparing device is being used to store and sequence compare primary data, hubs 542 (Figs. 15f) and 543 are plug wired as are hubs 544 and 546. Hence, during the primary card feed cycle preceding the one the one during which the first primary card punched hole data is sensed by the primary card reading station, a voltage impulse is directed to relay R63LT from line 458 through contacts CB13, the plug wire connecting hubs 542 and 543, contacts R33h, and R57a n/c. Shortly thereafter when cam contacts CB12 (see also Fig. 16) close, a voltage signal is directed to relays R57LP and R58LP from line 458 through contacts CB12, the plug wire connecting hubs 544 and 546, contacts R33e and R63a n/c. During the next following primary card feed cycle at which time the second, or aforesaid next following, primary card is read by the primary reading station 38 (see also Fig. 15e), the voltage signal resulting from cam contacts CB13 (Fig. 15f) closing, is directed to relay R63LP via the contacts R57a n/o. It will be recalled that relay R57LP was energized along with relay R58LP. Thus, during the same primary card feed cycle, a voltage signal will be directed to relay R58LT and R57LT via contacts R63a n/o. This, as may be seen by referring to Fig. 16, occurs immediately prior to the time that the punched hole indicia in the primary card is read. As a result, the data impulses appearing at primary reading station hubs 539 and 541 will be applied to the comparing order position magnets 1–1A (Fig. 15f) and 1–16A via the contacts R58d n/c and R58c n/c, respectively. At this time then, the data from the first primary card has been stored in the A side of the comparing device CD1 by operation of the 1–1A and 1–16A magnets. Prior to the next primary card feed cycle, relay R58LP will be energized and the data from this primary card will be stored in the B side of comparing device CD1 by operation of the 1–1B and 1–16B magnets. As a result, after the second card has been read, the first and the second primary card data stored in the A and B sides of comparing device CD1 can be compared. It would be well to point out at this time that the restore magnets associated with the first comparing device CD1 are operatively connected by way of a plug wire between hubs 561 (Fig. 15f) and 563, to cam contacts CB5. However, in view of the fact that the contacts R57b operate in step with the contacts governed by relay R58, the data entered into the comparing device for storage, is stored for two primary card feed cycles so that it can be compared with the data of a preceding and next following card. That is, immediately prior to the time that the card data is to be entered into the comparing device magnets 1–1A through 1–16A, the restore magnet 1–RA associated with the A side of comparing device CD1 is energized via a circuit from line 458 through contacts CB5, R32c, the plug wire connecting hubs 544 and 543, and contacts R57b. During the next following primary card feed cycle, the contacts R57b are transferred whereupon only restore magnet 1–RB is energized. As a result, that data stored in the A side magnets 1–1A through 1–16A remains so stored during this next following primary card feed cycle.

In a similar fashion the second and third comparing devices CD2 and CD3, respectively, are governed by their associated data tumbling magnets R59, R60, R61, R62, R64 and R65. Since it is desirable to adapt any of the comparing devices to either primary or secondary card operations, the connections associated with and corresponding to hubs 545 and 547 are provided. That is, if the connection between hubs 544—546, and 542—543 are broken, and the connections between hubs 544—545 and 542—547 are made, the relays R57, D58 and R63 will be associated with secondary card operations in view of the fact that the contacts R34a and R34d are governed by the primary card feed clutch magnet relay R34.

Referring now to Fig. 15g, after the data has been stored in a given comparing device, such as the first such device CD1 for example, a test signal is applied to input hub 548. This test signal is directed from line 458 (Fig. 15f) through contacts CB17, a plug wire connecting hubs 493 and 548, and the labyrinth of transfer contact points shown in Fig. 15g to either the comparing device A side is high hub 549, the A side is low hub 551, or the A side and the B side are equal hub 556. If, for example, the comparing device A side and B side data are equal, the test signal applied to hub 548 will proceed through contacts 1–1–CB n/c, 1–1–CA n/c, the plug wire connecting hubs 553 and 554, contacts 1–16–CB n/c, 1–16–CA n/c, and the plug wire connecting hubs 556 and 552. In view of the fact that these circuit arrangements are similar for all of the comparing devices, and since the comparing devices per se are not a part of this invention, no further description thereof is necessary.

When a data comparing device, such as device CD1 for example, is being used to sequence compare record card data, it is not only necessary to "tumble" the incoming data but the comparison output signals must also be tumbled. This is accomplished by the contacts R57c (Fig. 15g), R57d, R62c, R62d, R60c (Fig. 15h) and R60d. Thus, if hub 549 (Fig. 15g) is plug wired to hub 571, the output signal at hub 549 will appear at hub 572 during one card feed cycle and at hub 573 during a next following card feed cycle. In this fashion, the data comparator output signals are "tumbled" in step with the tumbling of the input signals.

*Primary and secondary error stop circuits.*—During many machine operations, it is necessary to sequence compare the punched card data in the cards that are advanced by either or both of the primary and secondary card feed units. If, for example, each succeeding card advanced by a single feed unit is supposed to be either equal to or higher than the preceding card, it might be necessary to stop the machine should a record card which is arranged in descending order, be detected. This can be accomplished by connecting either primary or secondary error stop hubs 576 (Fig. 15g) and 577, respectively, dependent upon whether it were a primary or a secondary sequence operation that were being performed to hub 573. Thus, considering only the first comparing position of comparing device CD1, should the cards in the primary feed, for example, be arranged in ascending order, a test signal will appear at hub 572 each card feed cycle. However, should there appear a single card bearing data lower than the next preceding card, a test signal will appear at hub 573. By connecting hubs 573 and 576, relay R69LP will then be energized to cause contacts R69b (Fig. 15d) to close, to thereby effect the operation of normal machine stop relays R31 and R52. If the cards being sequence compared were secondary cards, hubs 573 (Fig. 15g) and 577 would be connected by plug wire. A descending data secondary card would cause the energization of relay R70LP. Thereupon, its contacts R70b (Fig. 15d) would cause the operation of normal machine stop relays R31 and R52. As described previously, the operation of these relays would bring about a normal xerographic printer machine stop.

*Immediate stop circuits.*—The normal stop and runout circuits have already been described. However, should it be necessary to stop the machine immediately so as to safeguard against possible machine and property damage should the machine be allowed to operate for any reason, relay R5 (Fig. 15g) is caused to operate. Various circuits whereby relay R5 is energized, have been described previously, and need not be gone into any further at this time. In addition to these circuits, there is provided an immediate stop switch 557 for connecting relay R5 directly across lines 447 and 458.

Consequent upon the energization of the immediate stop relay R5, contacts R5b (Fig. 15e) are caused to transfer to thereupon cause the circuit to relay R21 to open. In addition thereto, the condenser 516 for maintaining relay R21 energized during a normal stop operation, is discharged through resistor 558 via contacts R5b n/o. Thus, during an immediate stop operation, relay R21 will drop out immediately. It will be recalled that the de-energization of relay R21 causes relay R24 to drop out and relay R23 to pick up. As a result, contacts R24a (see also Fig. 15a) open the circuit to the main drive motor 141 (see also Fig. 2) represented in Fig. 15a to be within block 479, whereas contacts R23a close so as to complete a circuit to the drive motor brake (not shown) also within block 479. Furthermore, the corona unit high voltage power supplies shown in Fig. 15b are disconnected from their source of electrical power when relays R25 (Fig. 15e)—R27 are de-energized. In addition, the circuit to relay R22 is opened so that the relay is caused to drop out when condenser 517 has completely discharged.

*General counting circuits.*—In the present machine, there are provided four separate counting circuits 581 (Fig. 15c)—584. Each of these circuits is similar to the electronic circuit already described in connection with the print read head circuit 506. Upon the direction of any indicia representing signal to a respective counting circuit hub 581a—584a, the thyratron tube associated with the same will fire to cause a corresponding relay R71—R74 to pick. The said tube and its relay will remain energized via cam contacts CB25 until approximately 352° (see also Fig. 16) of the same machine cycle. During the interim period defined by the operation of relays R71—R74, a circuit will be completed via cam contacts CB14 (Fig. 15g) and one or more relay contacts R71a—R74a to a respective center operating magnet 586—589. Each aforesaid counter magnet governs a conventional step-by-step counting device which is advanced one increment in response to each single magnet energization.

*Recode selectors.*—Three conventional recode selectors 591 (Fig. 15c), 592 and 593 (Fig. 15h) are also provided in the preferred embodiment of this invention. These are in effect electronic coincidence switches which are caused to operate when signals are applied concurrently to the "a" and "b" hubs of a given selector. As a result, the thyratron tube therein is caused to fire and its associated relay, e.g., relay R77 (Fig. 15h), is caused to pick, whereby the relay governed selector contacts R77a are caused to transfer.

*Automatically operated card feed selectors.*—As has just been brought out, operation of the recode selectors may be effected by directing coincident signals to the plug hubs thereof concurrently. The two card feed selector relays R78 (Fig. 15g) and R79 are operated automatically without external plugboard wiring. Relay R78 is operated each primary card feed cycle via the second primary card lever contact relay contacts R13f and the primary clutch magnet relay contacts R35c. Relay R79, on the other hand, is operated each secondary card feed cycle via the second secondary card lever contact relay contacts R18b and the secondary clutch magnet relay contacts R33K. The selector contacts R78a and R79a are shown in Fig. 15h.

*Reset circuits.*—It has been explained that if primary error relay R69LP (Fig. 15g), secondary error relay R70LP, immediate stop relay R5, heat fixer station safety relay R46LP (Fig. 15e), and secondary feed card jam detector relays R44LP and R45LP, are energized, the xerographic printer will be caused to stop. After the condition causing any of these aforementioned relays to pick has been cleared up, the xerographic printer can be started up again only by first depressing the reset switch to close contacts 574 (Fig. 15g). This will complete a circuit to the latch trip coils of the afore-mentioned relays from line 458 via contacts 574 to line 447.

*Signal lamps.*—Referring to Fig. 15d, the various signal lamps for providing some indication to the machine operator just what the machine is doing, are shown. Primary feed signal lamp 472 is energized so long as there are no cards in the primary hopper. Similarly, signal lamp 474 is energized when there are no cards in the secondary hopper. The process control lamp 350 is energized in the event relay R46LP (see also Fig. 15e) becomes energized due to any one of the afore-described several unfavorable conditions which might occur in the vicinity of the heat fixer station. Primary and secondary error lamps 344 and 345, respectively, are energized in the event of a control data sequence comparison error in either respective feed unit. The "On" lamp 457 is energized after the timer delay contacts 456 which are associated with timer 454 (see also Fig. 15a), are closed.

OPERATION AND SUMMARY

Referring to Figs. 1 and 20, primary record cards 21 are fed, one-by-one, by the conventional card feed mechanism 23 and feed rollers 26—37 from hopper 22 past the punched hole indicia sensing station 38, the optical scanning station 39, and the primary card distributing station 41, to either the drop-type stacker 44 or the drum-type stacker 24. The first two sets of feed rollers 26—29 are operated on a so-called 20 point cycle, whereby each primary record card is advanced at a rate of 16.67 inches per second. The next three sets of primary feed rollers 30—35 are operated on a 14 point cycle, to thereby advance each primary card at a rate of 11.67 inches per second. The remaining pair of feed rollers 36—37 are operated on an 18 point cycle so as to advance each primary card at a rate of 15 inches per second. Furthermore, it will be recalled, the card feed mechanism 23 and the first two sets of feed rollers 26—29 are primary card feed clutch controlled, whereas the other sets of feed rollers operate continuously.

Referring to Figs. 1 and 19, secondary record cards 51 are fed, one-by-one, by the conventional card feed mechanism 53 and feed rollers 56—113 from hopper 52 past punched hole indicia sensing station 55, the in-flight card aligner mechanism 114, the xerographic image transfer station 116, the toner image fixing station 117, and the record card distributing station 118, to either the drop-type stacker 121 or the drum-type stacker 54. The first two sets of feed rollers 56—59 are operated at a 20 point cycle rate so as to advance each secondary card at a speed of 16.67 inches per second. The feed rollers 60—109 are operated on a 14 point cycle basis, to thereby advance the secondary card at a rate of 11.67 inches per second, and the two remaining sets of feed rollers 110—113 are operated on an 18 point cycle so as to advance each record card at a rate of 15 inches per second. As in the primary card feed unit, the card feed mechanism and the first two sets of feed rollers 56—59 are secondary feed clutch governed, whereas the remaining sets of feed rollers operate continuously.

The broken lines L1 to L27 in Fig. 19, and L1 to L5 in Fig. 20, each represent the approximate position of the leading edge of an advancing record card at the end of any given machine card feed cycle. Thus, for example, at the end of the first secondary card feed cycle, the leading edge of the first secondary card will be positioned immediately ahead of the punched hole reading brushes located at the secondary card sensing station 55. At the end of the second secondary card feed cycle, the first secondary card will have been moved so that its leading edge is immediately ahead of the bite provided by feed rollers 60—61, whereas the second secondary card will have been moved up to take the place of the first card. By the same token, at the end of the first primary card feed cycle, the first primary card will have been moved to a position immediately ahead of the punched hole reading brushes within primary card sensing station 38. At the end of the second primary card feed cycle, the first primary card will have been moved to a position immediately ahead of the bite provided by feed rollers 30—31, whereas the second primary card will have moved into the position just vacated by the first primary card.

As has been brought out previously, the peripheral speed of the xerographic drum 49 (Fig. 1) is correlated to the lineal speed of the moving primary cards 21 through the optical scanning station 39. The arrangement is such that the primary card source information image transfer is at a one-to-one ratio, i.e., the latent electrostatic image of the aforesaid source information as is recorded on the surface of the xerographic drum 49, is the same size as is the actual source information imprinted on the primary card. Furthermore, the aforesaid latent electrostatic images formed and stored on the surface of xerographic drum 49 are spaced apart approximately ¼ inch. That is, the leading edge of one latent electrostatic image is spaced one quarter of an inch away from the trailing edge of another latent electrostatic image.

*All-cycles printing operation.*—This could be an operation for which neither the primary cards nor the secondary cards have punched hole control data therein. In general, the principal object is to feed a batch of primary cards 21 (Fig. 1), each card having source information thereon to be transferred xerographically, singly past the optical scanning station 39. Furthermore, a batch of secondary cards 51 are moved singly past transfer station 116. To accomplish a one-for-one xerographic image transfer, the compare test hubs 493 (Fig. 15f) should be plug wired to a secondary feed hub 491, a primary feed hub 492, and a print hub 494. As described hereinbefore, each of the primary and secondary card feed clutch magnet relays R32–R35 will be energized by way of the preceding plug wiring every machine card feed cycle after the second cycle, to thereby cause primary and secondary cards to be fed continuously through their respective feed units. In addition, the enerization of relay R36 (Fig. 15g) every card feed cycle will cause a "print" magnetic spot to be written on the surface of magnetic drum 137 (Fig. 15c) every next following machine card feed cycle at 340° thereof (see also Fig. 20). Hence, starting during the fifth machine card feed cycle (see Fig. 19) and every card feed cycle thereafter, so long as primary and secondary cards are being fed through their respective feed units, the magnetic drum masking-erasing read head 497 will read the aforementioned cyclically recorded "print" magnetic spots at approximately 132° thereof. During the same card feed cycle in which the "print" magnetic spot is so read, the masking-erasing apparatus clutch magnet 282 (see also Figs. 7 and 15g) will be energized to cause the masking-erasing cylinder 279 to rotate at approximately 281° of the fifth cycle. This, of course, must be done every cycle in view of the fact that every latent electrostatic image corresponding to each primary card must be developed and transferred; i.e., none of the latent electrostatic images are to be erased.

During the ninth cycle, the developer unit magnetic drum read head 498 (Fig. 15c) will read the recorded "print" magnetic spot at 182°, so as to effect the energization of clutch magnet 298 (see Figs. 12 and 15g). This will effect operation of the developer unit mechanism at approximately 281° of each ninth cycle for every card. During the eleventh card feed cycle for every secondary card, the same will have been advanced into the afore-described in-flight card aligner unit 114 (Fig. 1) whereby the card will be re-aligned, if necessary, for proper registration.

During the fourteenth cycle, a secondary card will be moved through the xerographic image transfer station 116. At this time, the developed image of the source information imprinted on a corresponding primary card will also be moved through the aforesaid transfer station. At approximately 233° of this cycle, the magnetic drum print read head 499 (Fig. 15c) will sense the previously recorded "print" magnetic spot on the surface of drum 137, to thereby effect the energization of transfer roller magnet 368 (see Figs. 9 and 15g). Accordingly, at approximately 300° of this cycle, the transfer roller 348 (Fig. 10) will be moved in a direction towards the xerographic drum 49 so as to effect a transfer of the developed toner image on the surface of xerographic drum 49, onto the surface of the advancing corresponding secondary card. Each secondary card will thereafter be moved through the toner image fixing station 117 (Fig. 1) and over the chute blade 120 within station 118, and finally into the drum-type stacker 54. Should it be desirable to stack the primary and/or the secondary cards in their respective drop-type stackers 44 and 121, the compare test hubs 493 (Fig. 15f) must be plug wired to the secondary select stacker hub 513 (Fig. 15c) and the primary select stacker hub 512 (Fig. 15g). As described previously, the operation of relays R50 (Fig. 15c) and R47 (Fig. 15g) will cause magnets 42 (Fig. 1) and 119 to operate so as to raise the movable end of their respective chute blades 44 and 120, above the primary and secondary card feed lines. Accordingly, each advancing card will be moved into its respective drop-type stacker 44 and 121.

*Operation for printing from select primary cards onto every secondary card.*—This is an operation where it is desired to print the source information imprinted on certain select primary cards, onto every one of the successively fed secondary cards. For example, a main file of record cards in the office of a publisher would include the names and addresses of all magazine subscribers, for instance. Each of these cards would also include the proper corresponding punched hole control data. In the normal course of business, all of these record cards in the main file would ordinarily be arranged alphabetically. Hence, the present operation would be performed should it be desirable to print the names and addresses of only those subscribers within a particular sub-category, such as doctors for example. Let it be assumed that every record card having the name and address of a doctor imprinted thereon, also has an identifying punched hole therein in a single designated card column within a control field to be read by the primary card sensing station means 38 (Fig. 1). By connecting the reading brush within sensing station 38 for reading the aforesaid card column to the comparing device apparatus 134, and by connecting the output from data emitter 135 to the other side of the apparatus 134, those record cards within the afore-mentioned "doctor" sub-category can be detected.

The data emitter 135 is a conventional apparatus, one such emitter being shown and described in Rabenda et al. Patent No. 2,602,394 which issued on July 8, 1952. As shown in Fig. 8a thereof, any digit and/or alphabetic character representing signals in accordance with the well-known IBM code, may be had every machine cycle. Thus, by permitting only predetermined standard data "doctor" signals to be directed from emitter 135 to the comparing device apparatus 134, and by comparing the standard data emitter signals with the signals resulting from the reading of punched hole data in primary cards 21 being advanced through the sensing station 38, compare apparatus 134 may be controlled to direct suitable electrical signals which indicate that the primary card punched hole data is either high, low or equal with respect to the afore-mentioned "standard data."

Thus, to accomplish the present operation whereby all of the source information on select primary cards is to be transferred onto every one of the successively fed secondary cards, data emitter 135 might be set to provide signals every machine cycle which correspond to the punched hole data in those primary cards it is desired to copy xerographically. That is, consequent upon the punched hole information in a primary card corresponding to the signals emitted from data emitter 135 during any given machine cycle, a suitable "equal" signal should appear at comparing device hub 288. This hub would be plug wired to the print hub 494 (Fig. 15g) so as to cause a "print" magnetic spot to be recorded on the surface of magnetic drum 137 (see also Fig. 15c) whenever the data being compared by apparatus 134 (see also Fig. 1) are equal. In addition, the comparing apparatus equal hub 288 would be plug wired to a secondary feed hub (Fig. 15f) so as to cause a secondary card feed operation only when another secondary card is to have a xerographic image transferred thereon. The primary feed hub could be plug wired to the compare test hub, so as to cause a primary card feed operation every machine cycle. Furthermore, the primary selective stacker hub 512 (Fig. 15g) would be plug wired to the compare apparatus equal hub 288 (Fig. 1), so that only those primary record cards having source information thereon which has been copied, will be stacked in the drop-type stacker 44. All of the other primary cards would be stacked in the drum-type stacker 24.

Thus, with the plug wiring just described, primary record cards will be fed, one-by-one, every machine cycle from primary hopper 22 to either of the stackers 44 or 24 depending upon whether the source information on any given primary card has been copied or not. The secondary card feed unit, on the other hand, will operate under control of the secondary card feed clutch only when there is a secondary card which is to have the xerographic image of source information transferred thereon. The afore-described masking-erasing clutch magnet and the developer unit clutch magnet, will automatically be operated whenever the xerographic image of information on a primary record card is to be transferred. At all other times, both of the afore-mentioned clutch magnets will be rendered inoperative, whereby the latent electrostatic images of source information will be erased completely from the surface of the xerographic drum 49.

*Operation for printing from select primary cards onto related select secondary cards.*—This could be an operation in which the punched hole indicia sensed by the primary card sensing station is compared to the punched hole indicia read by the secondary card sensing station, so that only the information printed on a primary card may be transferred to the related "equal" secondary card.

Referring to Fig. 1, the comparing apparatus 134 is used to compare the primary and secondary punched hole data read by sensing stations 38 and 55, respectively. Should these data for any two given cards be equal, a signal will appear at the compare apparatus equal hub 288. Furthermore, should the primary data be low, a corresponding signal will appear at compare apparatus hub 287, whereas should the secondary punched hole data be low, a corresponding signal will appear at secondary low compare hub 289.

In accordance with the foregoing, to accomplish the present operation equal hub 288 should be plug wired to print hub 494 so as to cause a print operation in response to the detection of "equal" primary and secondary cards. In addition, the equal hub 288 should be plug wired to the primary and secondary feed hubs (Fig. 15f), so that a primary and a secondary feed cycle takes place concurrently in response to the detection of "equal" primary and secondary cards. The low secondary hub 289 should also be plug wired to the secondary feed hub so that should a low secondary condition occur, the cards in the secondary feed might be advanced to a point where the punched hole data being read by secondary sensing station 55 indicates secondary data which is either equal to or higher than the primary punched hole data. On the other hand, the low primary compare hub 287 should be plug wired to the primary feed hub in order to cause a primary card feeding operation until there is sensed a primary card having punched hole data which are either equal to or greater than the secondary card data. In addition, low primary hub 287 might be plug wired to primary selective stacker hub 512 (Fig. 15g) in order to effect the stacking of only those primary cards whose information has not been transferred onto secondary cards in the drop-type stacker 44. Those primary cards stacked in the drum-type stacker 24 would include all of the primary cards whose information had been transferred onto related select secondary cards. To accomplish substantially the same type of thing in the secondary card feed unit, the low secondary compare hub 289 (Fig. 1) would be plug wired to the secondary select stacker hub 513. As a result, those punched hole secondary cards onto which a xerographic image has been transferred, will be stacked in the drum-type stacker 54, whereas those that do not have a xerographic image transferred thereon will be stacked in the drop-type stacker 121.

It must be recognized that the machine operations described hereinabove which can be performed on the present card-to-card xerographic printer, are only examples and are provided for descriptive and illustrative purposes only. Many innumerable other operations can be performed with this highly flexible machine, and many features not brought out in this last section entitled Operation and Summary can also be availed of. This, of course, includes arrangements employing various selectors, counters, punched hole data sequence comparing procedures, etc. Hence, while there have been shown and described and pointed out the fundamental novel features of the invention as applied to a preferred embodiment, it will be understood that various omissions and substitutions and changes in the form and details of the devices illustrated in their operation may be made by those skilled in the art, without departing from the spirit of the invention. It is the intention, therefore, to be limited only as indicated by the scope of the following claims.

What is claimed is:

1. A record card controlled xerographic printer comprising a primary card control data sensing means; primary card source information scanning means for producing optical images of said information; a primary card hopper for supporting a group of primary cards arranged in an ascending order control data sequence; a first selectively operable primary card feeding means for advancing primary cards, one by one, from said hopper past said primary sensing means to a primary intermediate position; a second selectively operable primary card feeding means for advancing primary cards, one by one, from said primary intermediate position past said scanning means; a continuously rotatable xerographic drum having a photoconductive insulating layer thereon; means for electrostatically charging said photoconductive insulating layer; optical means for operatively connecting said scanning means and said xerographic drum so that spaced latent electrostatic images of primary card source information are caused to be stored on said electrostatically charged photoconductive insulating layer; means for developing said latent electrostatic images by applying a pigmented electroscopic toner thereto; a selectively operable developed image transfer apparatus for effecting the transfer of toner developed images from said photoconductive insulating layer onto secondary cards; a secondary card hopper for supporting a group of secondary cards arranged in the same order control data sequence as the primary cards; secondary cards control data sensing means; a first selectively operable secondary card feeding means for advancing secondary cards from said secondary card hopper past said secondary sensing means to a secondary intermediate position; a second selectively operable secondary card feeding means for advancing secondary cards from said secondary intermediate position past said transfer apparatus, one by one, at a speed correlated with the speed of feeding primary cards past said scanning means; control data comparing means governed by said primary and said secondary card control data sensing means for producing different signals indicative of the sequential relationship of said primary and secondary card control data; electrical means for selectively operating said first and second primary and said first and second secondary card feeding means in response to said different signals whereby said primary cards and said secondary cards are alternatively fed to achieve correspondence therebetween and simultaneousy fed to effect the transferral of images therebetween; and other electrical means controlled by said comparing means for controlling the operation of said selectively operable transfer apparatus so that only the developed images corresponding to matched primary cards are transferred onto related matched secondary cards.

2. A record card controlled xerographic printer comprising a primary card control data sensing means; primary card source information scanning means for producing optical images of said information; selectively operable primary card feeding means for advancing primary cards, one by one, past said sensing means to an intermediate primary station, and from said intermediate station past said scanning means; a continuously rotatable xerographic drum having a photoconductive insulating layer thereon; means for electrostatically charging said photoconductive insulating layer; optical means for operatively connecting said scanning means and said xerographic drum so that spaced latent electrostatic images of primary card source information are caused to be stored on said electrostatically charged photoconductive insulating layer; means for developing said latent electrostatic images by applying a pigmented electroscopic material thereto; a developed image transfer apparatus for effecting the transfer of developed images from said photoconductive insulating layer onto secondary cards; secondary card control data sensing means selectively operable secondary card feeding means for advancing secondary cards past said secondary sensing means to an intermediate secondary station and from said intermediate secondary station past said transfer apparatus, one by one, at a speed correlated with the speed of feeding primary cards past said scanning means; means governed by said primary and said secondary card control data sensing means for producing different signals indicative of the sequential relationship between the primary and secondary card control data; and electrical means for selectively operating said primary and said secondary card feeding means in response to said different signals whereby said primary cards and said secondary cards are alternatively fed to achieve correspondence therebetween and simultaneously fed to effect the transferal of images therebetween.

3. A xerographic printer according to claim 2 in which said developed image transfer apparatus is selectively operable, additionally comprising other electrical means controlled by said different signals for controlling the operation of said selectively operable transfer apparatus so that the secondary cards have transferred thereto only developed images corresponding to certain select ones of the primary cards.

References Cited in the file of this patent

UNITED STATES PATENTS

| | | |
|---|---|---|
| 1,919,433 | Hutchings | July 25, 1933 |
| 2,172,330 | Bryce | Sept. 5, 1939 |
| 2,357,809 | Carlson | Sept. 12, 1944 |
| 2,602,544 | Phelps et al. | July 8, 1952 |
| 2,641,997 | Butterfield et al. | June 16, 1953 |
| 2,659,670 | Copley | Nov. 17, 1953 |
| 2,807,233 | Fitch | Sept. 24, 1957 |